US010787373B2

(12) United States Patent
Chang et al.

(10) Patent No.: US 10,787,373 B2
(45) Date of Patent: *Sep. 29, 2020

(54) IRON FILINGS-BASED GREEN ENVIRONMENTAL MEDIA FOR NUTRIENT REMOVAL AND METHODS OF USE

(71) Applicant: University of Central Florida Research Foundation, Inc., Orlando, FL (US)

(72) Inventors: Ni-Bin Chang, Orlando, FL (US); Martin P. Wanielista, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,889

(22) Filed: Mar. 25, 2020

(65) Prior Publication Data
US 2020/0223716 A1    Jul. 16, 2020

Related U.S. Application Data

(60) Continuation-in-part of application No. 16/398,050, filed on Apr. 29, 2019, which is a division of
(Continued)

(51) Int. Cl.
*B01D 24/02* (2006.01)
*B01J 20/02* (2006.01)
(Continued)

(52) U.S. Cl.
CPC .............. *C02F 1/281* (2013.01); *B01D 24/02* (2013.01); *B01J 20/0229* (2013.01);
(Continued)

(58) Field of Classification Search
CPC ..... B01D 24/02; B01J 20/0229; B01J 20/043; B01J 20/103; B01J 20/12; B01J 20/28004;
(Continued)

(56) References Cited

U.S. PATENT DOCUMENTS

2010/0062933 A1 * 3/2010 Wanielista ............... B01J 20/16
502/402

OTHER PUBLICATIONS

Erickson, A.J., et al., "Capturing phosphates with iron enhanced sand fitlration", Water Research, 46, pp. 3032-3042. (Year: 2012).*
(Continued)

*Primary Examiner* — Benjamin L Lebron
(74) *Attorney, Agent, or Firm* — Smith & Hopen, P.A.; Paul Murty

(57) ABSTRACT

A method of water treatment includes flowing water that includes nitrogen and phosphorus compounds through a sorption media composition within at least one chamber of a water treatment system. The composition comprises iron filings comprising at most 5 volume (vol) % of the composition, sand particles comprising at least 80 vol % of the composition, and clay particles comprising at most 5 vol % of the composition. The iron filings, sand particles, and clay particles are mixed together. During the flowing, the clay particles attract the nitrogen and phosphorus compounds, which become absorbed onto a surface of the iron filings and the clay, resulting in a removal of the nitrogen and phosphorus compounds and the generation of reaction products. Nitrogen and phosphorus are then recovered from the reaction products.

16 Claims, 35 Drawing Sheets
(18 of 35 Drawing Sheet(s) Filed in Color)

Related U.S. Application Data application No. 15/886,330, filed on Feb. 1, 2018, now abandoned.

(51) Int. Cl.

| | | |
|---|---|---|
| *B01J 20/12* | (2006.01) | |
| *B01J 20/28* | (2006.01) | |
| *C02F 1/28* | (2006.01) | |
| *B01J 20/04* | (2006.01) | |
| *B01J 20/10* | (2006.01) | |
| *C02F 101/10* | (2006.01) | |
| *C02F 103/00* | (2006.01) | |
| *C02F 101/16* | (2006.01) | |

(52) U.S. Cl.
CPC ........... *B01J 20/043* (2013.01); *B01J 20/103* (2013.01); *B01J 20/12* (2013.01); *B01J 20/28004* (2013.01); *B01J 20/28014* (2013.01); *B01J 20/28054* (2013.01); *B01J 2220/4825* (2013.01); *B01J 2220/4831* (2013.01); *B01J 2220/4893* (2013.01); *C02F 2101/105* (2013.01); *C02F 2101/163* (2013.01); *C02F 2103/001* (2013.01); *C02F 2201/002* (2013.01)

(58) Field of Classification Search
CPC ............ B01J 20/28014; B01J 20/28054; B01J 2220/4825; B01J 2220/4831; B01J 2220/4893; C02F 1/281; C02F 2101/105; C02F 2101/163; C02F 2103/001; C02F 2201/002
See application file for complete search history.

(56) References Cited

OTHER PUBLICATIONS

Reddy, K.R. et al., "Nutrients removal from urban stormwater by different filter materials", Water air soil pollution, 225: 1178. (Year: 2013).*

Berney, E.S. et al., "Mechanical and physical properties of ASTM C33 Sand", US Army Corps of Engineers, ERDC/GSL TR-08-02. Feb. (Year: 2008).*

Huang, C.P. et al., "Nitrate reduction by metallic iron", Water Research, vol. 32, No. 8, pp. 2257-2264. (Year: 1998).*

Facility for Advancing Water Biofiltration, "Biofiltration Filter Media Guidelines (Version 3.01)", Jun. (Year: 2009).*

Zhang, Y., et al., "Enhanced removal of nitrate by a novel composite: nanoscale zero valent iron supported on pillared clay", Chemical Engineering Journal, 171: 526-531. (Year: 2011).*

Chang et al., The Impact of Carbon Source as Electron Donor on Composition and Concentration of Dissolved Organic Nitrogen in Biosorption-Activated Media for Stormwater and Groundwater Co-Treatment. Environmental Science & Technology. 2018. vol. 52: 9380-9390.

Chang et al., Impact of changing environmental factors and species competition on iron filings-based green environmental media for nutrient removal in stormwater treatment. Environmental Progress & Sustainable Energy. 2018: 1-14.

Valencia et al., Optimal Recipe Assessment of Iron Filing-Based Green Environmental Media for Improving Nutrient Removal in Stormwater Runoff. Environmental Engineering Science. 2019. vol. 36 (No. 10): 1-14.

* cited by examiner

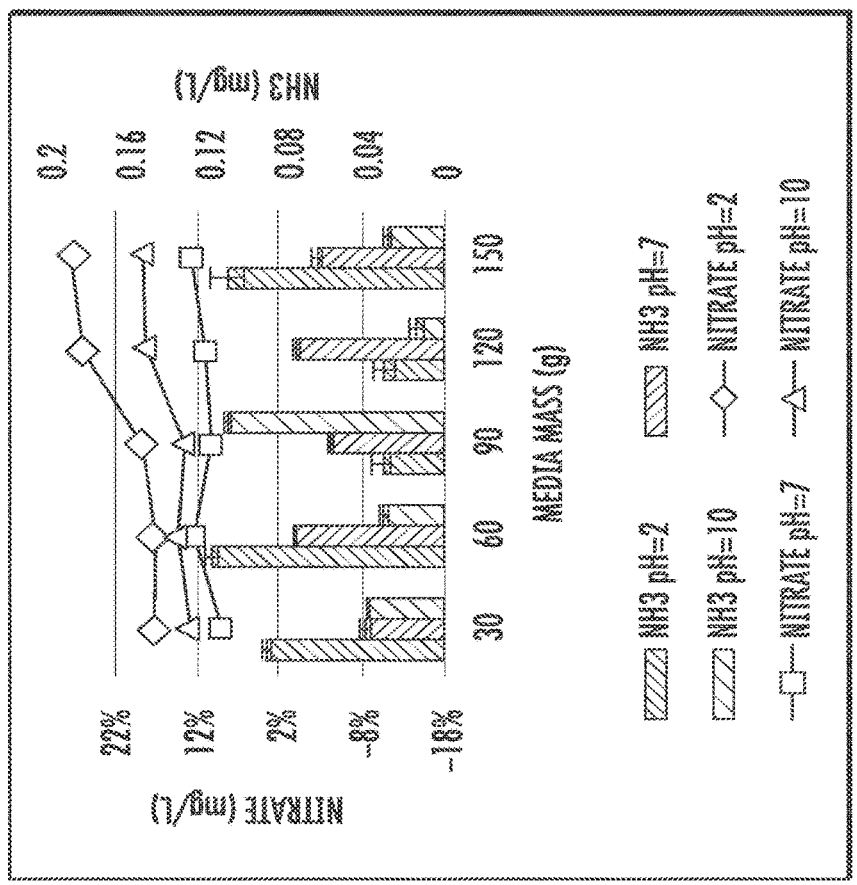
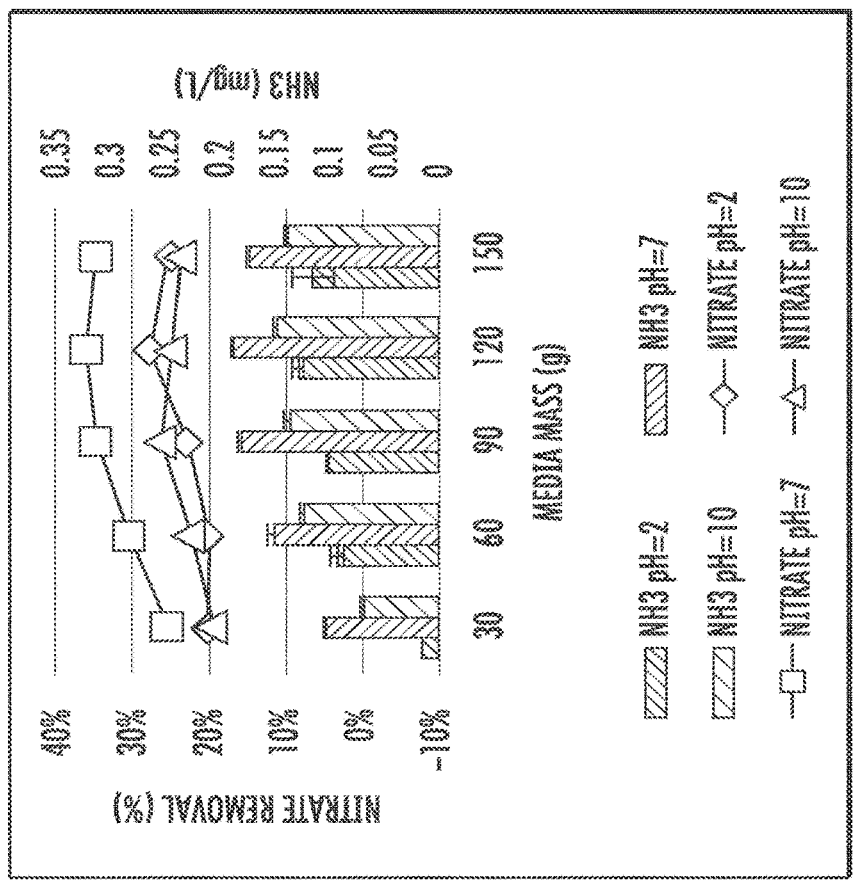
FIG. 4B
FIG. 4A

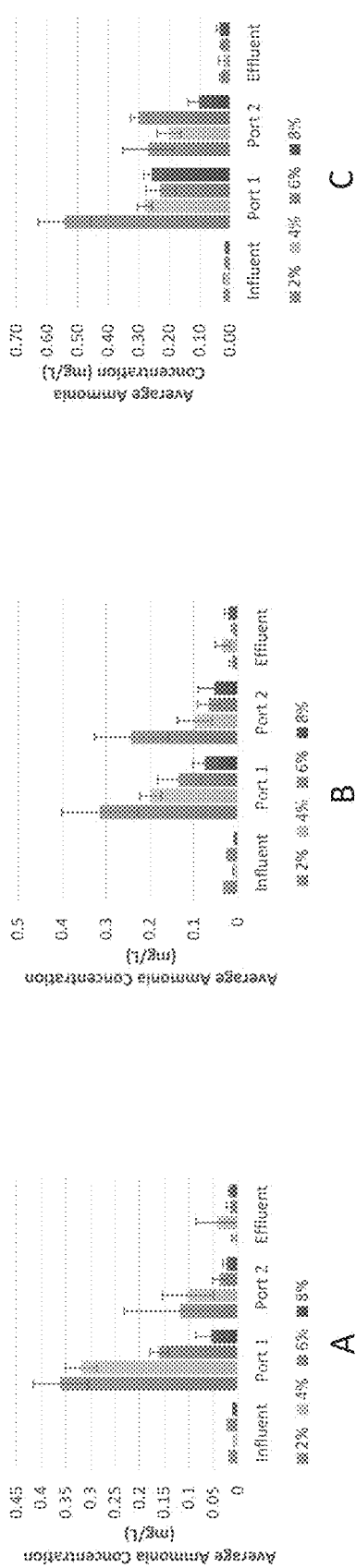
Fig. 19A-C

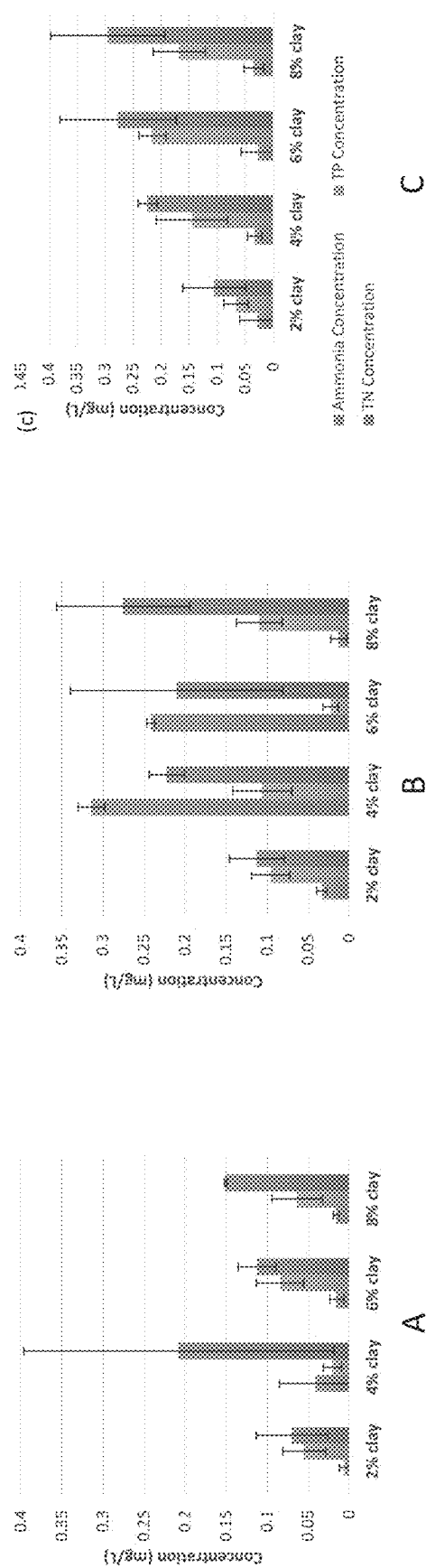
Fig. 20A-C

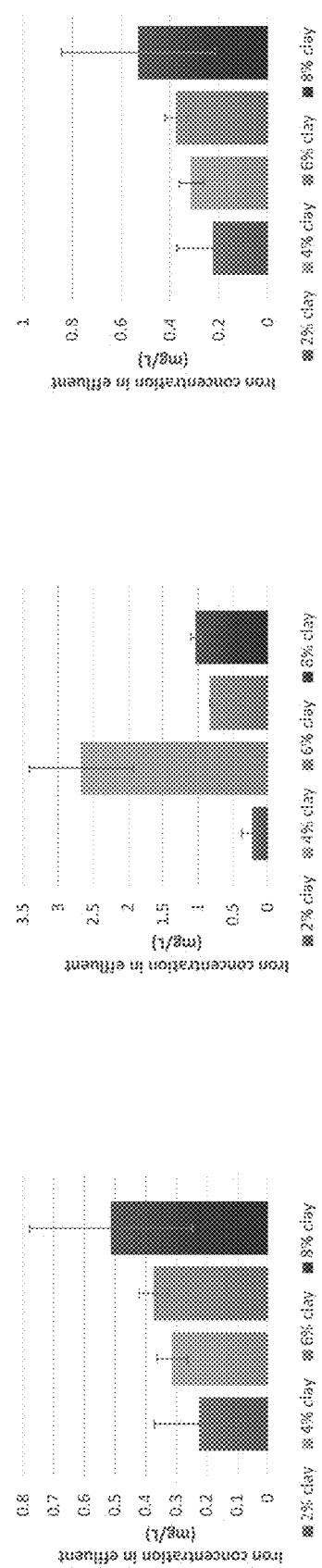
Fig. 21A-C

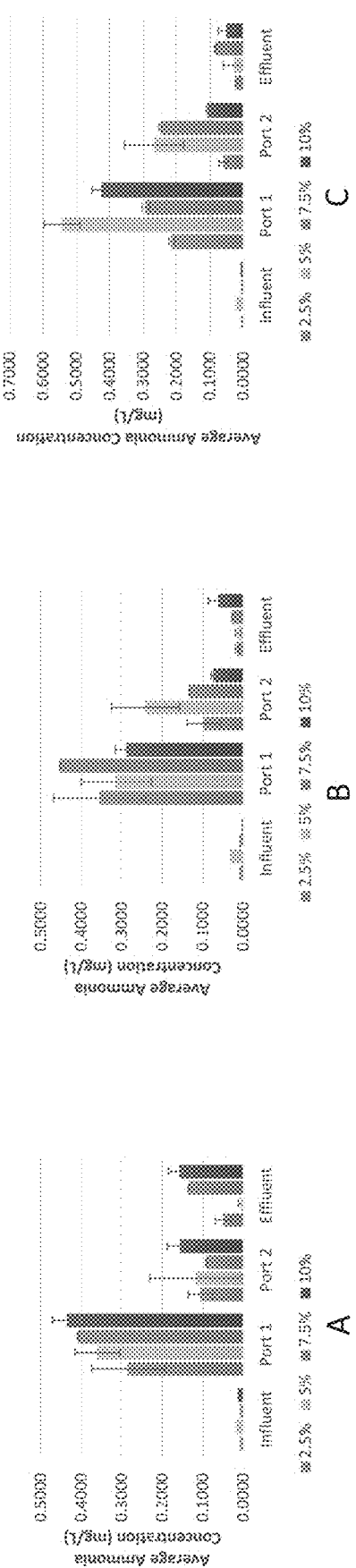
Fig. 22A-C

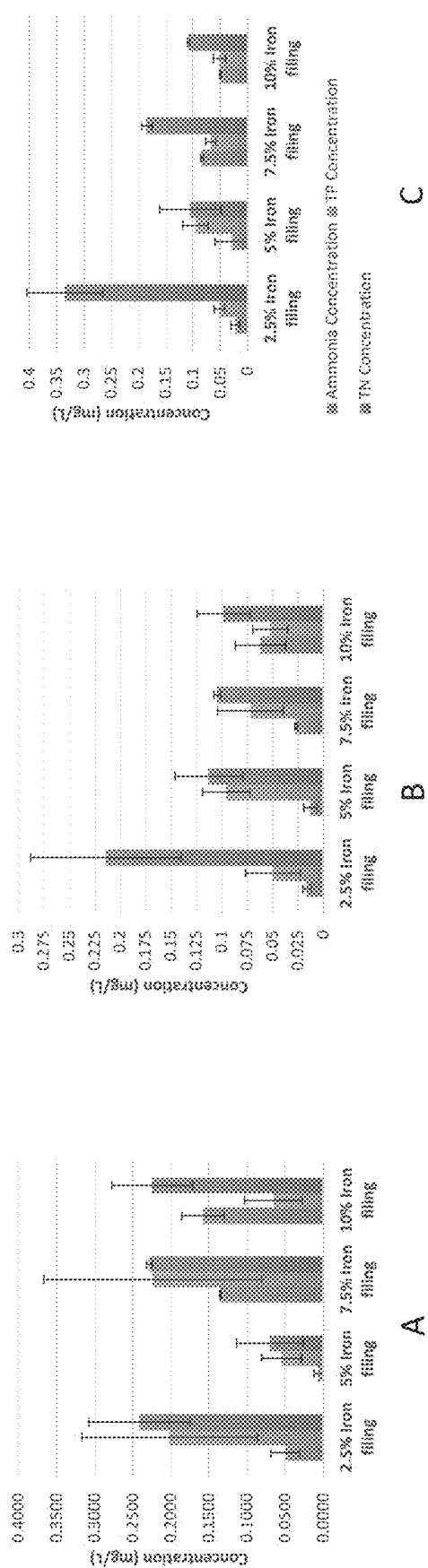
Fig. 23A-C

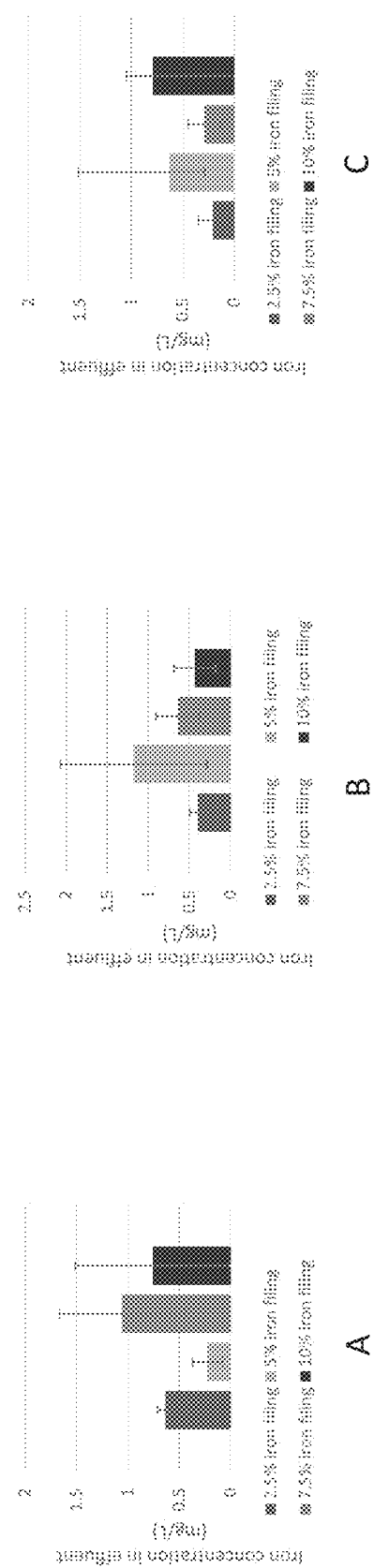
Fig. 24A-C

IRON FILINGS-BASED GREEN ENVIRONMENTAL MEDIA FOR NUTRIENT REMOVAL AND METHODS OF USE

CROSS-REFERENCE TO RELATED APPLICATIONS

This nonprovisional application is a Continuation-in-Part of and claims priority to U.S. nonprovisional application Ser. No. 16/398,050, entitled "Water treatment using an iron and clay-based sorption media," filed on Apr. 29, 2019, which is a Divisional application of and claims priority to U.S. nonprovisional application Ser. No. 15/886,330, entitled "Iron and clay-based sorption media for water treatment," filed on Feb. 1, 2018, by the same inventors.

FEDERALLY SPONSORED RESEARCH OR DEVELOPMENT

This invention was made with Government support under Grant No. ICER 1830036 awarded by the National Science Foundation and U.S. Department of Transportation Federal Aid No. HR01-055-H as awarded by the Florida Department of Transportation. The government has certain rights in the invention.

BACKGROUND OF THE INVENTION

1. Field of the Invention

This invention relates, generally, to media used to improve efficiencies of nutrient removal. More specifically, it relates to synergistic functionalities between clay and iron particles that improve nutrient removal and recovery potential in iron filings-based green environmental media (IFGEM).

2. Brief Description of the Prior Art

Global population growth and degradation of freshwater resources has resulted in a global water crisis. In response to this situation, stormwater reuse is gaining worldwide attention as a technique to overcome water shortages and alleviate demand on typical freshwater resources. Stormwater reuse can be defined as the collection, accumulation, treatment or purification, and storing of stormwater for eventual use as an alternative freshwater resource. However, currently there is limited technology available for the reliable treatment of stormwater for reuse.

Nutrients, such as nitrogen and phosphorus, are an essential component to maintaining a healthy aquatic environment. However, excess nutrients such as nitrogen and phosphorus can negatively impact aquatic environments and human health, and cause stormwater to be deemed unfit for reuse. Stormwater runoff into waterbodies, wastewater, and agricultural discharge can contain excessive nutrients such as nitrogen and phosphorus.

Accordingly, what is needed is an optimal recipe of an iron filings-based green environmental media (IFGEM) using an iron and clay-based sorption media. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention. Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an efficient, synergistic composition and a method of treating water with a synergistic composition, is now met by a new, useful, and nonobvious invention.

Disclosed embodiments recognize enhanced regulatory standards promulgated by government agencies including the US Environmental Protection Agency (US EPA, 2013), such as regarding the Numeric Nutrient Criteria, have rendered known green sorption media ineffective in cases where the nutrient concentration in stormwater, wastewater, and agricultural discharge is high. It has been found that disclosed iron-filings based Green Environmental Media (IFGEM) compositions that include both sand and clay particles synergized with iron filings are efficient for removal of nitrogen and phosphorus, as well as for the optional recovery/reuse of nitrogen and phosphorus from the IFGEM after use.

An embodiment of the synergistic composition for treating water containing nitrogen compounds and phosphorus compounds includes a mixture of iron filings of at most 5 vol %, sand particles of at least 77 vol % (for example, 82 vol %), and clay particles of at least 2 vol %. The clay particles may be aluminum-based clay particles, and may comprise at least 5 vol % of the synergistic composition. In an embodiment, an average size of the clay particles is less than an average size of the iron filings and an average size of the sand particles. For example, an average size of the clay particles may be between 0.2 µm and 5 µm. The synergistic composition may further include at least one recycled material selected from the group consisting of tire crumb and paper providing carbon sources to promote nitrogen removal. The at least one recycled material may be present in the synergistic composition at 10 vol %. The clay particles are configured to attract the nitrogen compounds and the phosphorus compounds to be absorbed onto a surface of the iron filings and the clay particles, thereby synergistically removing the nitrogen compounds and the phosphorus compounds from the water.

The synergistic composition can be used to filter nitrogen compounds and phosphorus compounds from water. The method of water treatment includes a step of mixing together a synergistic composition including iron filings of at most 5 volume (vol) % of the synergistic composition, sand particles of at least 77 vol % of the synergistic composition, and clay particles of at least 2 vol % of the synergistic composition. Water containing nitrogen compounds and phosphorus compounds is flowed through the synergistic composition. The clay particles attract the nitrogen compounds and the phosphorus compounds. The nitrogen compounds and the phosphorus compounds are absorbed onto a surface of the iron filings and the clay particles. Iron quickly dissolves in water and generates ferrous iron (Fe II) and ferric iron (Fe III) to form salts with phosphate, helping to precipitate out salts in a solid form while nitrogen can go through the biofilm to be removed through nitrification and denitrification. At least a portion of the nitrogen compounds and the phosphorus compounds are then removed from the water, thereby generating reaction products. Accordingly, the iron filings and the clay particles act synergistically to remove the at least the portion of the nitrogen compounds and the phosphorus compounds from the water.

An object of the invention is to provide an environmentally-friendly sorption media to remove nitrogen and phosphorus compounds from fluids, such as water, in an effective and efficient way.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

For a fuller understanding of the invention, reference should be made to the following detailed description, taken in connection with the accompanying drawings, in which:

FIG. 4A shows isotherm study results of IFGEM-1 for nitrate reduction under three initial pH conditions.

FIG. 4B shows isotherm study results of IFGEM-2 for nitrate reduction under three initial pH conditions.

FIGS. 19A-C show the average ammonia concentration for individual sample ports 2% clay content (10% tire crumb, 5% iron filing, 83% sand by volume), 4% clay content (10% tire crumb, 5% iron filing, 81% sand by volume), 6% clay content (10% tire crumb, 5% iron filing, 79% sand by volume), and 8% clay content (10% tire crumb, 5% iron filing, 77% sand by volume) for influent conditions of 0.3 mg/L phosphate, 0.9 mg/L nitrate (in FIG. 19A); 0.5 mg/L phosphate, 1.3 mg/L nitrate (in FIG. 19B); and 0.7 mg/L phosphate, 1.7 mg/L nitrate (in FIG. 19C).

FIGS. 20A-C show effluent ammonia, total phosphorus, and total nitrogen concentration for clay variation for 0.3 mg/L phosphate, 0.9 mg/L nitrate (in FIG. 20A); 0.5 mg/L phosphate, 1.3 mg/L nitrate (in FIG. 20B); and 0.7 mg/L phosphate, 1.7 mg/L nitrate (in FIG. 20C) (with clay variations in media compositions following the setting in Table 1).

FIGS. 21A-C show effluent iron concentration for 2% clay content, 4% clay content, 6% clay content and 8% clay content for influent condition for a first influent condition (in FIG. 21A); for a second influent condition (in FIG. 21B); and for a third influent condition (in FIG. 21C) (with clay variations in media compositions following the setting in Table 1).

FIGS. 22A-C show average ammonia concentrations for individual samples 2.5% iron filing content (10% tire crumb, 2% clay, 85.5% sand by volume), 5% iron filing content (10% tire crumb, 2% clay, 83% sand by volume), 7.5% iron filing content (10% tire crumb, 2% clay, 80.5% sand by volume), and 10.0% clay content (10%/o tire crumb, 2% clay, 78% sand by volume) for influent conditions of 0.3 mg/L phosphate, 0.9 mg/L nitrate (in FIG. 22A); 0.5 mg/L phosphate, 1.3 mg/L nitrate (in FIG. 22B); and 0.7 mg/L phosphate, 1.7 mg/L nitrate (in FIG. 22C).

FIGS. 23A-C show effluent ammonia, total phosphorus, and total nitrogen concentration for iron filing variation for 0.3 mg/L phosphate, 0.9 mg/L nitrate (in FIG. 23A); 0.5 mg/L phosphate, 1.3 mg/L nitrate (in FIG. 23B); and 0.7 mg/L phosphate, 1.7 mg/L nitrate (in FIG. 23C) (with iron filing variations in compositions following the setting in Table 2).

FIGS. 24A-C show effluent iron concentration for 2.5% iron filing content, 5.0% iron filing content, 7.5% iron filing content and 10.0% iron filing content for a first influent condition (in FIG. 24A); for a second influent condition (in FIG. 24B); and for a third influent condition (in FIG. 24C) (with iron filing variations in compositions following the setting in Table 2).

Figure 25:
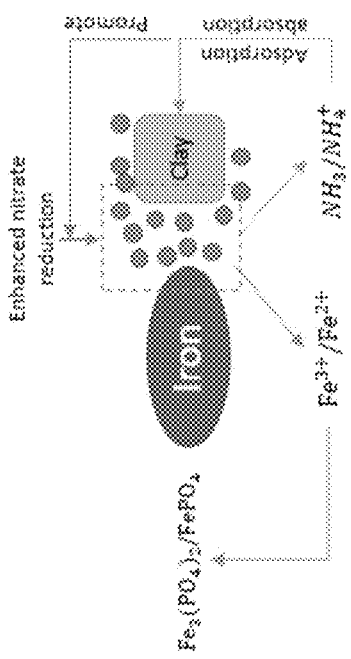

FIG. 25 depicts the interaction of IFGEM-3 components in nutrient removal and recovery.

Figure 26:
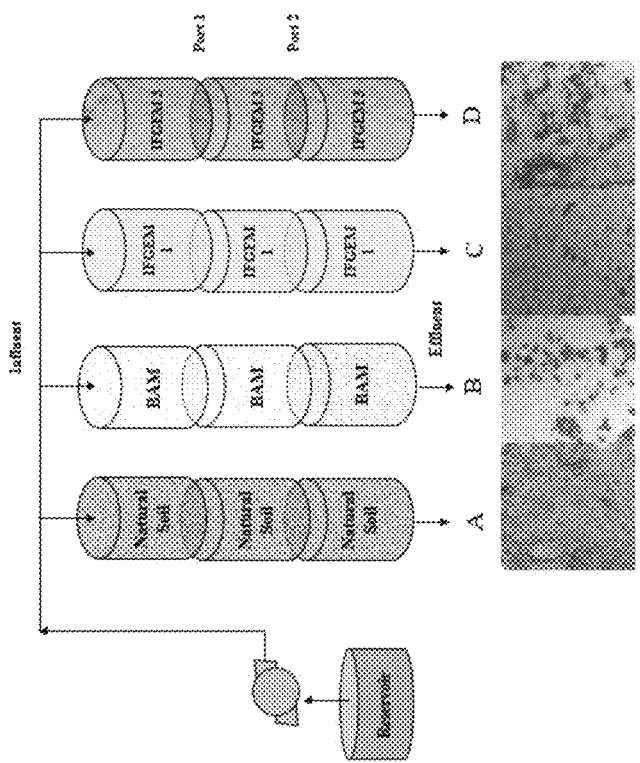

FIG. 26 depicts a column study experimental setup. Columns A, B, C, and D correspond to natural soil, BAM (biosorption activated media), IFGEM-1, and IFGEM-3, respectively.

Figure 27:
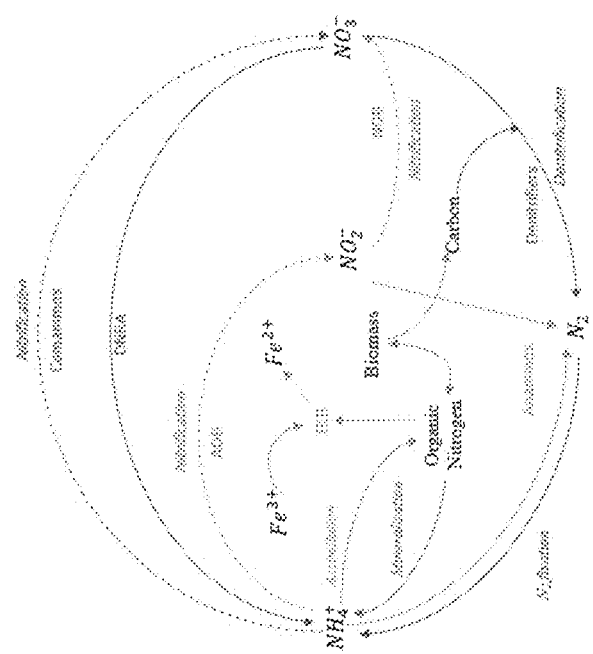

FIG. 27 depicts microbial communities in the nitrogen cycle.

Figure 28:
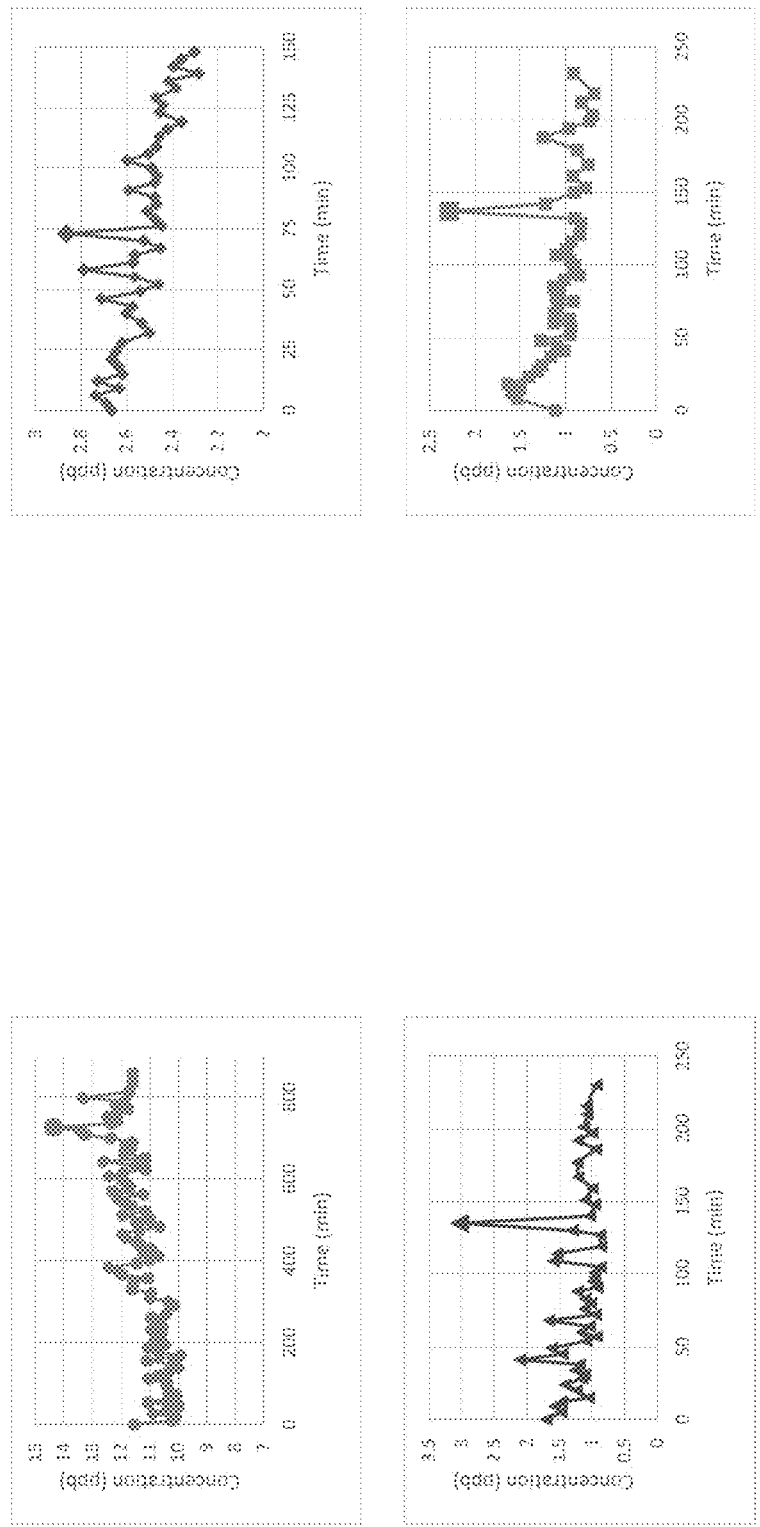

FIG. 28 graphically depicts hydraulic characteristics for (a) natural soil, (b) BAM, (c) IFGEM-1, and (d) IFGEM-3.

Figure 29:
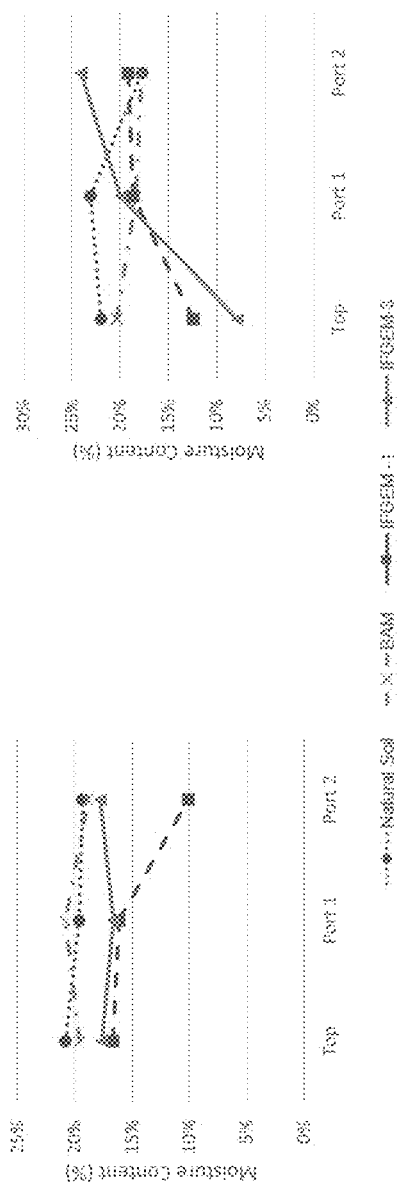

FIG. 29 graphically represents media moisture content at different sample locations (Top, Port 1, and Port 2) in (a) week 2 and (b) week 4.

Figure 30:
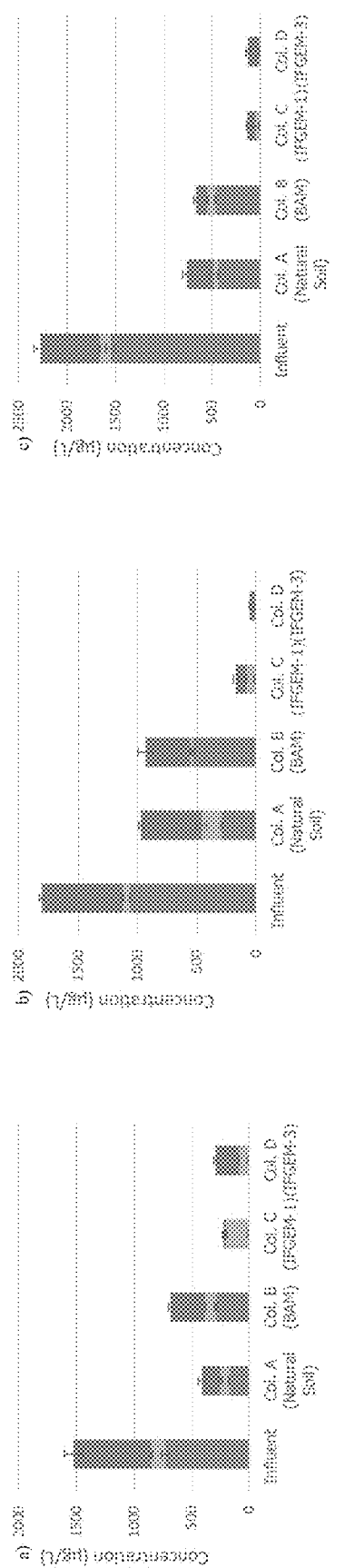

FIG. 30 graphically depicts NOx (nitrate-nitrite), ammonia, and DON (dissolved organic nitrogen) effluent concentrations for (a) influent condition 1 (I1), (b) influent condition 2 (I2), and (c) influent condition 3 (I3).

Figure 31:
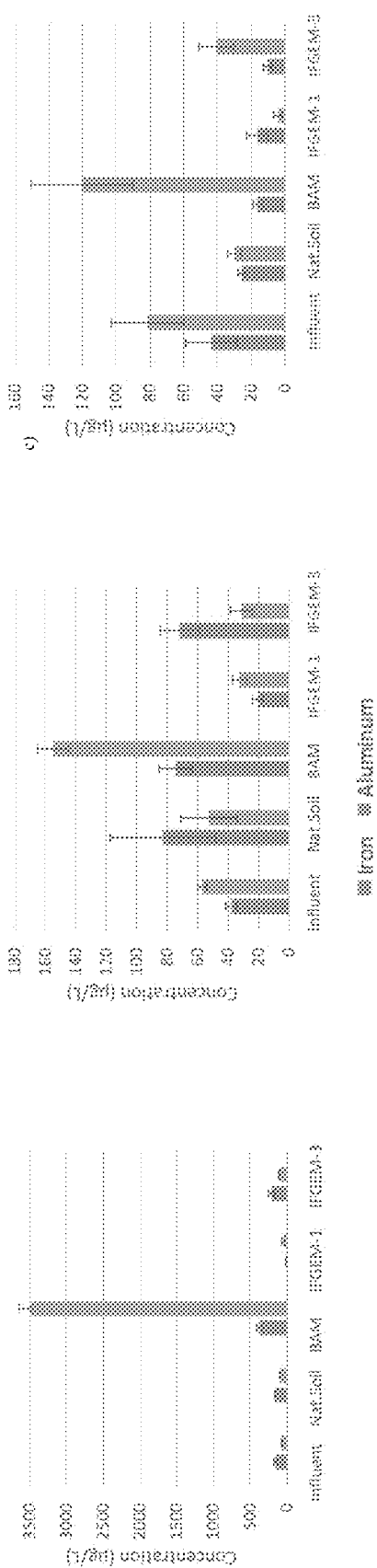

FIG. 31 depicts dissolved iron and aluminum effluent concentrations for (a) influent condition 1 (I1), (b) influent condition 2 (I2), and (c) influent condition 3 (I3).

Figure 32:
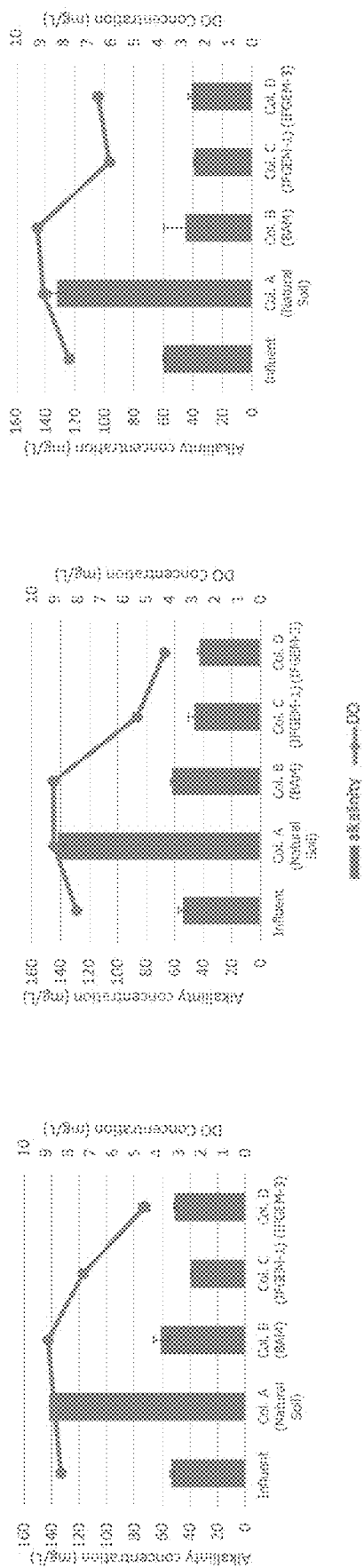

FIG. 32 graphically represents alkalinity and DO measurements from influent to effluent for (a) condition 1 (I1), (b) condition 2 (I2), and (c) condition 3 (I3).

Figure 33:
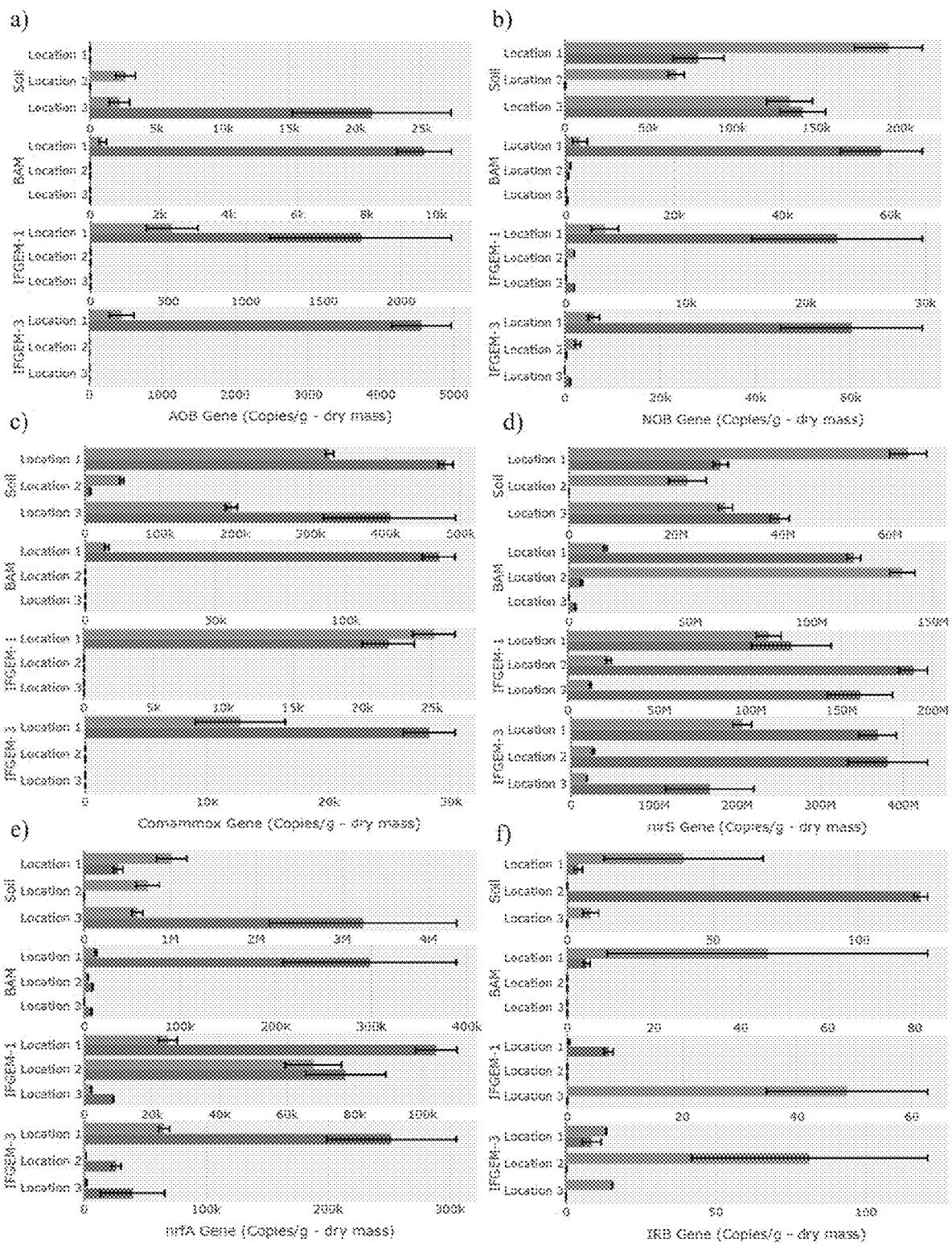

FIG. 33 depicts population density for (a) AOB. (b) NOB (enzyme nxrAB), (c) Comammox (d) denitrifiers (enzyme nirS), (e) DNRA bacteria (enzyme nrfA), (f) IRB (G. metallireducens) in copy/gram for samples collected at week 2 and week 4 of cultivation. Location 1 corresponds to the top section, location 2 corresponds to port 1, and location 3 corresponds to port 2.

Figure 34:
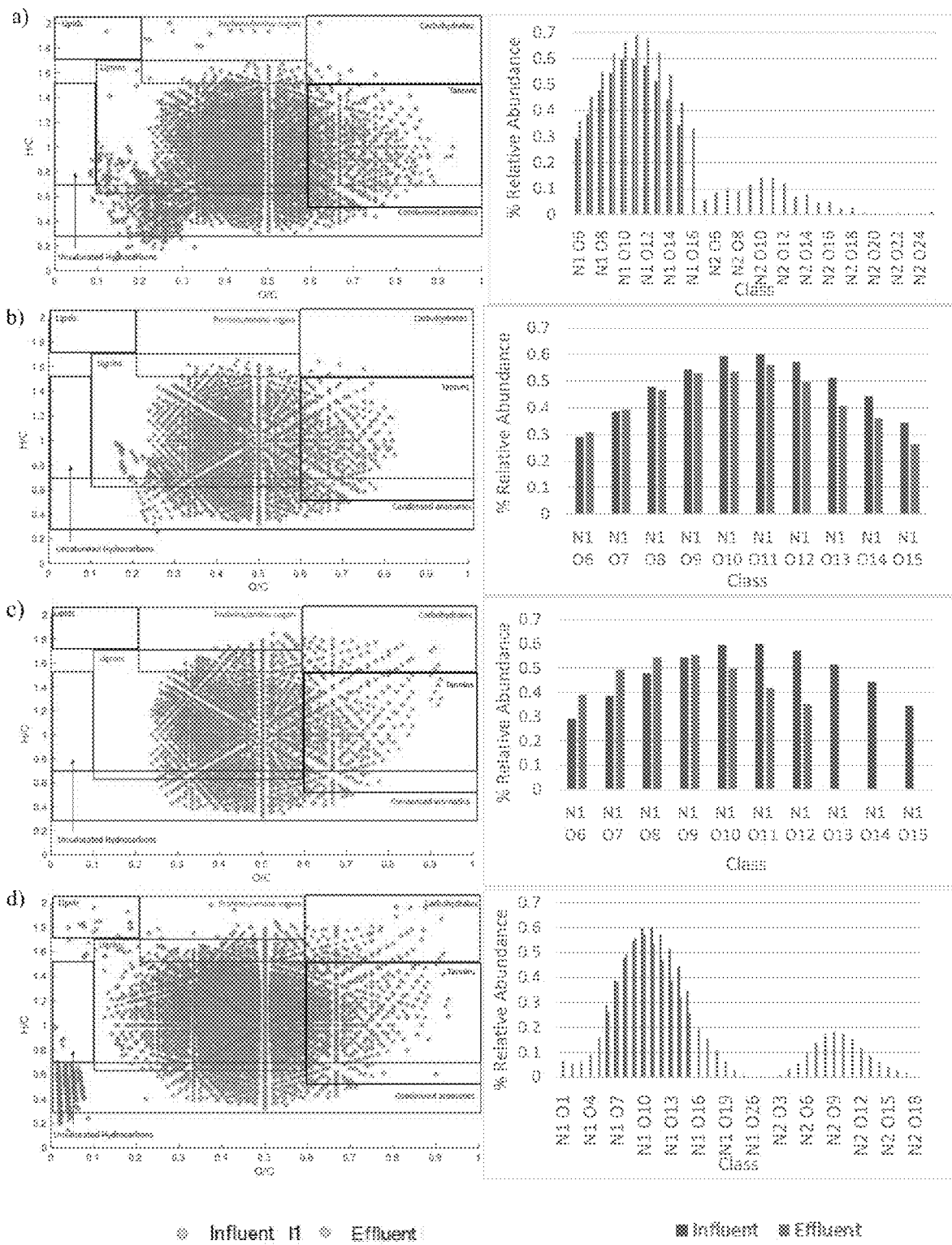

FIG. 34 shows van Krevelen Diagram of DON composition and relative abundance of classes for (a) Natural Soil, (b) BAM, (c) IFGEM-1, and (d) IFGEM-3 for influent condition 1 (I1).

Figure 35:
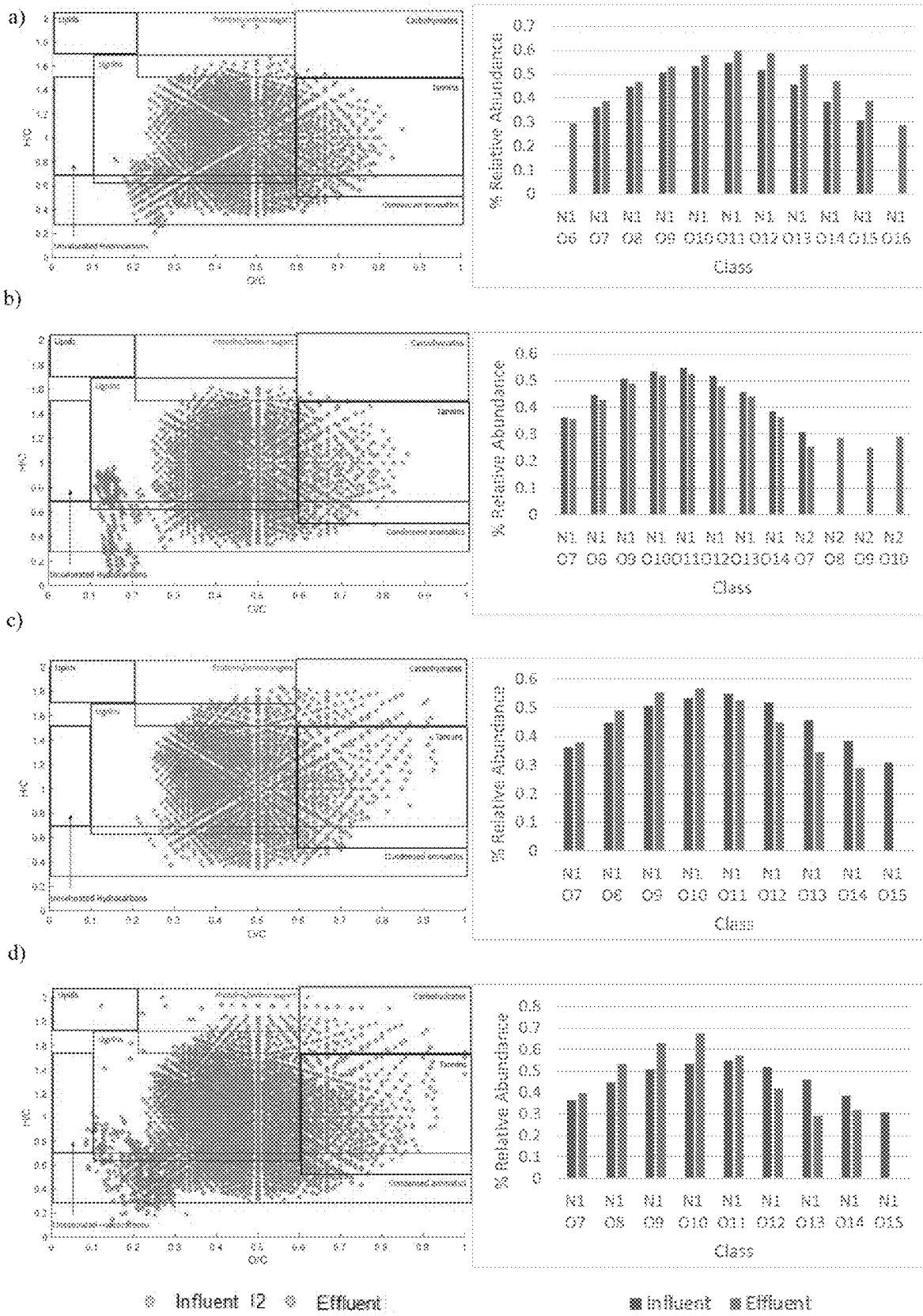

FIG. 35 depicts van Krevelen Diagram of DON composition and relative abundance of classes for (a) Natural Soil, (b) BAM, (c) IFGEM-1, and (d) IFGEM-3 for influent condition 2 (I2).

Figure 36:
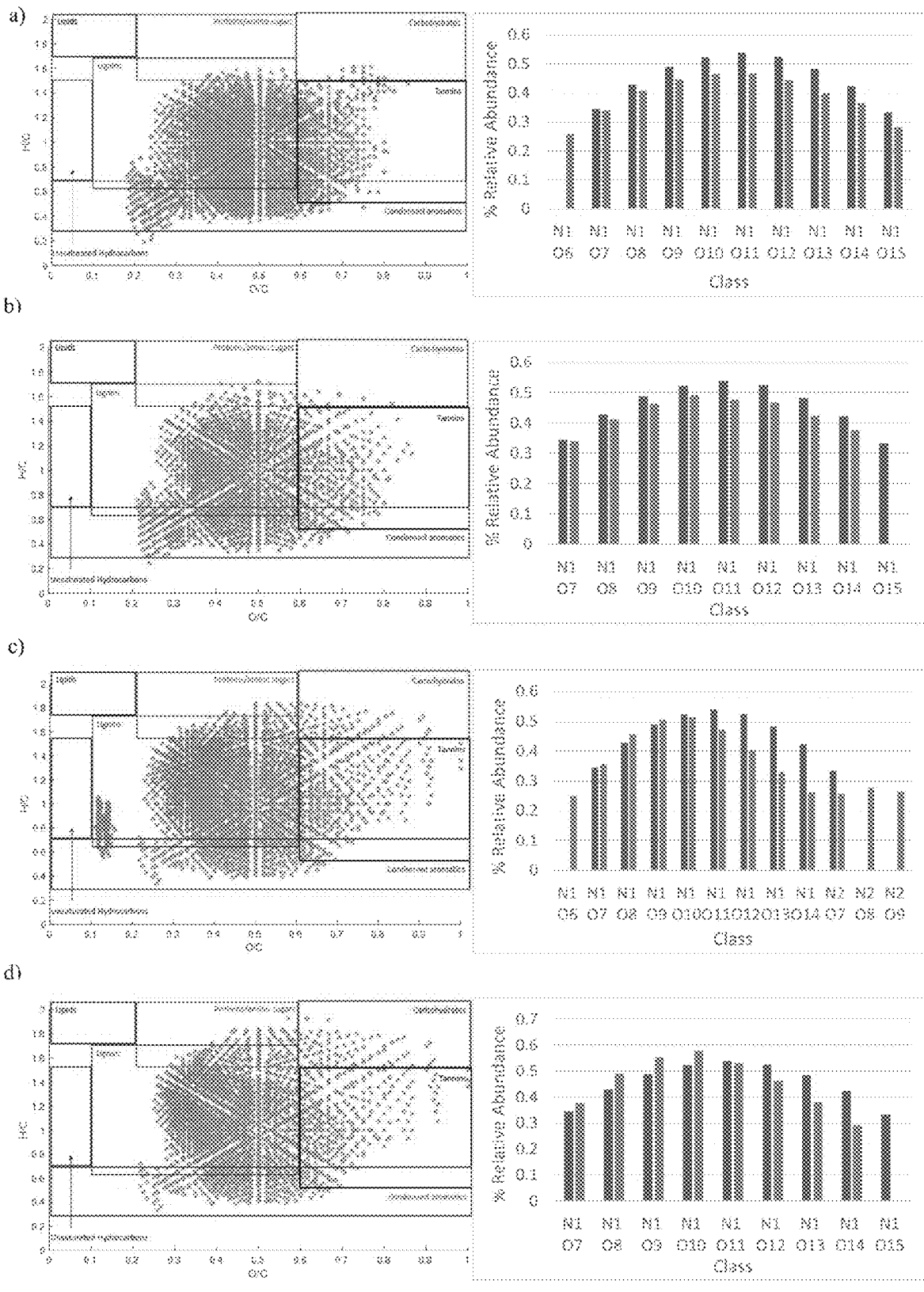

FIG. 36 shows van Krevelen Diagram of DON composition and relative abundance of classes for (a) Natural Soil, (b) BAM, (c) IFGEM-1, and (d) IFGEM-3 for influent condition 3 (I3).

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed IFGEM compositions include iron filings, sand particles comprising primarily silica (by weight), clay particles, and optionally other constituents. The other constituents can comprise recycled materials such as tire crumb, wood sawdust, and paper. The iron filings component is at most 5 vol % of the composition, with a particle size range generally being in the longest direction being primarily from 0.25 mm to 3.38 mm. Atomic iron provides the electron donor for the IFGEM composition. Iron filings grinded from iron is very different from Nanoscale zero valent iron (NZVI) particles in physiochemical properties due to the particle size distribution. It is recognized that NZVI particles cannot be applied in Best Management Practices (BMP) for treating the stormwater runoff because the nanoscale size renders such particles easily washed away.

The sand particles are at most 90 vol % of the composition, generally being in a range from 80 to 90 vol %. The clay particles are at most 5 vol % of the composition, generally being in the range from 2 to 5 vol %. The iron filings are at most 5% vol % of the composition, generally in the range of 3 to 5 vol %.

The iron filings, sand particles, and clay particles are homogenously mixed together so that as noted above an infiltration (treatment) rate through a 30 inches depth of the composition is 0.001 cm/sec to 0.028 cm/sec, generally being 0.003 cm/sec to 0.028 cm/sec. Too high an infiltration rate can result in an insufficient contact time for effective nutrient removal.

Mechanisms are described below that are believed to explain the observed phenomena provided by disclosed IFGEMs. Although the mechanisms described herein are believed to be accurate, disclosed embodiments may be practiced independent of the particular mechanism(s) that may be operable. It is believed that the nitrate ($NO^{-3}$) reduction provided is significant due to the inclusion of elemental iron as an electron donor. Ammonia ($NH_3$) may be produced as a byproduct through nitrate reduction, and phosphate ($PO_4^{-3}$) removal is enhanced due to the generation of ferrous ion, ferric ion and iron oxides.

The clay in the composition together with the iron particles converts nitrite ($NO^{-2}$) to ammonia with the aid of the iron as the electron donor and absorption by the clay, while iron oxide is produced by oxidation of iron particles (to remove dissolved oxygen (DO)) which can also precipitate phosphate, generally as $FePO_4$, at the same time. The infiltration rate of the IFGEM composition (e.g., 0.003 cm/sec to 0.028 cm/sec) may be maintained such that the treatment capacity (gpm) can be maintained over time in a sustainable way without clogging, while both nitrogen and phosphorus can be removed from the water simultaneously.

The iron particles provide electrons in a slow-releasing process that is expected to show reasonable reaction rate and longer life expectancy when compared to known sorption media based on known NZVI particles. The formation of ferrous and ferric ion in the process of nitrate reduction is generally a significant help in phosphorus precipitation due to the production of iron oxides recognized as a good phosphorus adsorbent. Economically speaking, as a kind of recyclable from industry, iron filings is much more affordable than other forms of iron for large-scale BMP implementation.

Disclosed IFGEMs differ from known sorption media in several aspects. Disclosed IFGEMs can be used for phosphorus removal in different DO environments (e.g., 2% to 9% DO in water) and short hydraulic residence time. Disclosed IFGEMs harmonize the simultaneous removal between nitrogen and phosphorus with complementary effect due to the appropriate blending of clay and iron particles. Disclosed IFGEMs after use may be used to recover the ammonia and phosphate for possible reuse as a soil amendment to utilize trapped ammonia and precipitated phosphate in the IFGEMS to be applied to agricultural fields as a soil amendment, if deemed cost effective.

Iron filings are available commercially in a variety of size ranges, or can be generated by crushing or grinding. Any type of grinder can generally be employed for this purpose. The shape of the iron filings is similar to dust being mini-slice in shape. The sand particles generally comprise primarily silica (by volume) usually in the form of quartz. Calcium carbonate may be included in a disclosed composition in a concentration generally at least 2 vol %. The sand particle shape is generally spherical. The sand particles are generally in the size range primarily having a diameter of between 0.074 and 4.75 millimeters.

Clay particles comprise hydrous aluminum phyllosilicates, sometimes with some variable but minor amounts of iron, magnesium, alkali metals, alkaline earths, and other cations which occur naturally with the clay. The clay particles are generally relatively small as compared to the iron and sand particles. The clay particles are generally 0.2 µm to 5 µm in size having a multi-faceted shape.

One particular example disclosed IFGEM composition, referred to herein as IFGEM-2, comprises 80 vol % sand, 10 vol % tire crumb, 5 vol % pure clay, and 5 vol % grinded iron filings. The IFGEM-2 composition is discussed in the Examples section below showing its performance. Excellent performance for nitrate reduction is provided even in varying pH conditions from 2 to 10. Removal and recovery of essentially all generated ammonia, and precipitated phosphorus in neutral, acidic, and basic water is also provided.

Figure 1:
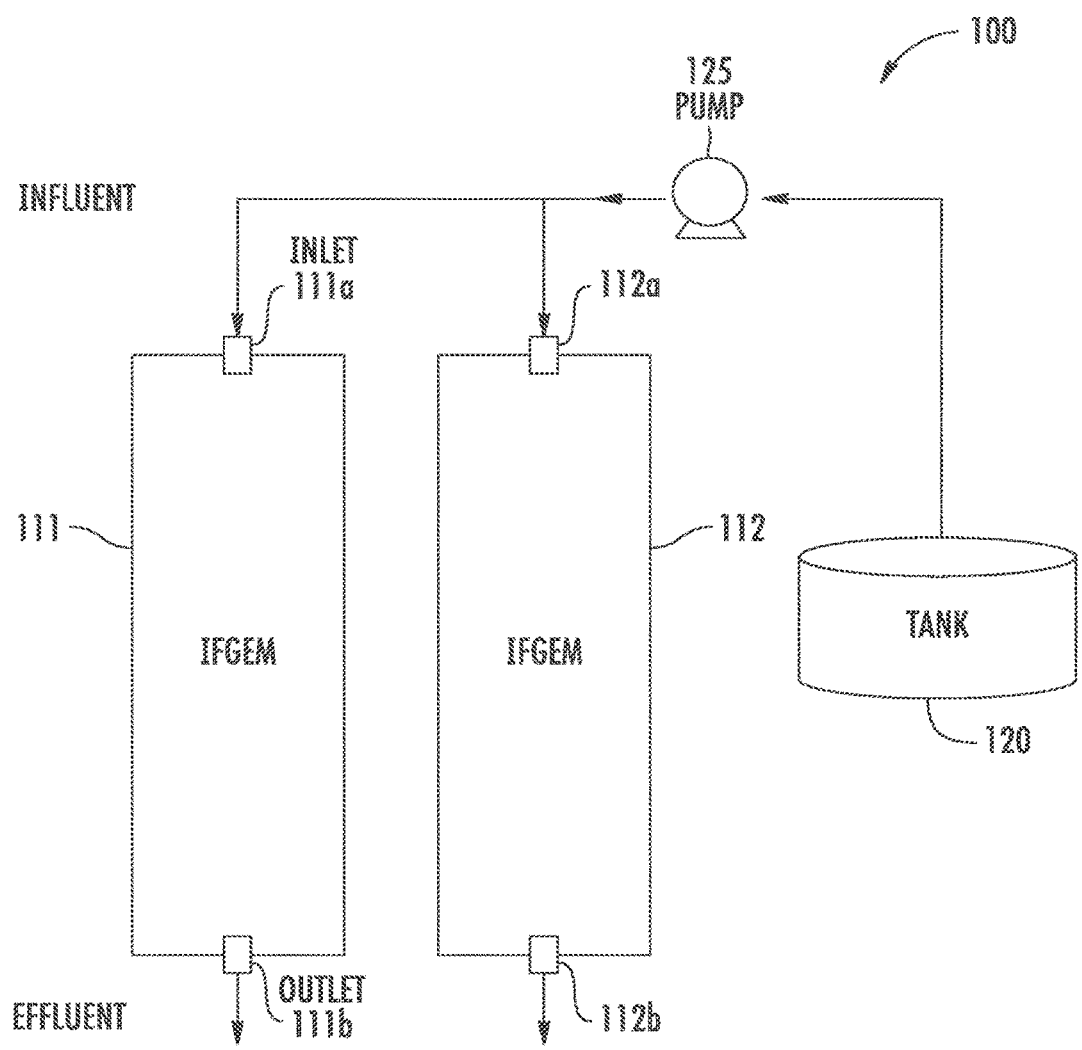
FIG. 1 shows an example simplified water treatment system comprising at least one media chamber having a disclosed IFGEM composition therein.

Disclosed embodiments also include reactors for stormwater treatment systems. FIG. 1 shows a simplified water treatment system 100 for treating water that typically includes significant levels of nitrogen and phosphorus, such as stormwater runoff, wastewater effluent, or agricultural discharge. The water treatment system 100 includes reactors comprising media chamber 111 having an inlet 111a and an outlet 111b, and media chamber 112 having an inlet 112a and an outlet 112b, each having a disclosed IFGEM composition shown therein. A pump 125 is shown pumping water for treatment shown in a tank 120. The system can comprise a few closed tanks, or open permeable ponds. The stormwater treatment system can operate on a 24-hour continuous cycle.

Disclosed embodiments also include a method of water treatment. Water to be treated is flowed through a disclosed IFGEM composition within at least one media chamber. As noted above, the water to be treated can comprise stormwater runoff, wastewater effluent, or agricultural discharge. The composition can comprise the composition iron filings comprising at least 5 volume (vol) % of the composition; sand particles comprising at least 10 vol % of the composition; and clay particles comprising at least 2 vol % of the composition, where the iron filings, sand particles, and clay particles are mixed together. During the flowing the clay particles attract the nitrogen and phosphorus compounds which become absorbed onto a surface of the iron filings and the clay resulting in a removal of the nitrogen and phosphorus compounds and a generation of reaction products. Nitrogen and phosphorus are then recovered from the reaction products.

The composition can further comprise at least one recycled material selected from tire crumb, wood sawdust, and paper. The reaction products generated can comprise ammonia and ferric phosphate/ferrous phosphate. An average size of said clay particles can be less than an average size of the iron filings and an average size of the sand particles, and an average size of the clay particles can be between 0.2 µm and 5 µm. An infiltration rate in a 30-inch depth through the composition can be 0.003 to 0.028 cm/sec. The sand can further comprise at least 2 vol % of calcium carbonate. A porosity of the composition can be 30% to 50%. The nitrogen and phosphorus generated can be utilized as a soil amendment.

Moreover, as noted above the DO content of the water can be 2% to 9%. The method of water treatment can operate in a wide pH range generally from 2 to 10, such as 2 to 7, and in a wide temperature range, such as 4° C. to 35° C.

A related IFGEM referred to as IFGEM-1 lacks clay and has a larger concentration of ammonia in the outflow (effluent) due to the lack of clay while having larger infiltration rate (about 0.028 cm/s) as compared to IFGEM-2 to trigger better phosphorus removal through a precipitation process. IFGEM-1 comprises 96.2 vol % fine sand, and 3.8 vol 0% iron filings. With the presence of clay in IFGEM-2 and related compositions, however, one is able to reuse ammonia absorbed/adsorbed into clay after use as soil amendment at a later time.

IFGEM-1 and IFGEM-2 Examples

Disclosed embodiments of the invention are further illustrated by the following specific Examples, which should not be construed as limiting the scope or content of this Disclosure in any way.

In these Examples, ASTM Standard Practices which are international standards that have been widely accepted and used for many materials, products, and systems are used to determine the particle size distribution, specific gravity, and Brunauer-Emmett-Teller (BET) surface area for disclosed compositions. ASTM D422 was adopted for particle size distribution, ASTMD 854 was applied for specific gravity and micrometrics, and ASAP 2020 was applied for BET surface area. Media mixes were tested with the methods mentioned above by a certified laboratory (EMSL, Inc.). Olympus LEXT OLS 3000 Confocal Scanning Microscope was used to characterize the microstructure changes of media mixes before and after the nutrient adsorption. Experiments were conducted at Advanced Materials Processing and Analysis Center (AMPAC) in University of Central Florida (UCF). The plane resolution can be as high as 0.12 µm, with simultaneous 3D and "true color" image acquisition. The media porosity and infiltration rate were tested in a laboratory at UCF, and the porosity was tested by pouring known volume of water to certain volume of media until the media was fully saturated. The infiltration rate was tested through the constant head method in which the volumetric rate of water added to the ring sufficient to maintain a constant head within the ring is measured, the media depth and cross-section area were documented, as well as the time consumed for a certain volume of water flowed through the media.

Isotherm Study on Individual Nutrient Adsorption

In order to understand the thermodynamic characteristics of disclosed IFGEMs in terms of nutrient adsorption tests were conducted under various pHs. The adsorption isotherm experiment was conducted separately for nitrate and phosphorus in IFGEM-1 and IFGEM-2 with three initial pH values (2, 7, and 10) as an impact factor. Then 30 to 120 g of media mass was prepared in five 500 mL flasks with 300 mL solution of 1.0 mg/L as total nitrate or phosphorus, and the experiment was carried out under room temperature on the rotary shaker with 250 rpm for 1 hour. Then the water sample from each flask was filtered through 0.45-μm membrane filters before the isotherm analysis. The parameters being analyzed are nitrate and ammonia for nitrate isotherm experiment, and total phosphorus for phosphorus isotherm experiment. The Freundlich and Langmuir isotherm equations were adopted to analyze the data. The Freundlich isotherm was obtained by plotting log q versus log C, and the Langmuir isotherm by plotting 1/q versus 1/C. The following two equations shown below as (1) and (2) were applied in this study.

Freundlich Isotherm Equation:

$$\log q_e = \log K_F + \frac{1}{n} \log C_e \quad (1)$$

Langmuir Isotherm Equation:

$$\frac{1}{q_e} = \left(\frac{1}{K_L q_m}\right)\frac{1}{C} + \frac{1}{q_m} \quad (2)$$

where $C_e$ is the aqueous concentration of adsorbate (mg/L), $q_e$ is the sorbed concentration (mass of absorbed adsorbate/mass adsorbent), $q_m$ is the maximum capacity of adsorbent for adsorbate (maximum mass of absorbed adsorbate/mass adsorbent), C is the aqueous concentration of adsorbent (mass/volume), $K_L$ is the Langmuir equilibrium constant, and $K_F$ is a constant indicative of the relative adsorption capacity of the adsorbent ($mg^{1-(1/n)}L^{1/n}g-1$), and n is a constant indicative of the intensity of the adsorption.

Isotherm Study on Competitive Nutrient Adsorption

Singular nutrient specie isotherm study provides fundamental understanding of the specific nutrient absorption characteristics in a batch mode. But competitive absorption widely exists in real storm events as multiple nutrients are in presence. The competitive isotherm absorption study follows exactly the same procedure as the individual nutrient isotherm study with only two exceptions. One is that the solution used in the experiment contains both nitrate and phosphorus in the concentration of 1.0 mg/L for each nutrient, and the other is that only the neutral condition was selected as the initial pH value (pH=7) in this experiment. The absorption results are compared with those counterparts in previous section (i.e., pH=7 scenarios) to retrieve the competitive absorption information when using IFGEM-1 and IFGEM-2.

Kinetic Study

Performance in terms of filtration kinetics refers to the efficiency of the process and the concentration of the resulting effluent, which is important for the field design and BMP applications. A kinetic study for nitrate reduction and phosphorus adsorption in IFGEM was conducted in a continuous mode using a series of column tests. It assumes that the columns are in a steady state in terms of hydraulic condition and nutrient concentration from each section after running them by 3 hours before sampling. The reaction time is recorded as hydraulic retention time (HRT) from each column section. Equation 3 shown below is a general version of the zero, first, second, or higher order rate equations, which was applied to the kinetic study for determining the best fit reaction orders where C is the concentration of nitrate/phosphorus in solution, n is the reaction order, and k is the reaction constant.

$$\frac{dc}{dt} = k[C]^n \quad (3)$$

In a zero-order reaction, the reaction rate is independent of the concentration of reactants. The reaction speed will not change when the reactants' concentration is different. For the first-order reaction, it is a reaction that proceeds at a rate that depends linearly on only one reactant concentration. That is, when the key reactant has a higher concentration, the reaction speed is faster than the lower concentrated case. A second order reaction proceeds at a rate that depends non-linearly on the power of 2 of key reactant's concentration.

Gibbs Energy Change

The Gibbs energy change ($\Delta G^\circ$) is applied in this study to demonstrate the degree of spontaneity of an absorption or reaction process for phosphorus and nitrate removal. Note that absorption is assumed for the calculation of Gibbs energy. A higher negative value is the reflection of a more energetically favorable absorption/reaction while a higher positive value indicates the absorption/reaction trends to proceed to the opposite direction. Based on thermodynamic law and isotherm study, $\Delta G^\circ$ is calculated through following equations (4) and (5).

$$\Delta G^\circ = -RT \ln K_C \quad (4)$$

$$K_C = \frac{q_e M}{C_e V} \quad (5)$$

where $K_C$ is the equilibrium constant without units, T is the absolute temperature in kelvins, M is the mass of absorbent, V is the volume of solution, and R is the gas constant with a value of 8.214 $J \cdot mol^{-1} \cdot K^{-1}$.

Design and Setup of Column Tests

Based on the goals of this study, a series of columns were designed to simulate the possible field conditions with a down-flow strategy which are critical for answering science questions 1 and 4 to address a suite of absorption, adsorption, ion exchange, precipitation and oxidation/reduction reactions between sorption media and nutrients. Four big columns (named from A to D) were constructed with 10 cm (4 inches) in diameter of PVC pipes, and each big column was divided into three equivalent sections (top, middle, and bottom) as in 30.45 cm (1 foot) length of each section for the convenience of water sampling. IFGEM-1 was filled into all three sections of column A. In column B, IFGEM-1 was filled into the top section and BAM (biosorption activated media) was filled into the middle and bottom section. In column C, the natural soil was filled into all three sections as a control column. In column D, IFGEM-2 was filled into all three sections. All four big columns from A to D were attached to a wooden board, and the outlet from one section is the inlet of the following one, and the joints between sections were wrapped with parafilm to eliminate outside impacts.

Distilled water was spiked with nitrate and phosphate standard solutions into three concentration levels (nitrate=0.6, 1.2, 1.8 mg/L; TP=0.3, 0.5, 0.7 mg/L) to simulate the fluctuation of nutrient concentrations in real stormwater runoff, agricultural discharge, or wastewater effluent from a secondary wastewater treatment plant. The columns were flushed with distilled water by a couple times to wash off possible contaminants before and after running the columns under different influent conditions. It was expected that physiochemical reduction/absorption is the main mechanism instead of biological effects for nitrate removal, and the only exception is in column C, which is the control column with natural soil collected from SR35 Basin 2 located in Ocala, Fla. The experiment was conducted at room temperature from 22 to 23° C.

A pair of peristaltic pumps were used to pump the influent water from the reservoir with a fixed flow rate of 8 mL/min, which equals to the infiltration rate of 2.33 in/hr. that was set up for the current column study in the beginning. The HRT and soil moisture from each section were recorded when the flow rate of the effluents can be stabilized after 3 hours' operation. Water samples were collected with triplicates from the reservoir and outlet of each section. The measurements of DO, oxidation reduction potential (ORP), and pH values were conducted right after collection. DO measurement provides information to determine if the treating environment in column is aerobic or anaerobic.

The ORP values provide critical information of the existence and intensity of oxidation or reduction reactions in different section during the column test. The decrement of ORP would indirectly affect the availability of Gibbs free energy to drive the reaction dynamically, which in turn could be influenced by changing pH values. IFGEM samples were collected before and after the experiment for the morphological comparison under confocal microscope. Nitrate concentrations were analyzed through HACH kit TN830, ammonia concentrations were analyzed through HACH kit TN835, and total phosphorus (TP) concentrations were analyzed with HACH Phosphorus (Total) TNT Reagent Set (summarized in Table 1 below). All water samples were analyzed within 24 hours after collection.

TABLE 1

Column study sample quality parameters and methods

| Parameter | Method/instrument | Range |
|---|---|---|
| pH | Waterproof Double Junction PHTESTR® 30 | 0 to +14.0 |
| Dissolved oxygen | HACH HQ40D - IntelliCAL LDO101 LDO | 0.01-20 mg/L |
| ORP | HACH HQ40D - MTC101 | ±1200 mV |
| Soil moisture | EC-5 SMALL SOIL MOISTURE SENSOR | 0-100% |
| Nitrates | Method 10206 | 0.05-13.50 mg/L $NO_3$—N |
| Total phosphorus | DR/800 Method 8190 | 0.06-3.50 mg/L $PO_4$ |
| Ammonia | Method 10205 | 0.015-2.00 mg/L $NH_3$—N |

Overall, this study involves absorption, adsorption, precipitation, ion exchange, and oxidation/reduction reactions. Absorption describes the assimilation of molecular species throughout the bulk of the solid or liquid, such as phosphorus and nitrate absorption to the IFGEM under different pH values. Usually it is not a reversible process when compared with adsorption. Because an adsorption process accumulates molecular species at the surface rather than in the bulk of the solid or liquid, it is usually reversible and temperature sensitive.

Statistical Analysis

In order to figure out if there are significant differences between overall nutrient removal efficiencies over different columns under various influent conditions, a two-way ANOVA analysis was performed with Microsoft Excel packages. This analysis of variance may determine if manipulating the influent concentration and switching to use different sorption media can create significant differences in the nutrient removal. Each ANOVA analysis was considered statistically significant at a confidence interval of 95% ($\alpha$=0.05).

The comparison was made possible in pair of two columns at each time. There are two independent variables, column number and influent concentration, since different columns have different media in it with the impact factor of varying influent concentrations rendering nutrient removal via a triplicate analysis. The p-value results associated with the ANOVA analysis may indicate if there is a significant difference in nutrient removal when the columns or the inlet conditions vary, as well as whether or not there is significant interaction between the two variables. The first null hypothesis $H_0$: the means of nutrients removal grouped by the columns are the same; the second null hypothesis $H_0$: the means of nutrients removal grouped by the inlet conditions are the same; the third null hypothesis $H_0$ means there is no interaction between columns and inlet conditions.

Results

Figure 2:
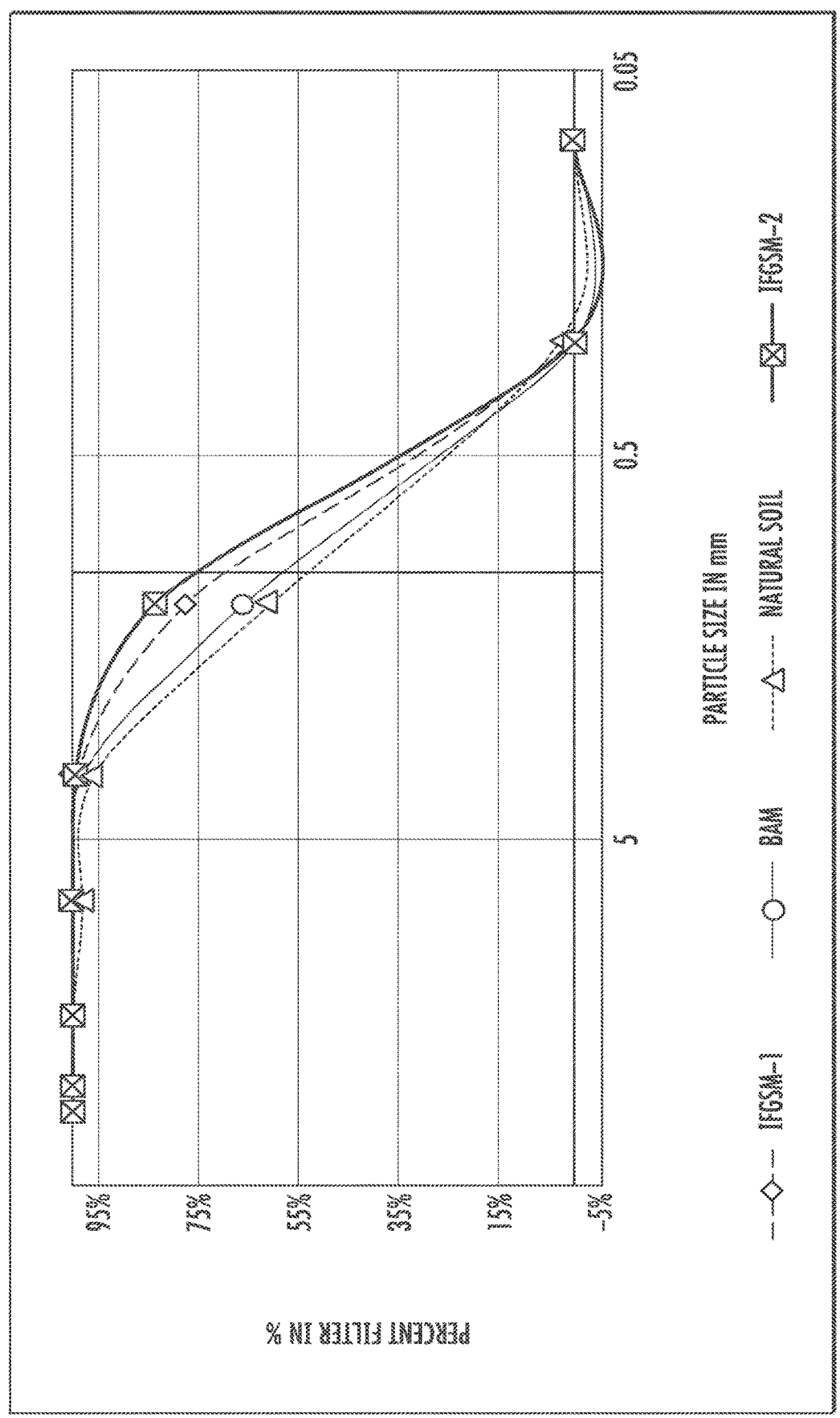
FIG. 2 shows the particle size distribution curves of four media mixtures tested including natural soil and some disclosed IFGEMs.

FIG. 2 shows the particle size distribution curves of the four media mixtures tested including natural soil and disclosed IFGEMs. Two IFGEMs are closer to each other with smaller particle sizes but IFGEM-2 has finer particles than IFGEM-1, while BAM and natural soil are closer to each other with larger particle sizes than IFGEMs. The physical properties of the four media mixtures are shown in Table 2 below. BAM has the lowest density of 1.39 g/cm$^3$ and the density of soil is 2.36 g/cm$^3$, while the density of IFGEM-1 and IFGEM-2 is 2.73 and 2.60 g/cm$^3$, respectively. Significant differences exist when comparing the BET surface area. Natural soil shows the highest value of 9.3712 m$^2$/g. The next one is IFGEM-2 with a value of 1.3963 m$^2$/g. Then BAM and IFGEM-1 follow behind with a value of 0.7059 and 0.3142 m$^2$/g, respectively. In porosity comparison, there are two groups. Whereas IFGEM-1 and IFGEM-2 show similar results as 36.16% and 37.31%, BAM and natural soil exhibit almost the same results as 40.10% and 40.43%. Another obvious difference across the four media mixes comes with the infiltration rate. Natural soil shows the lowest value of 0.003 cm/s, while the values for IFGEM-1, BAM, and IFGEM-2 are 0.028, 0.026, and 0.017 cm/s, respectively.

TABLE 2

Material Characteristics

| | IFGEM-1 | BAM | Natural Soil | IFGEM-2 |
|---|---|---|---|---|
| Density (g/cm$^3$) | 2.73 | 1.39 | 2.36 | 2.60 |
| BET Surface Area (m$^2$/g) | 0.3142 | 0.7059 | 9.3712 | 1.3963 |
| Porosity (%) | 36.16 | 40.10 | 40.43 | 37.31 |
| Infiltration Rate (cm/s) | 0.028 | 0.026 | 0.003 | 0.017 |

Morphological Changes

The pre-treatment and post-treatment morphological images of IFGEM-1 and IFGEM-2 were obtained. The iron filings pieces were observed clearly before the treatment for both IFGEM recipes. Before treatment, the two main features of IFGEM-2 are the existence of tire crumb and the sand particle size is smaller as compared against the media mix of IFGEM-1. After treatment, the very first difference is the color, and both IFGEM-1 and IFGEM-2 tend to turn brown. In addition to the color changes, the iron particles cannot be observed by naked eye after treatment since it was coated by its surrounding materials. When coated iron was exposed during the experimentation, it revealed that the size of the iron particles largely decreased as it was dissolved during the oxidation process.

pH Impacts on Phosphorus and Nitrate Absorption

Figure 3A:
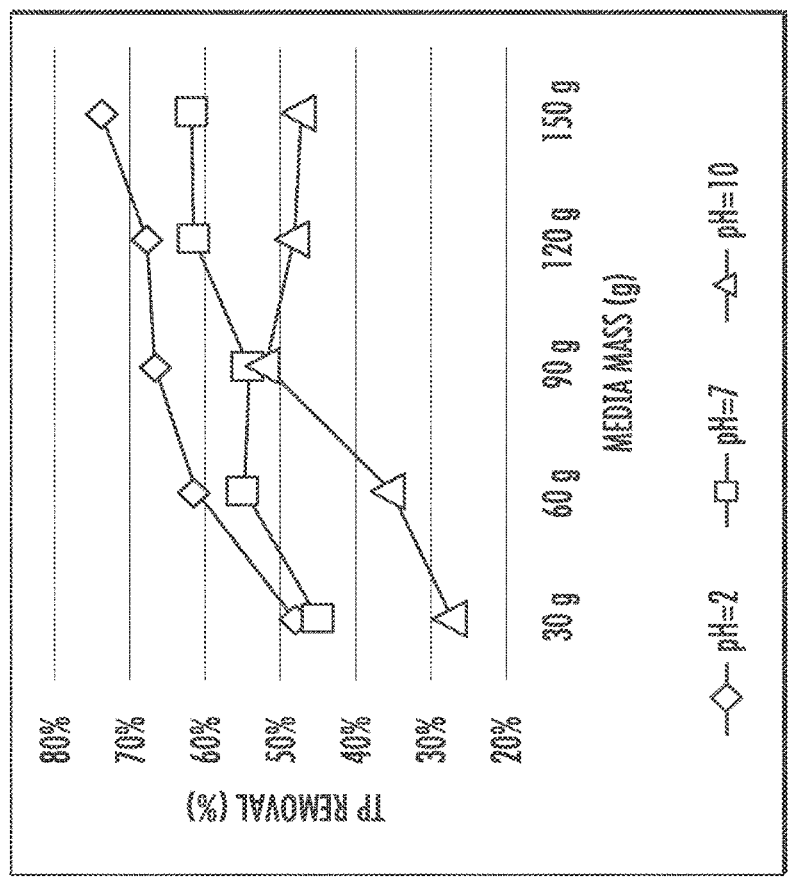
FIG. 3A shows isotherm study results of IFGEM-1 for phosphate absorption under three initial pH conditions.
Figure 3B:
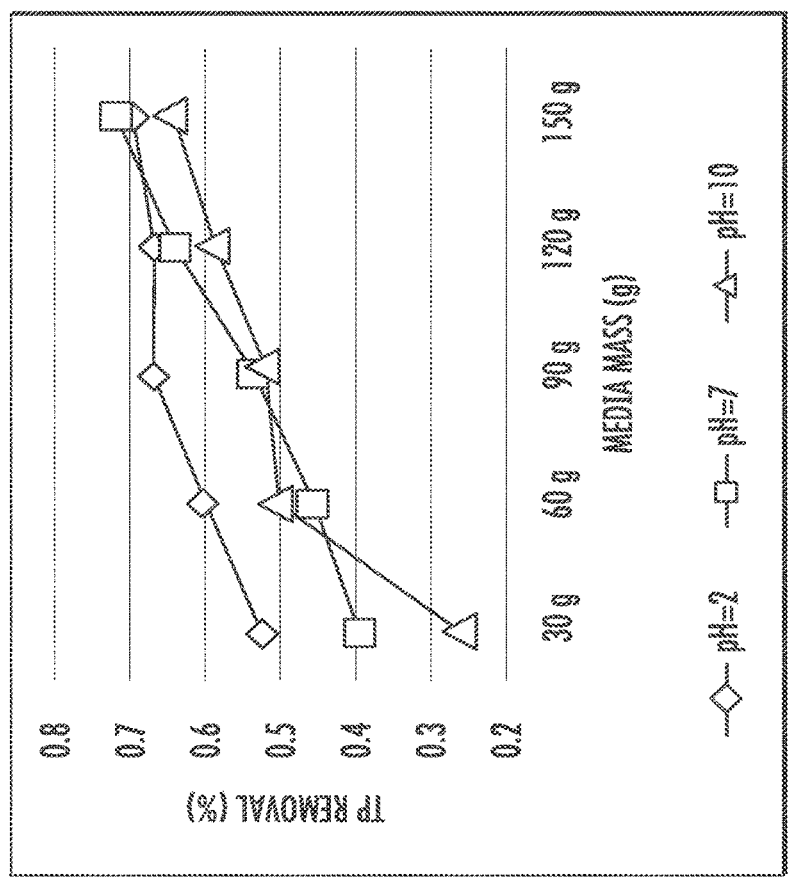
FIG. 3B shows isotherm study results of IFGEM-2 for phosphate absorption under three initial pH conditions.

FIGS. 3A and 3B show isotherm study results for IFGEM-1 and IFGEM-2 for phosphate adsorption under three initial pH conditions. The lower the pH value is, the more phosphorus can be absorbed by both IFGEMs. However, the impacts from the enhancement of pH is more significantly observed in IFGEM-1 rather than IFGEM-2. The Langmuir and Freundlich isotherm equation parameters of IFGEM-1 and IFGEM-2 are shown from Table 3 to Table 6 below. As most $1/q_m$ values are negative in Langmuir equation, it is inappropriate to apply for the calculation of maximum absorption capacity ($q_m$). The Freundlich relative absorption capacity is selected from Table 4 and Table 6. The phosphorus absorption capacity of IFGEM-1 and IFGEM-2 exhibits a higher level in acidic solutions. When the pH value increases from 2 to 10, both IFGEM-1 and IFGEM-2 tend to lose part of their absorption capacity.

TABLE 3

Phosphorus Absorption Parameters of the Langmuir isotherm for IFGEM-1 and -2 under various pH conditions

| pH value | IFGEM recipes | Isotherm equation for Langmuir | R-square value | $1/(q_m K_{ads})$ | $1/q_m$ (mg/g) |
|---|---|---|---|---|---|
| 2 | IFGEM-1 | y = 259.09x − 305.7 | 0.9336 | 259.09 | −305.7 |
|   | IFGEM-2 | y = 409.28x − 700.71 | 0.9145 | 409.28 | −700.71 |
| 7 | IFGEM-1 | y = 628.74x − 938.59 | 0.8352 | 628.74 | −938.59 |
|   | IFGEM-2 | y = 190.75x + 52.554 | 0.7635 | 190.75 | 52.554 |
| 10 | IFGEM-1 | y = 765.92x − 681.48 | 0.7014 | 765.92 | −681.48 |
|    | IFGEM-2 | y = 268.13x − 20.922 | 0.7951 | 268.13 | −20.922 |

$x = 1/C_e$; $y = 1/q_e$. Where $C_e$ is the aqueous concentration of phosphorus (mg/L), $q_e$ is the phosphorus concentration sorbed on the media (mg/g).

TABLE 4

Phosphorus Absorption Parameters of the Freundlich isotherm for IFGEM-1 and -2 under various pH conditions

| pH value | IFGEM recipes | Isotherm equation for Freundlich | R-square value | 1/n | Log K | K ($mg_{1-(1/n)} L_{1/n} g_{-1}$) |
|---|---|---|---|---|---|---|
| 2 | IFGEM-1 | y' = 1.7809x' − 1.8089 | 0.9564 | 1.7809 | −1.8089 | 0.0155 |
|   | IFGEM-2 | y' = 50.563x' − 0.5833 | 0.9534 | 50.563 | −0.5833 | 0.2610 |
| 7 | IFGEM-1 | y' = 3.1346x' − 1.5403 | 0.86 | 3.1346 | −1.5403 | 0.0288 |
|   | IFGEM-2 | y' = 1.0972x' − 2.2837 | 0.7342 | 1.0972 | −2.2837 | 0.0052 |
| 10 | IFGEM-1 | y' = 2.1192x' − 2.2866 | 0.7799 | 2.1192 | −2.2866 | 0.0052 |
|    | IFGEM-2 | y' = 0.9594x' − 2.4206 | 0.7306 | 0.9594 | −2.4206 | 0.0038 |

$x' = \log(C_e)$; $y' = \log(q_e)$. Where $C_e$ is the aqueous concentration of phosphorus (mg/L), $q_e$ is the phosphorus concentration sorbed on the media (mg/g).

TABLE 5

Nitrate absorption parameters of the Langmuir isotherm for IFGEM-1 and -2 under various pH conditions

| pH value | IFGEM recipes | Isotherm equation for Langmuir | R-square value | $1/(q_m K_{ads})$ | $1/q_m$ (mg/g) |
|---|---|---|---|---|---|
| 2 | IFGEM-1 | y = 7554.6x − 7966.9 | 0.5281 | 7554.6 | −7966.9 |
|   | IFGEM-2 | y = 5358.5x − 4598.6 | 0.2117 | 5358.5 | −4598.6 |
| 7 | IFGEM-1 | y = 3754.5x − 4216.4 | 0.7158 | 3754.5 | −4216.4 |
|   | IFGEM-2 | y = 4924.3x − 4456.2 | 0.1362 | 4924.3 | −4456.2 |
| 10 | IFGEM-1 | y = 8491.2x − 8153.6 | 0.3644 | 8491.2 | −8153.6 |
|    | IFGEM-2 | y = 15821x − 15443 | 0.5845 | 15821 | −15443 |

$x = 1/C_e$; $y = 1/q_e$. Where $C_e$ is the aqueous concentration of nitrate (mg/L), $q_e$ is the nitrate concentration sorbed on the media (mg/g).

TABLE 6

Nitrate absorption parameters of the Freundlich isotherm for IFGEM-1 and -2 under various pH conditions

| pH value | IFGEM recipes | Isotherm equation for Freundlich | R-square value | 1/n | Log K | K ($mg_{1-(1/n)} L_{1/n} g_{-1}$) |
|---|---|---|---|---|---|---|
| 2 | IFGEM-1 | y' = 9.5316x' − 2.2419 | 0.5691 | 9.5316 | −2.2419 | 0.0057 |
|   | IFGEM-2 | y' = 5.9821x' − 2.8225 | 0.2768 | 5.9821 | −2.8225 | 0.0015 |
| 7 | IFGEM-1 | y' = 7.3878x' − 1.9373 | 0.8565 | 7.3878 | −1.9373 | 0.0116 |
|   | IFGEM-2 | y' = 7.7666x' − 3.2904 | 0.0538 | 7.7666 | −3.2904 | 0.0005 |
| 10 | IFGEM-1 | y' = 12.039x' − 2.558 | 0.5470 | 12.039 | −2.558 | 0.0028 |
|    | IFGEM-2 | y' = 11.872x' − 2.7809 | 0.5542 | 11.872 | −2.7809 | 0.0017 |

$x' = \log(C_e)$; $y' = \log(q_e)$. Where $C_e$ is the aqueous concentration of nitrate (mg/L), $q_e$ is the nitrate concentration sorbed on the media (mg/g).

FIGS. 4A and 4B show isotherm study results of IFGEM-1 and IFGEM-2, respectively, for nitrate reduction under three initial pH conditions as well as the corresponding ammonia generation. For IFGEM-1, the best removal achieved when the initial pH=7, the ammonia generation is also optimized under neutral pH, on the contrary, both nitrate removal and ammonia generation would decrease when the initial pH is off neutral. For IFGEM-2, the best nitrate removal happened when the initial pH=2, with higher ammonia generation under most scenarios. When the pH increases, nitrate removal and ammonia generation also decrease. The Langmuir and Freundlich isotherm equation parameters of IFGEM-1 and IFGEM-2 are shown in Table 5 and Table 6. As most $1/q_m$ values are negative in Langmuir equation, it is inappropriate to apply for the calculation of maximum absorption capacity ($q_m$). Accordingly, the Freundlich relative absorption capacity is selected from Table 7.

Competitive Absorption

Figure 5B:
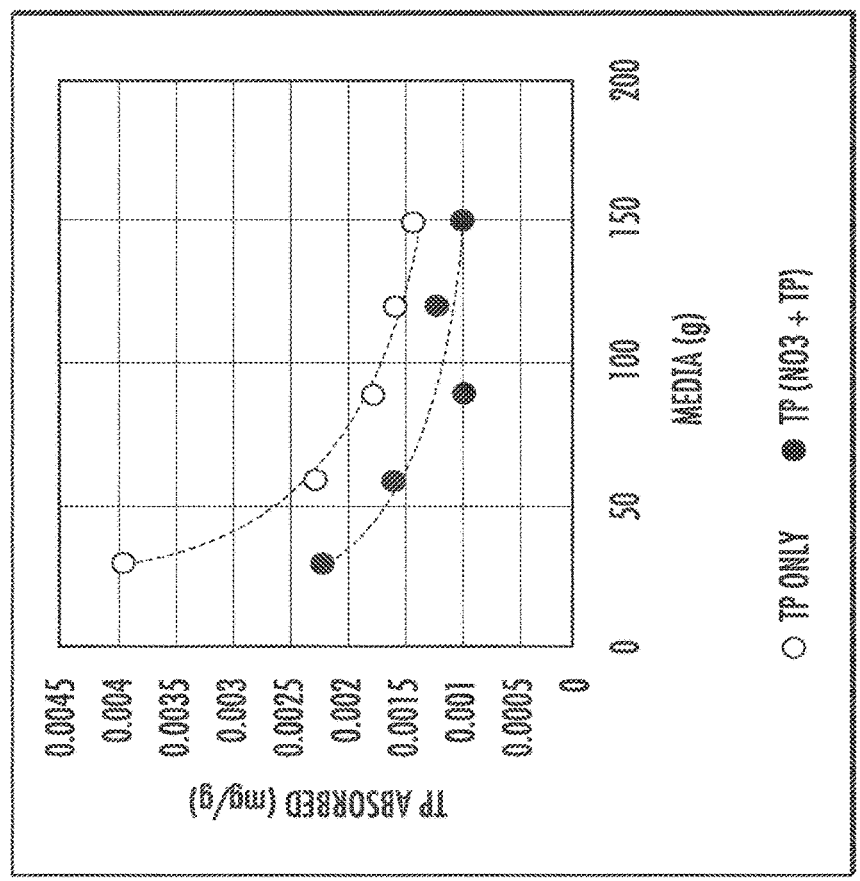
FIG. 5B shows phosphorus results for IFGEM-2.
Figure 5A:
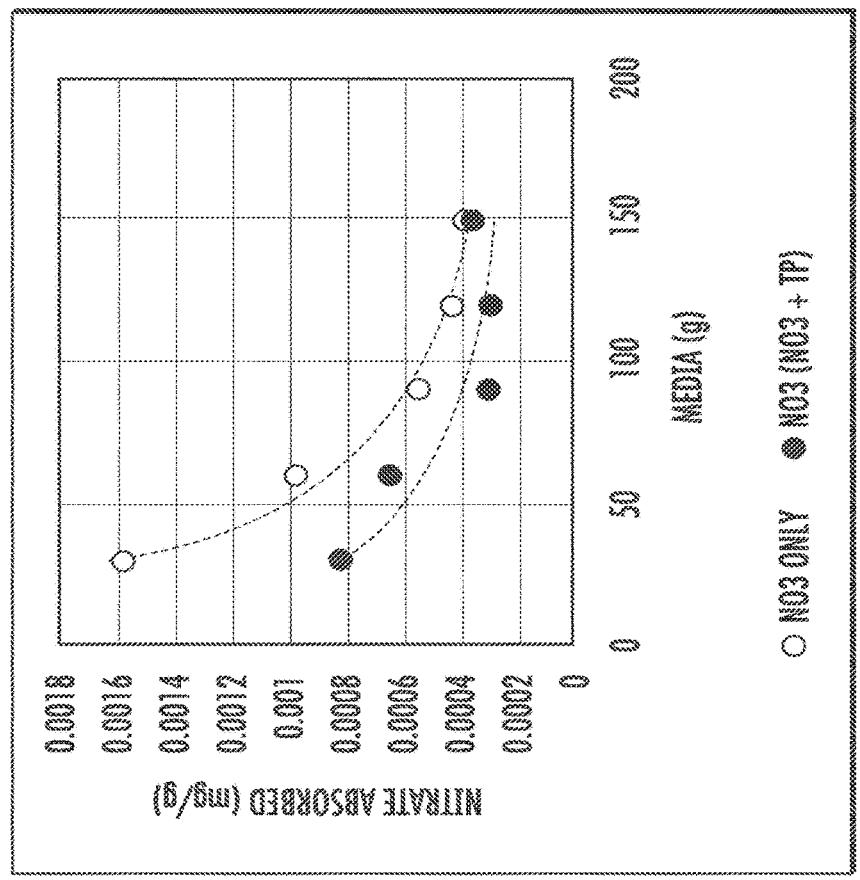
FIG. 5A shows nitrate results for IFGEM-2.

The study of competitive absorption between nitrate and phosphorus was performed when the concentrations of each nutrient are equivalent (~1 mg/L) and co-exist in the solution. FIGS. 5A and 5B show nitrate and phosphorus (shown as TP) results for IFGEM-2. The competitive absorption effects between the two nutrient species are confirmed. For IFGEM-2, the average nitrate and phosphorus absorption on unit mass of media decreased by 32.88% and 33.33%, respectively.

Absorption Spontaneity

The changes of Gibbs free energy are quantified to examine the spontaneity of absorption/reaction for nutrients removal in IFGEM-1 and IFGEM-2 under room temperature (~22 to 23° C.). The values of Gibbs free energy from the isotherm study were calculated through equations 4 and 5 and shown in Table 7 and Table 8 (described below). Both IFGEMs tend to enhance the absorption/reaction spontaneity when the applied media mass increases for nitrate and phosphorus removal. In IFGEM-1, the nitrate removal/reduction is more likely to happen in neutral pH value, while the acidic and basic initial conditions would require more energy to initiate the reaction. For phosphorus absorption, the absorption spontaneity increases with the decrement of pH value. For IFGEM-2, nitrate removal/reduction is less spontaneously since it requires more energy to initiate the reaction under all pH levels. Nevertheless, the phosphorus removal achieved strong spontaneity under acidic conditions than neutral or basic conditions.

TABLE 7

The change of Gibbs free energy (J/mole) with various media mass and pH values under room temperature in IFGEM-1

| Initial pH | Nutrients | 30 g | 60 g | 90 g | 120 g | 150 g |
|---|---|---|---|---|---|---|
| 2 | Nitrate | 3448.03 | 3371.85 | 2979.88 | 2395.71 | 2752.66 |
|   | Phosphorus | 235.35 | −1127.85 | −1749.45 | −1864.35 | −2558.38 |
| 7 | Nitrate | 2642.86 | 2050.91 | 1569.03 | 1409.63 | 1559.18 |
|   | Phosphorus | 505.69 | −505.69 | −404.04 | −1163.29 | −1198.84 |
| 10 | Nitrate | 3465.86 | 3080.30 | 2536.31 | 2707.32 | 2839.55 |
|   | Phosphorus | 2387.38 | 1488.06 | 134.41 | 168.04 | 67.19 |

TABLE 8

The change of Gibbs free energy (J/mole) with various media mass and pH under room temperature in IFGEM-2

| Initial pH | Nutrients | 30 g | 60 g | 90 g | 120 g | 150 g |
|---|---|---|---|---|---|---|
| 2 | Nitrate | 4003.15 | 3908.96 | 3697.92 | 2667.20 | 5009.01 |
|   | Phosphorus | −249.63 | −1063.71 | −1749.07 | −1749.07 | −2096.16 |
| 7 | Nitrate | 4446.88 | 3817.29 | 4288.10 | 4177.18 | 3819.85 |
|   | Phosphorus | 2184.32 | 1716.06 | 1424.94 | 968.05 | 603.72 |
| 10 | Nitrate | 4750.35 | 4385.02 | 4546.80 | 3690.56 | 3695.60 |
|   | Phosphorus | 2555.43 | −111.89 | −175.88 | −921.54 | −1569.06 |

Column Tests

Column study is the only study that actually tries to mimic the real-world condition. The important parameters of pH, DO, and the oxidation-reduction potential (ORP) from the inlets and each sampling port of the columns can be summarized in Table 9. In general, the ORP values decreased at the top section, then slightly increased at the middle section and decreased again at the bottom section in column over the columns B and C. However, it shows a straight decline of the ORP values over sections for column D for most time. The similar trend happens to the DO test for column D. Obvious DO decrement occurred in column A and D, slightly DO increment occurred in column B and C. For pH changes, column A and D exhibit continuously increment of pH through each section, while column B tends to increase pH at the top section and keeps a lower pH for the rest. Column C shows steady pH values across three sections. Column A and the first section of column B showed lower moisture content that usually less than 20%. However, the rest media has much higher moisture content, and the average moisture content is 35.50%, 35.66%, and 39.33% for BAM, IFGEM-2, and natural soil, respectively.

duced. It is noticeable that the ammonia concentration of the treated effluent is 7 to 23 times higher than that of the influent values from the column A test. Even though the first section of column D generates significant amount of ammonia, the treated effluent at the outlet shows negligible ammonia level. This is strong evidence that IFGEM-2 in the middle and lower sections adsorbed most of the ammonia being produced in the first section.

Phosphorus Removal

When the inlet TP=0.3 mg/L, the overall TP removal was 54.46% and 45.54%, respectively, for column A and D. When the inlet TP concentration became 0.5 mg/L, the overall TP removal is 71.90% and 26.14%, respectively, for column A and D. When the inlet TP increased to 0.7 mg/L, the overall TP removal changed to 82.53% and 62.45%%, respectively, for column A and D. For column B, the first section showed similar removal effects as column A; but the following two sections exhibited negative removal of TP under concentration level 1 and 2 (−168.32% and −29.41%), then a much higher TP removal as 59.39% was achieved under concentration level 3 However, when it came to column C, the TP removal was mostly negative or negligible.

TABLE 9

Average ORP, DO, and pH values in the column study

| Column | Port | Inlet = 0.6 mg/L nitrate | | | Inlet = 1.2 mg/L nitrate | | | Inlet = 1.8 mg/L nitrate | | |
|---|---|---|---|---|---|---|---|---|---|---|
| | | ORP | DO | pH | ORP | DO | pH | ORP | DO | pH |
| | inlet | 327.50 | 8.76 | 6.98 | 316.40 | 7.58 | 7.10 | 320.17 | 8.35 | 6.76 |
| A | Port 1 | 154.57 | 7.99 | 8.34 | 232.77 | 8.24 | 8.14 | 180.53 | 6.86 | 8.52 |
| | Port 2 | 214.43 | 7.41 | 8.26 | 237.93 | 7.64 | 8.05 | 244.20 | 8.43 | 7.88 |
| | Outlet | 122.37 | 6.09 | 8.85 | 184.30 | 6.52 | 8.89 | 201.43 | 6.64 | 8.82 |
| B | Port 1 | 117.53 | 8.21 | 9.67 | 165.70 | 8.51 | 9.37 | 99.53 | 7.01 | 9.44 |
| | Port 2 | 243.33 | 8.57 | 8.00 | 256.87 | 8.59 | 7.87 | 240.23 | 8.52 | 7.85 |
| | Outlet | 235.07 | 8.26 | 7.96 | 265.03 | 8.64 | 7.99 | 296.27 | 8.07 | 7.81 |
| C | Port 1 | 245.37 | 8.85 | 8.33 | 213.60 | 8.63 | 8.42 | 221.93 | 8.76 | 8.44 |
| | Port 2 | 240.20 | 8.85 | 8.26 | 219.83 | 8.60 | 8.38 | 247.63 | 8.84 | 8.28 |
| | Outlet | 246.17 | 8.74 | 8.23 | 253.93 | 8.92 | 8.33 | 257.60 | 8.86 | 8.30 |
| D | Port 1 | 246.83 | 8.54 | 8.08 | 268.80 | 7.79 | 7.67 | 271.23 | 8.32 | 7.59 |
| | Port 2 | −61.40 | 7.10 | 8.69 | 97.23 | 7.76 | 8.07 | 57.23 | 8.01 | 8.20 |
| | Outlet | −102.90 | 4.98 | 7.77 | 56.97 | 5.28 | 8.47 | 0.03 | 7.01 | 8.39 |

Nitrate Removal and Ammonia Generation

Figure 6:
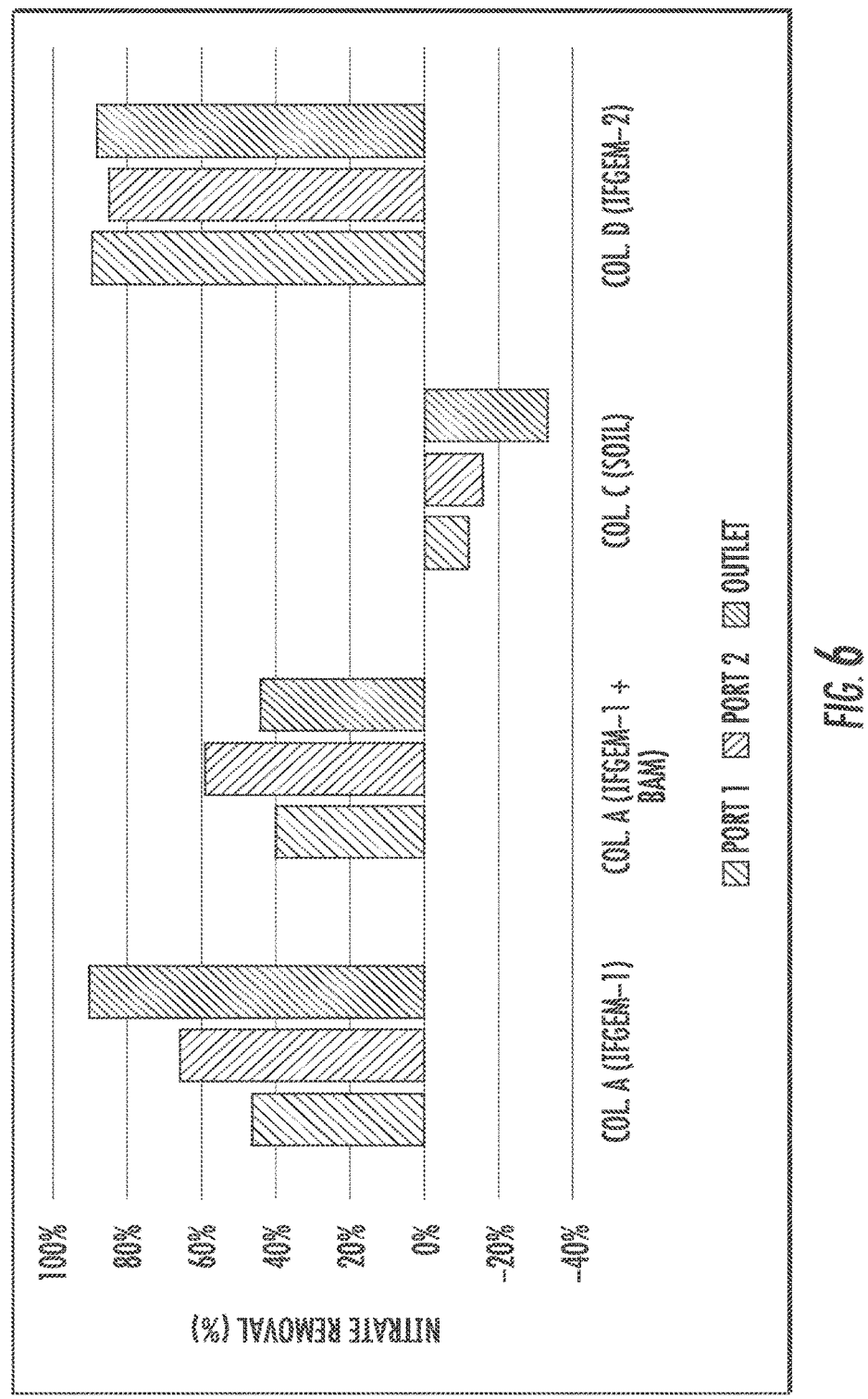
FIG. 6 shows the cumulative nitrate removal at each sampling port of the columns shown given a level 1 influent nitrate concentration.
Figure 7:
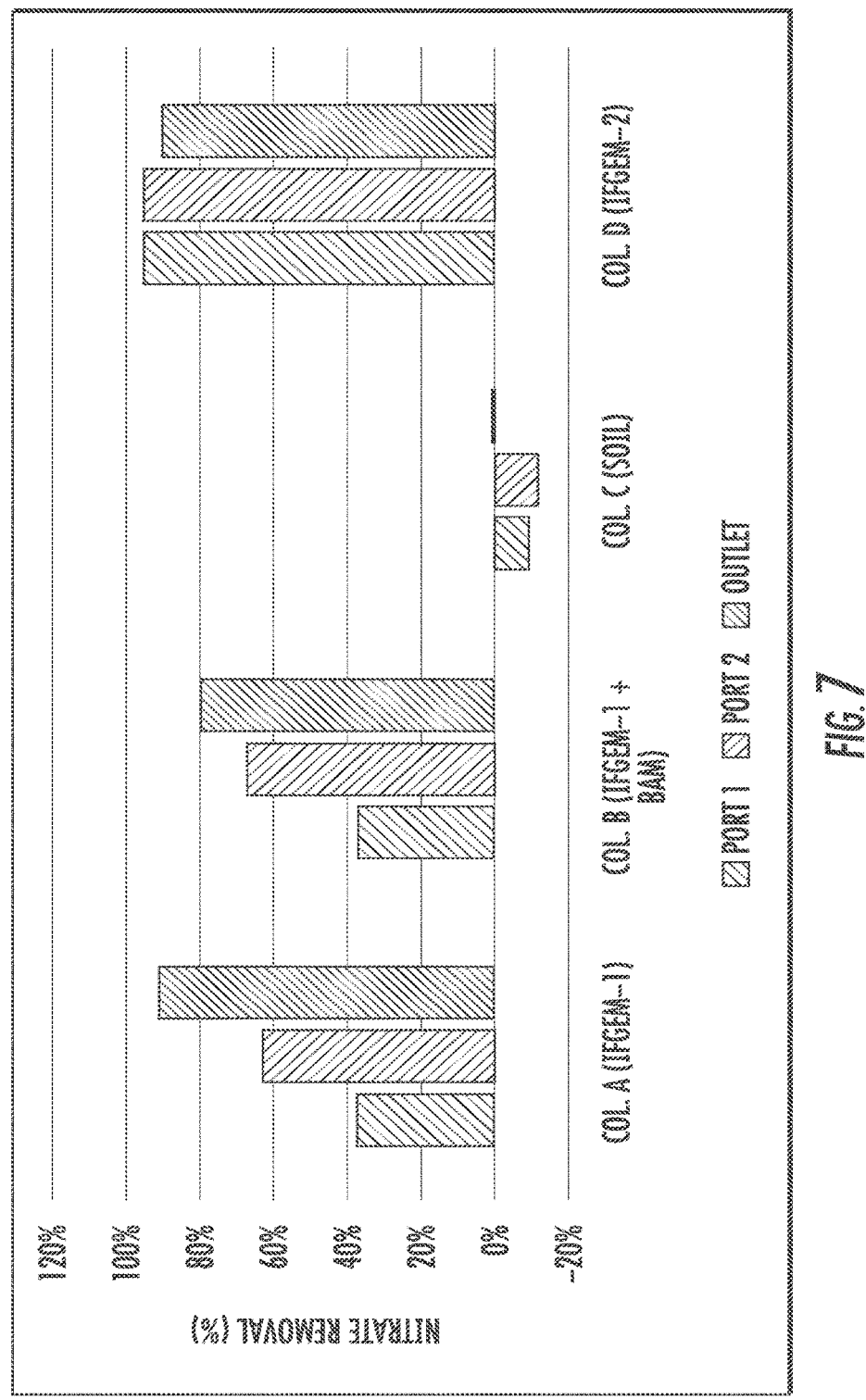
FIG. 7 shows the cumulative nitrate removal at each sampling port of the columns shown given a level 2 influent nitrate concentration.
Figure 8:
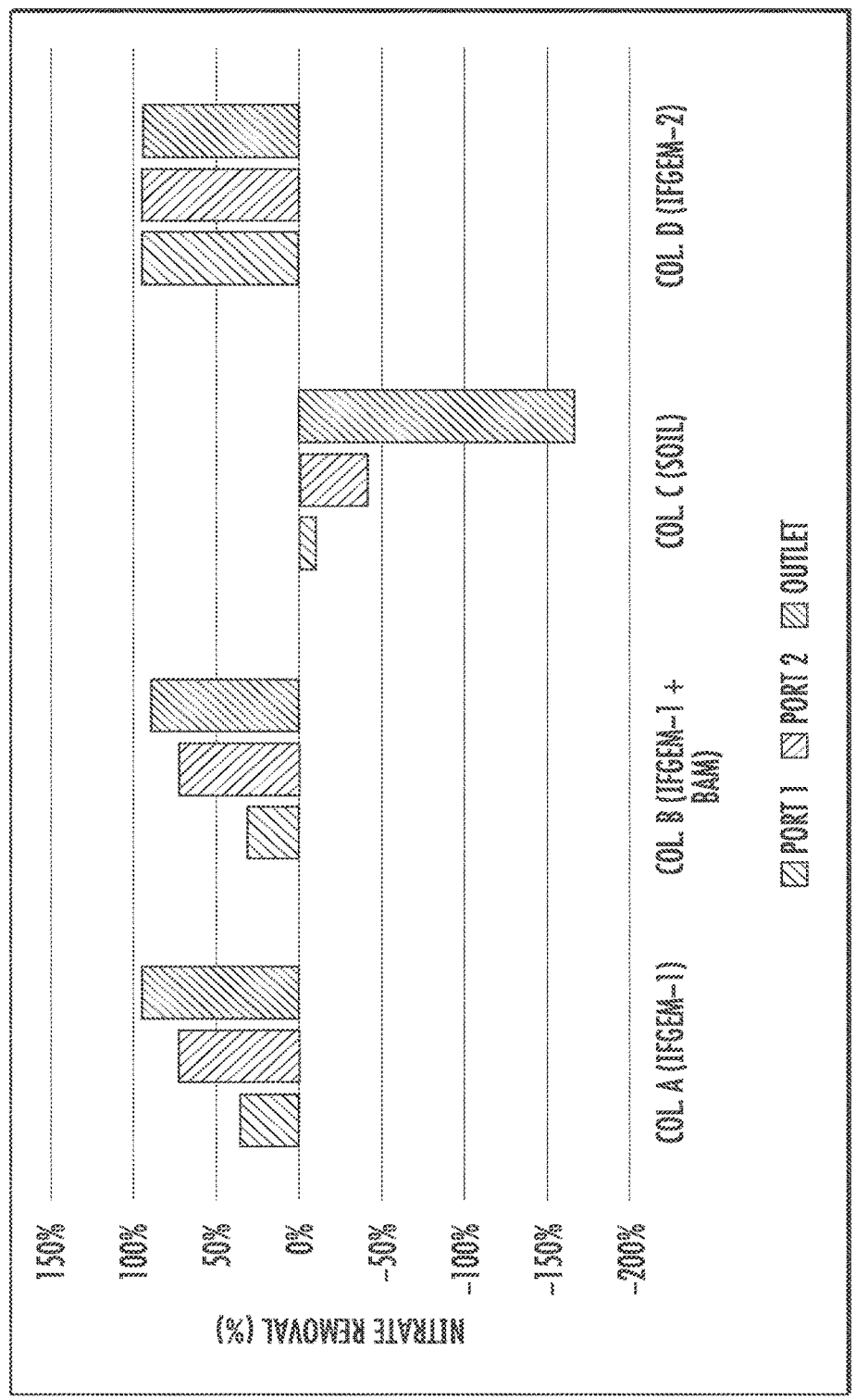
FIG. 8 shows the cumulative nitrate removal at each sampling port of the columns shown given a level 3 influent nitrate concentration.

FIGS. 6 to 8 show the cumulative nitrate removal at each sampling port of the columns shown given the three different influent nitrate concentrations (denoted as level 1 to 3). Nitrate removals were observed in columns A, B. and D, while the control column C with natural soil showed negative or only minor removal. When the inlet nitrate concentration is 0.6 mg/L, columns A and D exhibit the highest nitrate removal of 91.01% and 88.32%, respectively. Column B shows moderate nitrate removal of 44.56%. When the inlet nitrate concentration became 1.2 mg/L, the overall removal of column A and D are 91.76% and 91.43%, respectively. While column B achieved 79.95% nitrate removal. When changing the inlet nitrate concentration to 1.8 mg/L, the overall removal of nitrate is up to 95.53% for column A, 94.49% for column D, and 75.85% for column B.

Figure 9:
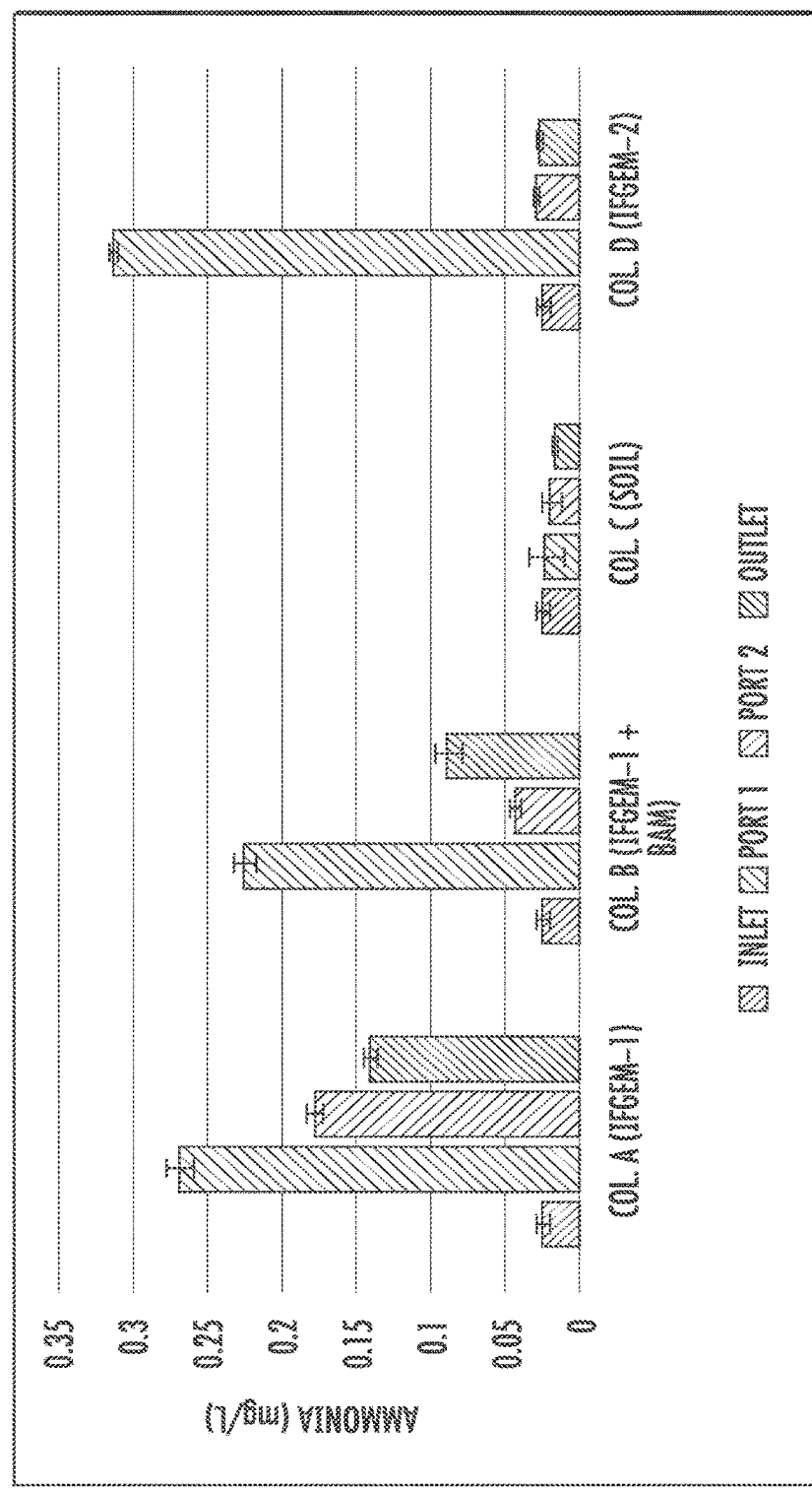
FIG. 9 shows the ammonia concentration data obtained from each sampling port for all columns at an inlet nitrate concentration level of 0.6 mg/L.
Figure 10:
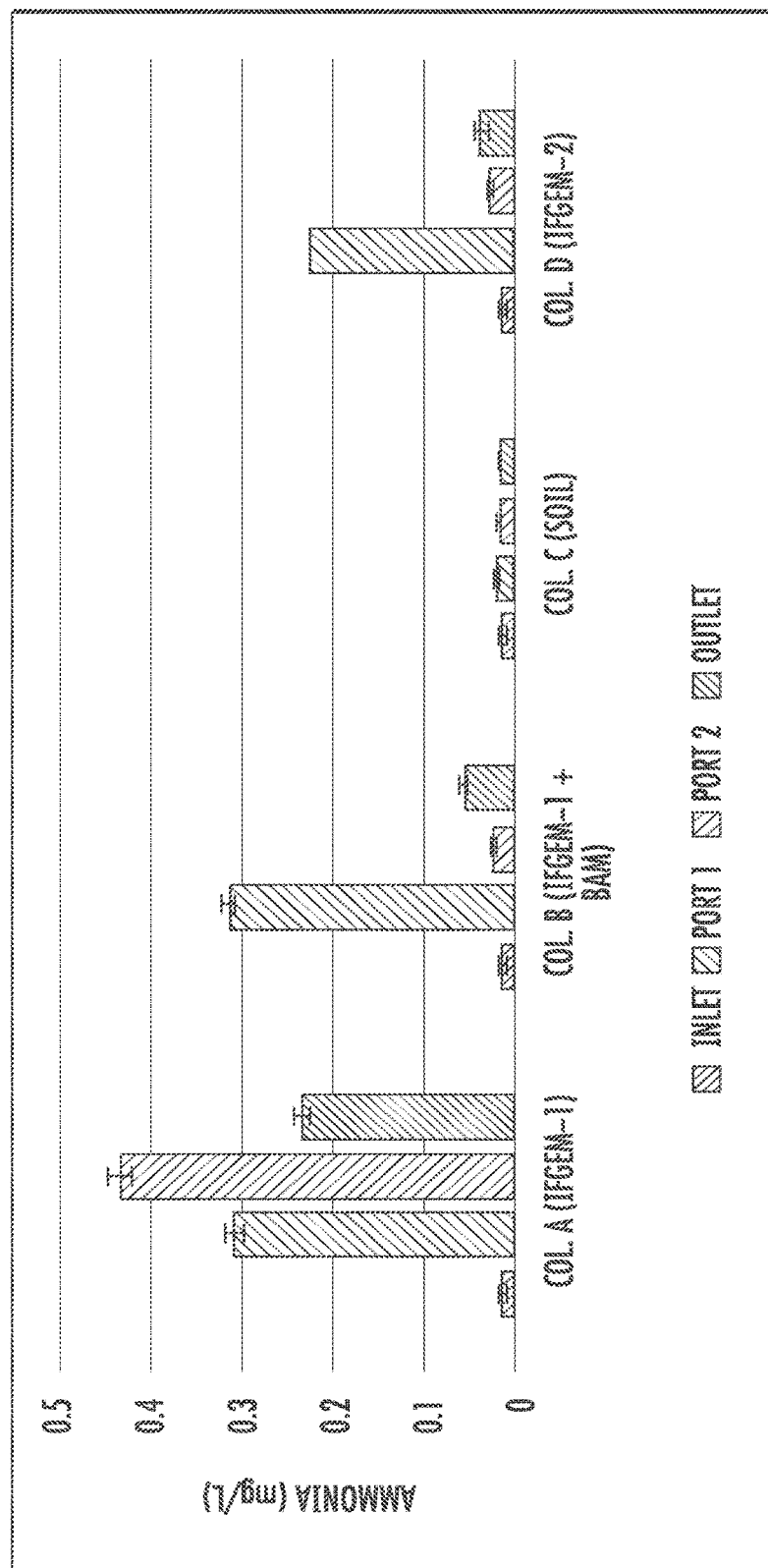
FIG. 10 shows the ammonia concentration data obtained from each sampling port for all columns at an inlet nitrate concentration level of 1.2 mg/L.
Figure 11:
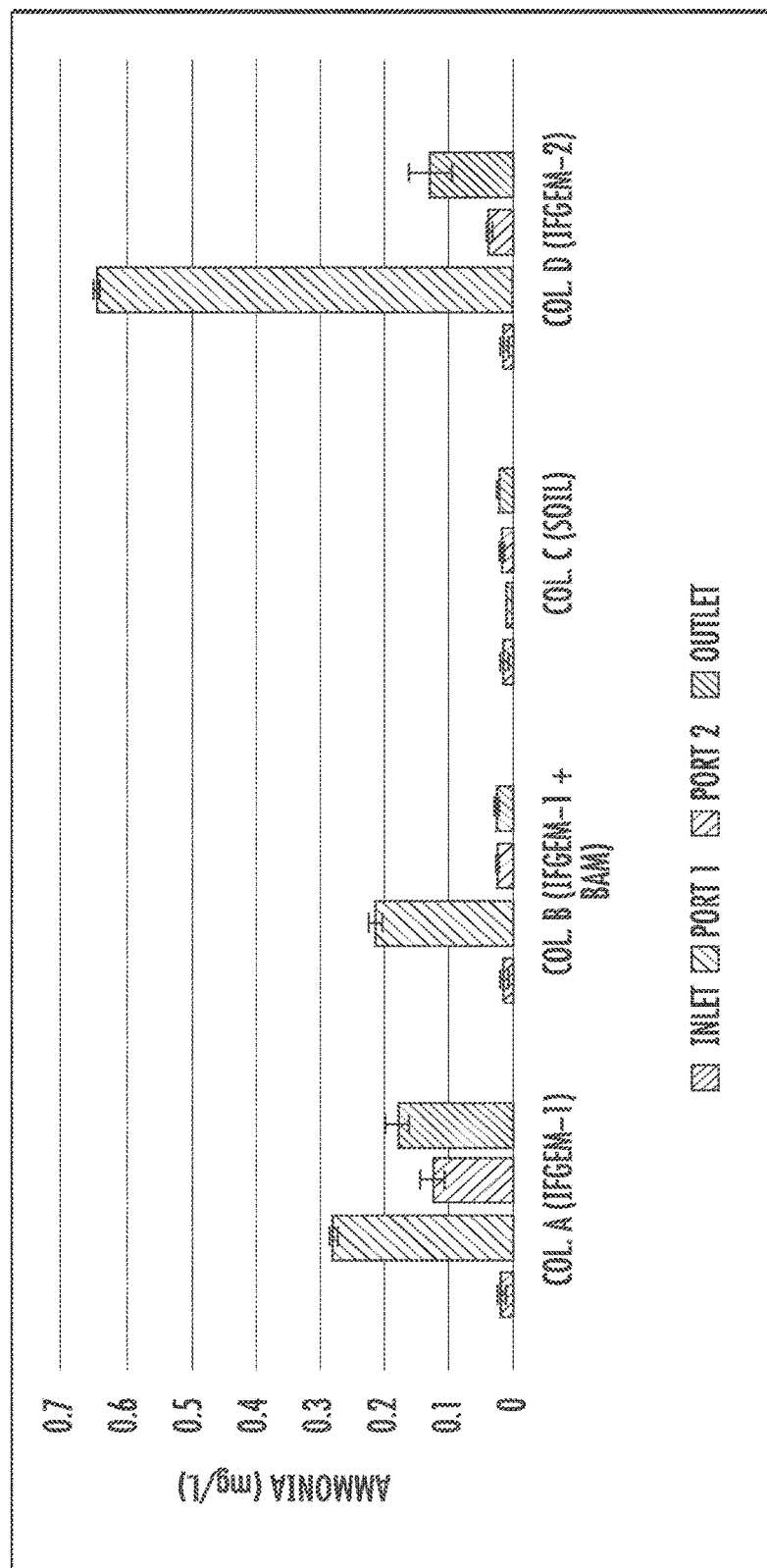
FIG. 11 shows the ammonia concentration data obtained from each sampling port for all columns at an inlet nitrate concentration level of 1.8 mg/L.

The generation of ammonia from the IFGEM treatment process is confirmed as the byproduct of nitrate reduction. Ammonia concentration data obtained from each sampling port for all columns are shown at three different inlet nitrate concentration levels in FIGS. 9 to 11, as 0.6 mg/L, 1.2 mg/L, and 1.8 mg/L, respectively. Ammonia generation seems positively related to the nitrate removal in the two IFGEM columns, particularly in the top sections. The higher the nitrate concentration, the more the ammonia being pro- Results of Kinetics Study Nutrients cannot flow through in and out the flasks during the isotherm test, but the nutrients adsorption in column test is a function of both time and space as the water flow through the column (Table 10). In column A, the kinetics analysis showed that IFGEM-1 mostly fits best in zero order, and the increase of influent nutrient concentration enhances the reaction rate constant from 0.0258 to 0.0809 for nitrate reduction and 0.007 to 0.0242 for phosphorus removal. The situation is similar for column D, where zero order dominates reaction kinetic. As the influent nutrient concentration increases, the rate constant changes from 0.0135 to 0.0388 for nitrate reduction and 0.0027 to 0.0106 for phosphorus removal. In column B, the nitrate reduction mainly follows zero order, and the rate constant increases from 0.0124 to 0.0551. However, the phosphorus removal kinetics under various influent concentrations are fluctuating and the R-squared values are relatively low in column B. For column C, its kinetics equation may not be precise because all R-squared values under three influent conditions are low for both nitrate reduction and phosphorus removal.

TABLE 10

Kinetics information of each column under various influent conditions

| Column | Nutrient species | Concentration level 1 | $R^2$/reaction order | Concentration level 2 | $R^2$/reaction order | Concentration level 3 | $R^2$/reaction order |
|---|---|---|---|---|---|---|---|
| A | Nitrate | y = −0.0258x + 0.6898 | 0.9593/Zero | y = −0.0486x + 1.1884 | 0.9907/Zero | y = −0.0809x + 1.8616 | 0.9744/Zero |
|   | Phosphorus | y = −0.007x + 0.2746 | 0.5301/Zero | y = −0.0141x + 0.4086 | 0.632/Zero | y = −0.0242x + 0.5572 | 0.5538/Zero |
| B | Nitrate | y = −0.0124x + 0.6138 | 0.4775/Zero | y = 0.1372x + 0.6571 | 0.9896/$2^{nd}$ | y = −0.0551x + 1.8511 | 0.9602/Zero |
|   | Phosphorus | y = 0.027x + 0.2311 | 0.8537/Zero | y = 0.0097x + 0.3317 | 0.2713/Zero | y = −0.0128x + 0.5274 | 0.2632/Zero |
| C | Nitrate | y = −0.0085x + 1.3361 | 0.9541/$2^{nd}$ | y = 0.0003x + 1.2911 | 0.0049/Zero | y = −0.0041x + 0.5331 | 0.8004/$2^{nd}$ |
|   | Phosphorus | y = 0.0103x + 0.4281 | 0.6830/Zero | y = −0.0142x + 1.6263 | 0.2803/$2^{nd}$ | y = −0.0005x + 0.7253 | 0.0347/Zero |
| D | Nitrate | y = −0.0135x + 0.5232 | 0.5389/Zero | y = −0.0236x + 0.8296 | 0.518/Zero | y = −0.0388x + 1.3747 | 0.6689/Zero |
|   | Phosphorus | y = −0.0027x + 0.3015 | 0.4374/Zero | y = −0.003x + 3.406 | 0.1786/Zero | y = −0.0106x + 0.5627 | 0.4470/Zero |

Zero, $1^{st}$, and $2^{nd}$ represent zero, first, and second order reactions, x = reaction time, which is HRT in column study; y = nutrient concentration (C) in effluent for Zero order reaction, ln(C) for $1^{st}$ order reaction, and 1/C for $2^{nd}$ order reaction.

Results of ANOVA Analysis

The two-way ANOVA analysis was applied to test the following null hypothesizes for nitrate and TP removal separately. The following three hypotheses are employed in this study. $H_1$: the average nutrient removals are the same between paired columns; $H_2$: the average nutrient removals are the same among different inlet concentrations; $H_3$: there is no interaction between columns and inlet concentrations in terms of nutrient removals.

From Table 11 the p values can be viewed with a 95% confidence for each paired column. Most of p values lie within the rejection region, which means there are significant differences between each paired column in terms of nutrient removal. However, there are several exceptions, for nitrate removal, there are no significant differences of the overall removal between column A and D as well as the interaction between the inlet condition and column type. Columns B and C also exhibit no significant differences in interaction from the column type and inlet conditions. For TP removal, the only exception is found between columns B and C, which showed they have no significant difference between their overall removals.

exhibited promising removal efficiencies with varying influent nutrient concentrations. IFGEM-2 is more effective than IFGEM-1 as IFGEM-2 removes all the nitrate mainly through the top section while IFGEM-1 needs three sections to perform equivalent removal efficiencies. The main reason of this outcome is that IFGEM-2 contains clay that can accumulate the nitrate concentration around the iron surface through adsorption, which enhances the nitrate reduction process since the reduction reaction requires the close contact between iron surface and nitrate. Another reason is the longer HRT in IFGEM-2 than IFGEM-1 that caused by over 4 times higher BET surface area of IFGEM-2 in unit weight, which mainly due to the existence of clay and tire crumb. This implies more contact time would be available for interactions between the nutrients and the sorption media on IFGEM-2 rather than that in IFGEM-1 in terms of nitrate reduction. Additionally, the faster decrement of ORP and DO concentration from each section in IFGEM-2 is another crucial evidence indicating that the reaction intensity in IFGEM-2 is more severe.

Not only the reactants, but also the products appear to be interacting with the sorption media. Ammonia are confirmed

TABLE 11

ANOVA analysis between paired columns with three inlet conditions

| Compared aspects | A-B | A-C | A-D | B-C | B-D | C-D |
|---|---|---|---|---|---|---|
| Nitrate removal analysis | | | | | | |
| Columns | $2.76 \times 10^{-9}$ | $2.87 \times 10^{-17}$ | 0.1208 | $9.30 \times 10^{-14}$ | $7.22 \times 10^{-9}$ | $5.64 \times 10^{-17}$ |
| Inlet conditions | $1.37 \times 10^{-6}$ | $1.91 \times 10^{-7}$ | 0.0005 | $1.55 \times 10^{-8}$ | $1.07 \times 10^{-6}$ | $1.74 \times 10^{-7}$ |
| Interaction | $5.67 \times 10^{-6}$ | $1.05 \times 10^{-6}$ | 0.7538 | 0.7332 | $1.58 \times 10^{-5}$ | $3.44 \times 10^{-6}$ |
| Phosphorus removal analysis | | | | | | |
| Columns | $4.67 \times 10^{-10}$ | $7.62 \times 10^{-9}$ | $2.35 \times 10^{-5}$ | 0.6725 | $1.92 \times 10^{-8}$ | $1.75 \times 10^{-7}$ |
| Inlet conditions | $5.57 \times 10^{-8}$ | $5.66 \times 10^{-5}$ | $3.02 \times 10^{-4}$ | $4.47 \times 10^{-8}$ | $2.55 \times 10^{-8}$ | 0.0002 |
| Interaction | $9.49 \times 10^{-8}$ | 0.0039 | $5.35 \times 10^{-3}$ | 0.0026 | $9.25 \times 10^{-8}$ | 0.0014 |

Nutrient Removal Interactions

The interactions between nutrient removal and sorption media are closely related to nitrate reduction process through IFGEMs, given both IFGEMs in columns A and D as one of the products of nitrate reduction reaction in IFGEMs. But the ammonia generation pattern and removal efficiencies are totally different across the two media, IFGEM-1 and IFGEM-2. By following the nitrate reduction pattern, IFGEM-1 produces ammonia continuously throughout each section, while IFGEM-2 mainly produces ammonia through the top section. However, the ammonia removal performance of IFGEM-2 is much better than IFGEM-1, which can be explained by looking at ammonia concentration from each section of column B (IFGEM-1 on top, BAM at middle and bottom). When the newly produced ammonia flows from IFGEM-1 section to BAM sections in column B, ammonia can be removed through BAM effectively, due to unique components of BAM such as clay and tire crumb that also exist in IFGEM-2. Clay was found to be very effective for removing ammonia through an ion exchange mechanism. Ammonia was removed as one of the reduction products that could shift the nitrate reduction reaction equilibrium to the direction of reducing more nitrate, which is another reason that IFGEM-2 has a higher reaction intensity compared to IFGEM-1 in ammonia removal.

Figure 14:
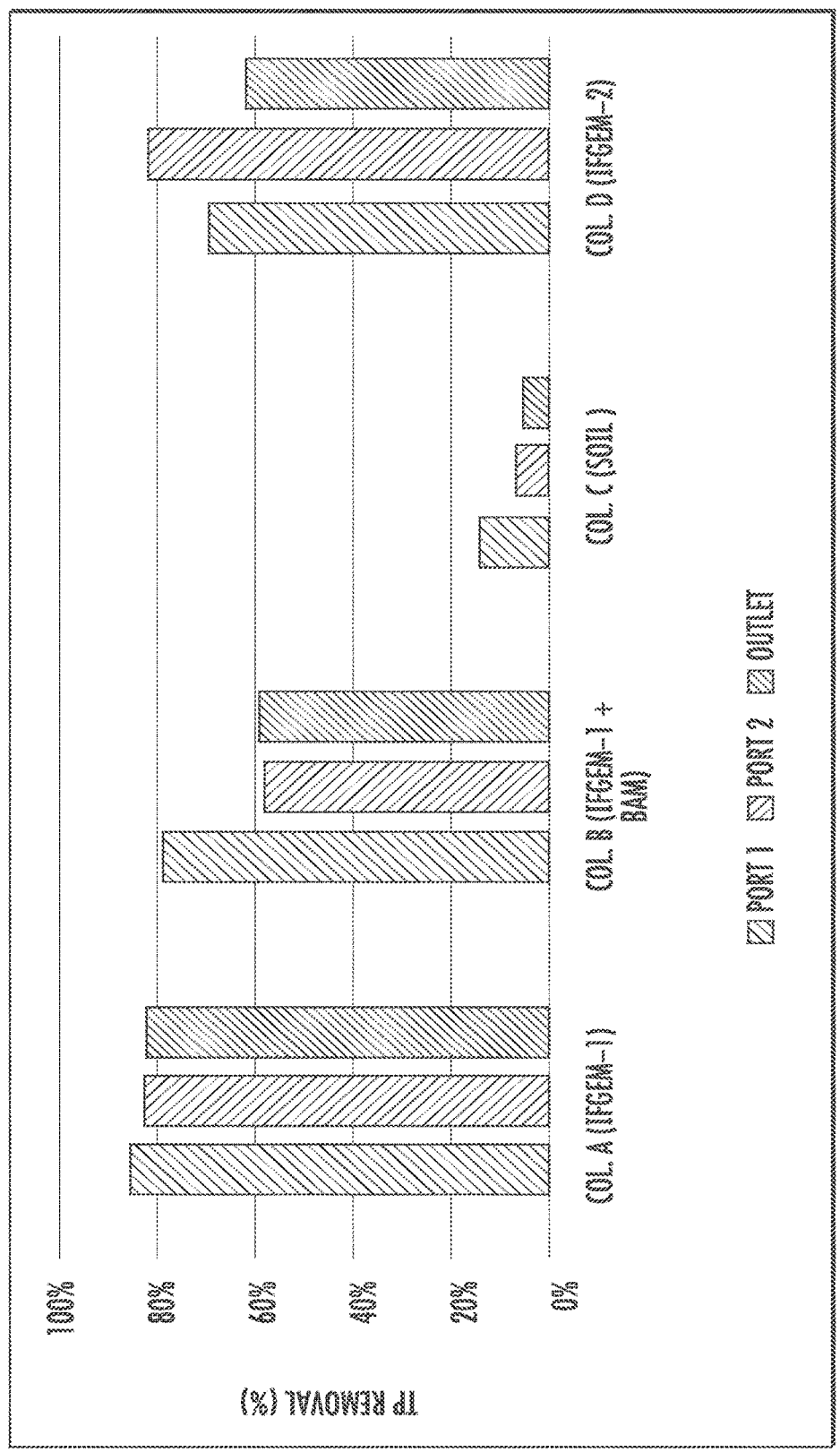
FIG. 14 shows the total phosphorus (TP) removal when the inlet TP=0.7 mg/L.
Figure 15:
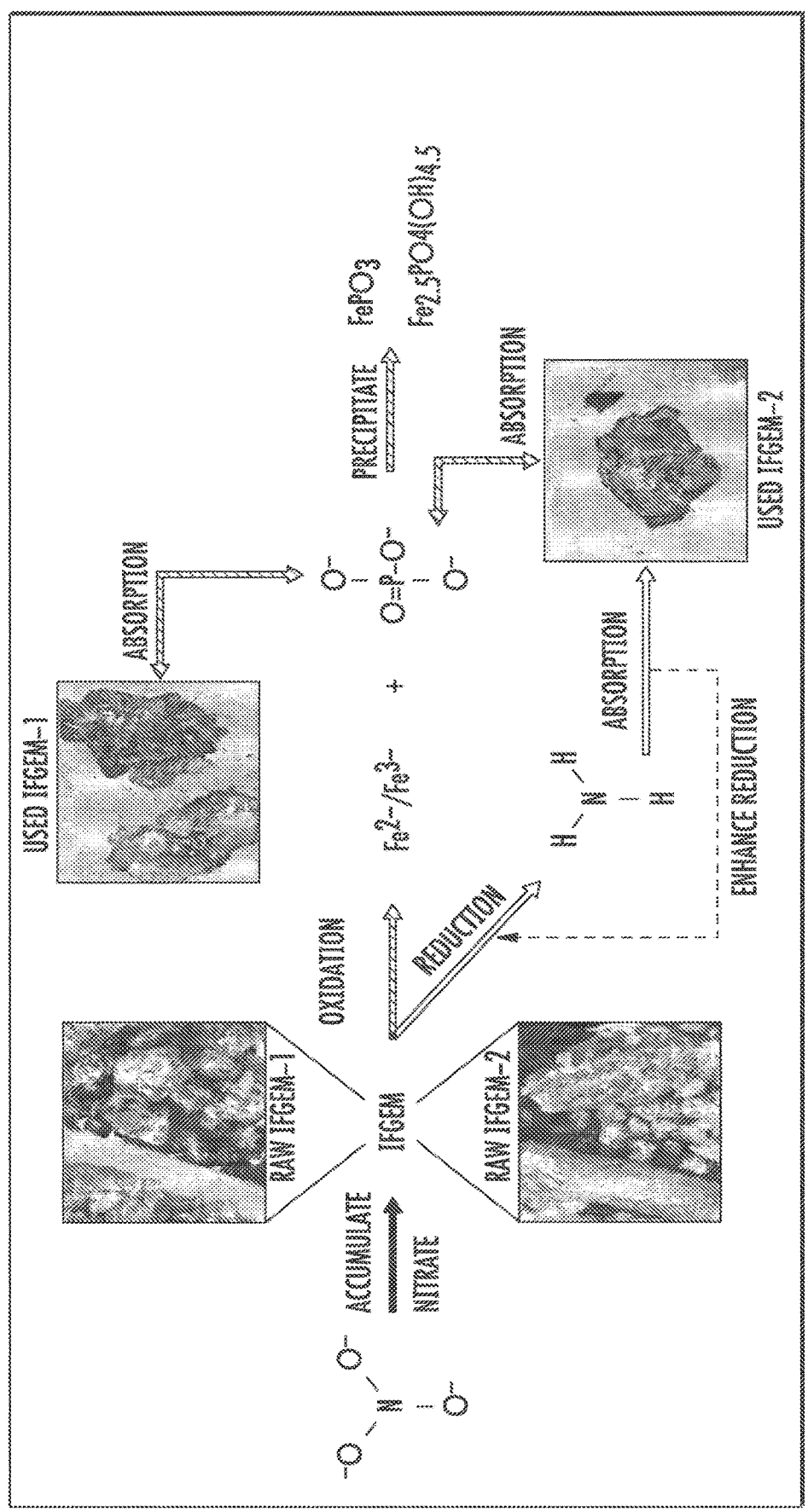
FIG. 15 shows nutrient removal interactions between nitrate and phosphate through IFGEM.

When taking into account the phosphorus removal, the synergetic effects among media, nitrate, and phosphorus can be realized fully as shown in FIG. 15. One of the products of nitrate reduction reaction are ferrous/ferric iron ion, which can result in precipitation into $FePO_4$ given the presence of phosphate ion. As the influent nitrate concentration increases, more ferrous/ferric iron ion can be generated in IFGEMs through nitrate reduction. Due to the precipitation equilibration, the increased concentration of ferrous/ferric ion shifts the equilibrium to the direction of precipitating more phosphorus in FIGS. 12 to 15, being TP 0.3 mg/L, 0.5 mg/L, and 0.7 mg/L. respectively.

The interaction can also be observed from reaction kinetics (Table 11), where rate constants of nitrate removal showed corresponding increment when the nitrate concentrations increased by 2 to 3 times, while the phosphorus removal rate constants showed similar or higher improvement when the TP concentration increases only up to 2.3 times as maximum. The better performance of TP removal in IFGEM-1 is also the result of its lower intensity of nitrate reduction reaction when compared to IFGEM-2. Because ORP (Table 9) decreases through the oxidation reduction reactions, the change of ORP could be one of the major factors that affects the phosphorus adsorption to iron. Phosphorus absorption capacity can be depressed by low ORP conditions within certain pH ranges. It can be suggested that IFGEM-1 is suitable for places where require faster infiltration rate, more phosphorus removal, but not sensitive to ammonia generation. IFGEM-2 is appropriate for applications with higher standard for nitrogenous removal but less demands for infiltration speed and phosphorus removal.

The nitrate removal from BAM layer (shown in FIGS. 6 to 8) is significantly different from IFGEMs (Table 11), mainly because it has no iron filings that work as reactive electron donors. Accordingly, the BAM layer is more about absorption rather than reduction with limited absorption sites. When it comes to phosphorus removal, even in the best removal scenario with concentration level 3 in BAM, both IFGEMs can easily surpass column B because the lack of iron filings in BAM means no contribution from the iron bonded phosphorus precipitation/absorption. So the phosphorus removal of both column B (IFGEM-1 and BAM) and column C (natural soil) has no statistical differences as none of them are good (Table 11). Especially natural soil, it shows mostly negative or negligible removals for both nitrate and phosphorus as treatment failures. It indicates that natural soil has been saturated with nutrient contaminants from stormwater runoff, it is no longer effective for removing nutrients from stormwater. The equivalent ORP values from each natural soil section (Table 9) also evidences that soil has lost almost all of its reactive sites for possible oxidation-reduction reactions, and clarified the necessity of replacing the existing natural soil in the study site.

pH Impacts and Competitive Absorption

The impacts of pH variation on nutrient removal in IFGEM were evaluated by the isotherm study in which nitrate and phosphorus were included in the test sequentially under pH value of 2, 7, and 10. Both Langmuir and Freundlich models were applied to search for the best fit based on the collected data. However, Langmuir model parameters are not applicable due to its assumption of monolayer reactive sites that may lose reactivity once being occupied and this assumption is not suitable for both IFGEMs as iron filing can provide electrons layer by layer continuously. Both IFGEMs tend to show decrement in phosphorus absorption as the pH value increases. The reason for having such a trend might be due to the status differences of iron-based ion under different pH values. When the initial pH is acidic, the dominant dissolved iron ion is Fe(III) or Fe(II), which may strengthen the phosphorus precipitation (Eq. 8 and 9) as the spontaneity of the phosphorus removal is enhanced due to more Fe(III) or Fe(II) are available (Table 8 and Table 9).

Figure 12:
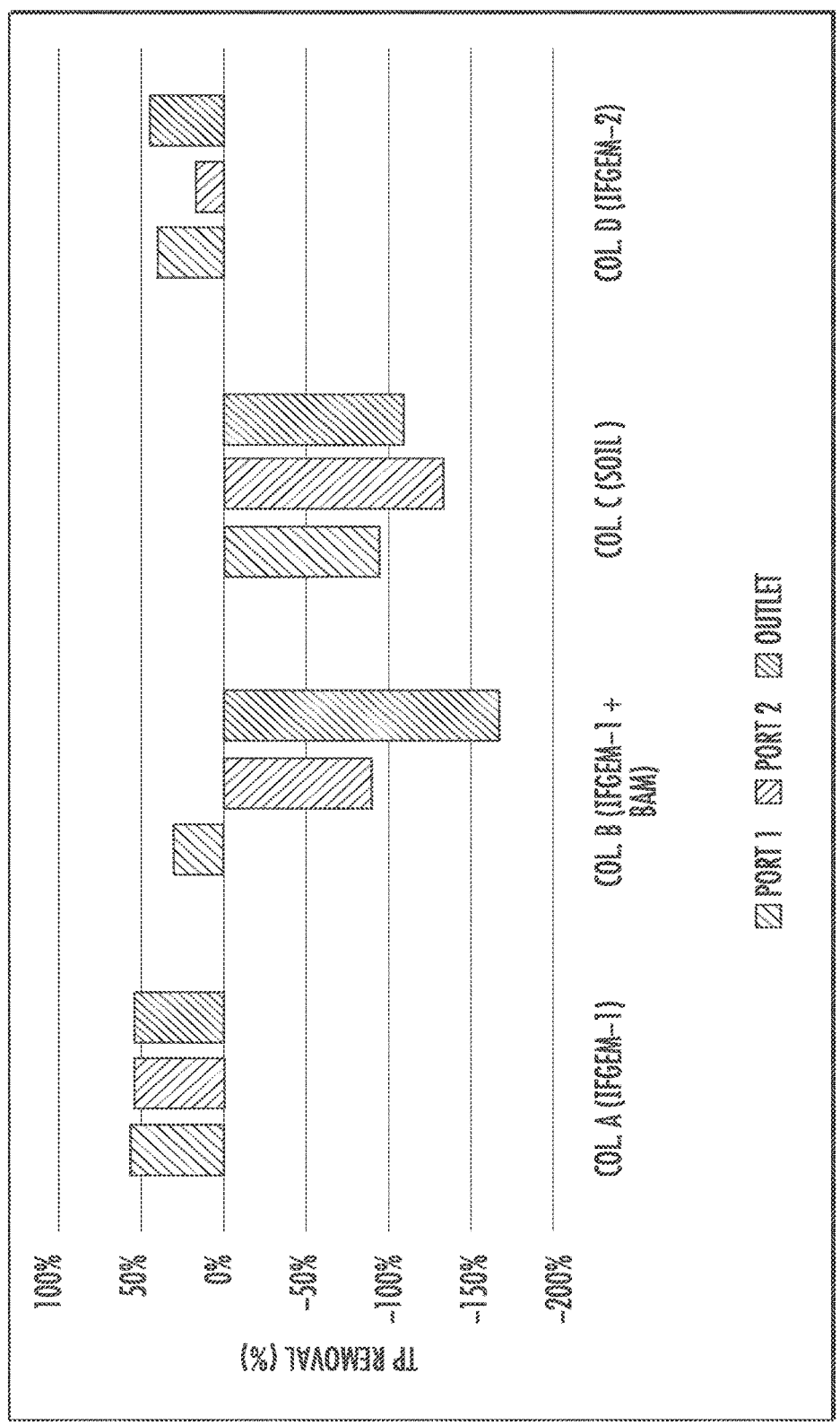
FIG. 12 shows the total phosphorus (TP) removal when the inlet TP=0.3 mg/L.
Figure 13:
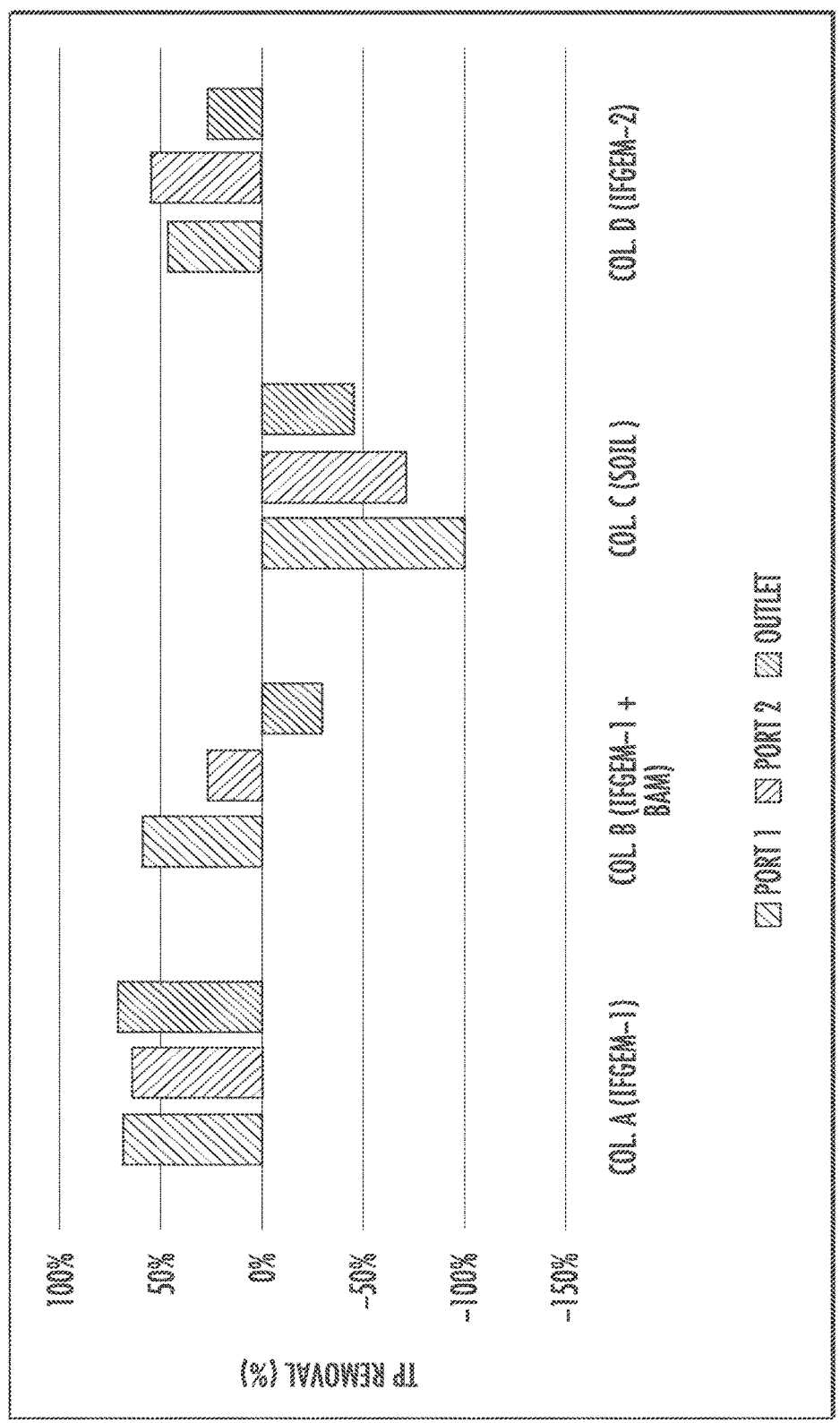
FIG. 13 shows the total phosphorus (TP) removal when the inlet TP=0.5 mg/L.

However, when the solution turns into the basic condition, the iron ion tends to form $Fe(OH)_3$ with low solubility, resulting in less Fe(II) or Fe(II) are available for phosphate precipitation. Another reason might be due to the competition between anions of $OH^-$ and phosphate for absorption sites. The higher the pH value is, the more $OH^-$ to compete with the phosphate for the positive absorption site, from the Gibbs free energy perspective, more energy is required for initializing the reaction (Table 7 and Table 8). Note that IFGEM-1 is generally better than IFGEM-2 in phosphorus removal under all pH conditions in the isotherm study, and the same result can be observed from the column study as well as shown in FIGS. 12 to 14 which shows the total phosphorus (TP) removal when the inlet TP=0.3 mg/L, 0.5 mg/L, and 0.7 mg/L, respectively. The performance of IFGEM-1 was more effective and stable for phosphorus removal. This could be interpreted by the ORP values as well (Table 9). In certain range of pH, ORP could exhibit a positive correlation with iron bonded phosphorus absorption. Since the ORP drops faster in IFGEM-2 than IFGEM-1 as shown in Table 10, IFGEM-1 is more likely to be applied for phosphorus removal than IFGEM-2.

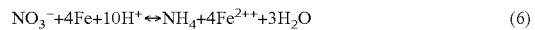
$$NO_3^- + 4Fe + 10H^+ \leftrightarrow NH_4 + 4Fe^{2+} + 3H_2O \tag{6}$$

$$2Fe + 6H^+ \rightarrow 2H_2\uparrow + 2Fe^{3+} \tag{7}$$

$$PO_4^{3-} + Fe^{3+} \rightarrow FePO_4\downarrow \tag{8-a}$$

$$2PO_4^{3-} + Fe^{2+} \rightarrow Fe_3(PO_4)_2\downarrow \tag{8-b}$$

$$Fe^{3+} + 3OH^- \rightarrow Fe(OH)_3\downarrow \tag{9-a}$$

$$Fe^{2+} + 2OH^- \rightarrow Fe(OH)_2\downarrow \tag{9-b}$$

Figure 16:
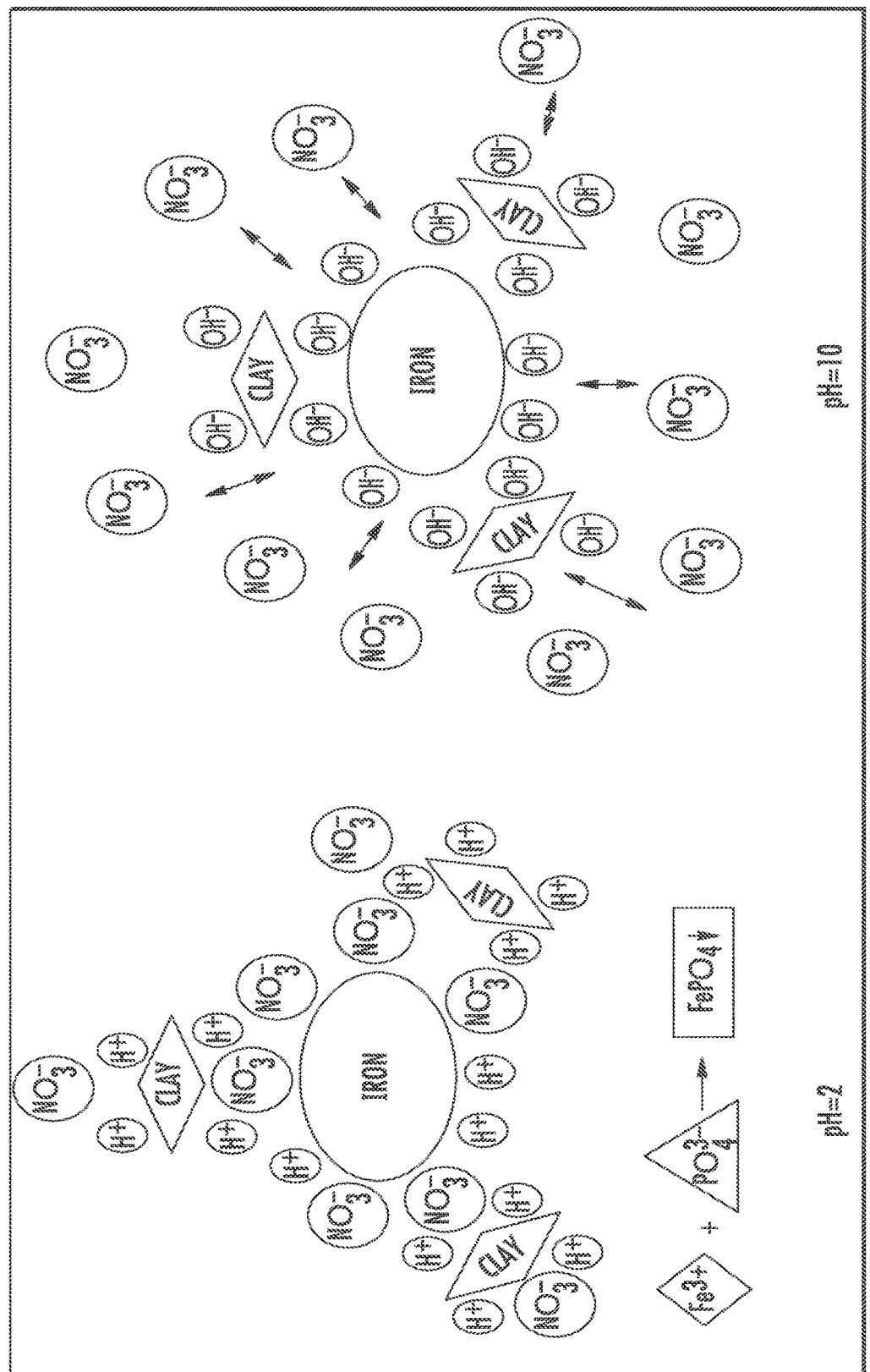
FIG. 16 shows the pH impacts on nitrate removal/reduction for IFGEM-2.

Comparatively, IFGEM-1 and IFGEM-2 act differently in nitrate reduction and ammonia generation under different pH values. IFGEM-1 removes most nitrate and generate more ammonia under neutral condition. Either the increase or the decrease pH value in solution would negatively impact its nitrate removal and ammonia generation. This process is graphically depicted in FIG. 16 which shows pH impacts on nitrate removal/reduction for IFGEM-2. Since nitrate reduction generally requires close contact between iron surface and nitrate ion, highly concentrated hydrogen ion in acidic solution can compete with the nitrate ion for obtaining electrons from zero valent iron, and the dominate reaction would be Eq. 7 at this moment. When it comes to basic solution, similar competition was observed between highly concentrated hydroxyl ion and nitrate ion, both of which are anions.

Conversely, as nitrate attracted by clay on the surface, it is more about absorption rather than reactions when compared to the acidic condition. Different from IFGEM-1, acidic solution is preferred by IFGEM-2. Clay cannot absorb huge amount of nitrate, but it can adsorb nitrate to form a skinny layer with much higher nitrate concentration to interact with iron filing, which help achieve excellent nitrate removal in the column study. The existence of clay in IFGEM-2 that interacts with pH fluctuations is graphically described in FIG. 16. When the initial pH=2 in the solution, the hydrogen ions occupy the negative charged sites on clay which makes the surface of clay more positively charged, making clay become more attractive to nitrate ion and enhancing the nitrate reduction process. However, the opposite side happens when changing the initial pH to 10 in solution. When the highly concentrated hydroxyl ions occupy the positive charged sites on the surface of clay, then the nitrate ion shall be repulsed because it is an anion, resulting in lower nitrate reduction.

Even though the two IFGEMs behave differently for nitrate reduction and removal when pH increases from 2 to 10, both of them follows the same trend for phosphorus removal. The reasons for having such outcome have been explained in the previous section. Accordingly, IFGEM-1 is preferable for treating water with neutral pH values for the purpose of optimizing the nitrate removal. But IFGEM-2 could be an alternative for treating acidic water to optimize both nitrate and phosphorus removal. Note that the more nitrate can be removed/reduced in both IFGEM, the more ammonia shall be generated. General speaking, IFGEM-2 has a better ammonia generation and recovery capability.

Figure 17:
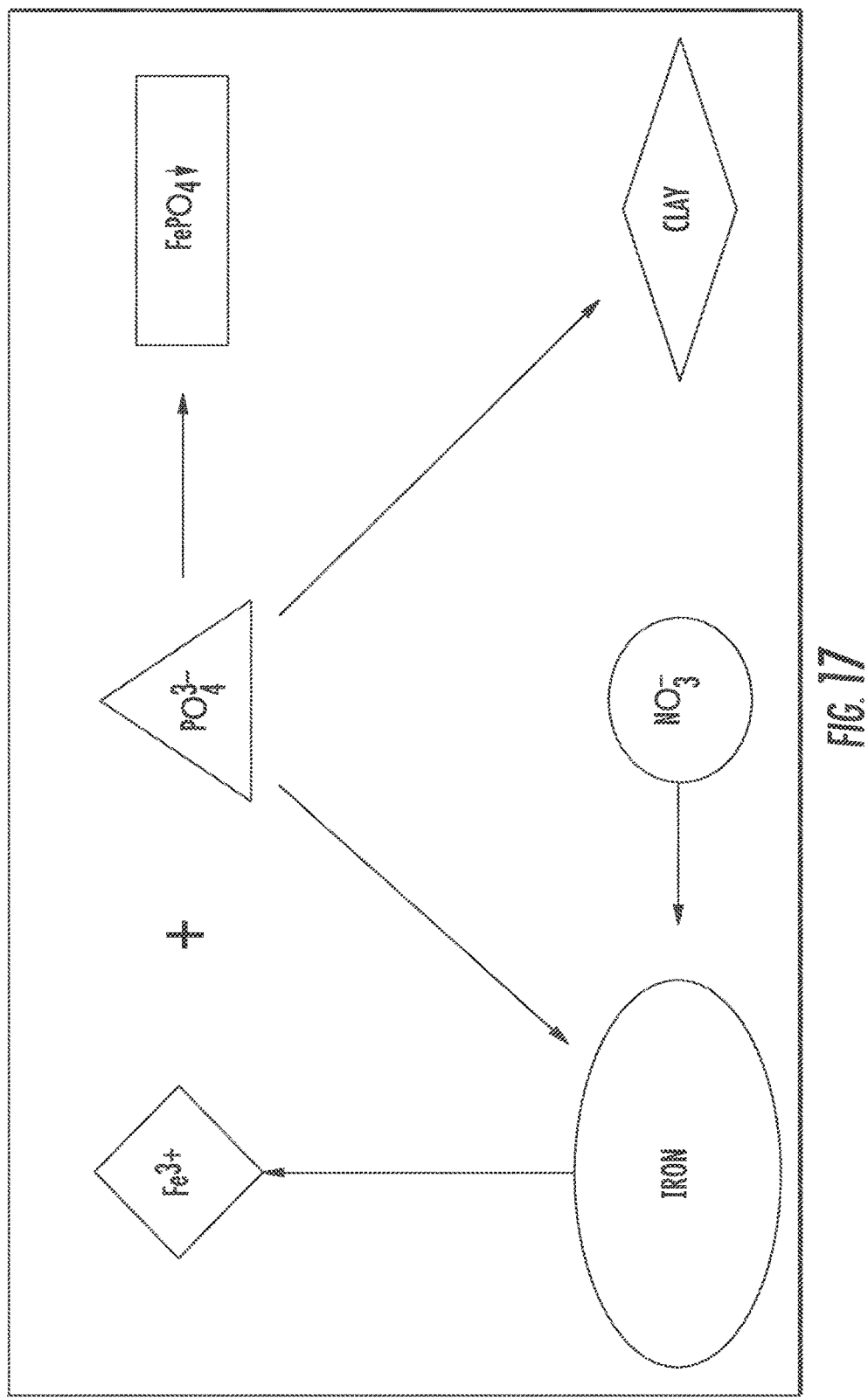
FIG. 17 shows competitive absorption between nitrate and phosphorus for IFGEM-2.

The competitive absorption test was conducted in a batch-mode isotherm study for both IFGEMs, so that the nitrate and phosphorus removal capability can be compared in between scenarios that contain singular nutrient species and multiple nutrient species. Note that the batch mode study has very different hydraulic conditions when compared with the continuous flow in a column study. In isotherm study, the nutrients cannot flow in or out as the batch mode is basically a closed system. For IFGEM-1, when both nutrients coexist in the solution, it seems that phosphorus is less competitive than nitrate. This may be confirmed by the fact that the removal of phosphorus reduces by 60.22% while the removal of nitrate only reduces 38.80%. As shown in FIG. 17, for a competitive absorption between nitrate and phosphorus for IFGEM-2, clay is the major factor that changes the balance in the competition, as clay is good for phosphorus removal as compensation to the decrement in phosphorus precipitation. It is noted that the batch-mode study provides one more aspect to look into the mechanism of competitive nutrients removal. However, it could be very different in continuous mode due to the significant change in hydraulic conditions, flow speed at the intersection between solid and liquid, nutrients concentration patterns and so on.

IFGEM-3 Example

Urban runoff can carry heavy metals (Cu, Pb, As, Zn, CR, and Ni) (Wu and Zhou, 2009), total suspended solids (Shammaa et al., 2002; Surbeck et al., 2006), nutrients (Nitrogen and Phosphorus), and fecal bacteria (Roesner et al., 2001) and pesticides and discharge them into natural water bodies. Groundwater pollution resulting from nutrients, pesticides, and pathogens in stormwater infiltration has also been documented (Bucheli et al., 1998; Clark and Pitt, 2007; Weiss et al., 2008). The effects of nutrients on water quality can be detrimental, including eutrophication and harmful algal blooms (O'Reilly et al., 2012a; Jones et al., 2015; Chang et al., 2016). Developing efficient and effective nutrient removal and recovery (NRR) technologies has been recognized as an important step toward sustainable water management. Extensive analyses of green sorption media applications for nutrient removal were conducted in the last two decades (Güngör and Ünlü, 2005; Chang et al., 2010; Xuan et al., 2010; Erickson et al., 2012; Wen et al., 2018). The best management practice for preventing nutrient contamination and reducing the impact of eutrophication on receiving water bodies is the removal of the nutrients, such as nitrate and phosphorus, at their sources. Different types of green sorption media were thus invented to remove nutrients which could otherwise damage ecosystem integrity due to stormwater runoff at any landscape (Cho et al., 2009; Hossain et al., 2010; O'Reilly et al., 2012a).

The utilization of green sorption media to treat stormwater was recently introduced after sand filters failed to recover nutrients (Chang et al., 2010). Distinct types of media with different material compositions were tested for water quality control at different low impact development (LID) facilities. Green sorption media, such as bio-sorption activated media (BAM) that utilize waste recycling material, has been studied and proven cost effective for nutrient removal through a variety of laboratory and field tests. These media are composed of 85% poorly graded sand, 10% tire crumb (no metal contents), and 5% clay by volume and have been used to remove nutrients at various stormwater dry and wet ponds (O'Reilly et al., 2012b; Chang et al., 2018b). The efficient use of BAM for promoting nitrification and denitrification processes in stormwater treatment was confirmed by Chang (2011).

The benefit of the addition of iron to sand filter media for increased phosphorus removal was analyzed for distinct iron filing contents (Erickson et al., 2012). The iron filing in this media act as an electron donor, contributing to nitrate reduction and phosphate adsorption. Nutrient removal can also be performed by a sorption media called Iron Filings-based Green Environmental Media (IFGEM). The IFGEM media act as a unique sorbent for chemical species to physically and chemically react with the sorbents until an equilibrium is obtained. The media of IFGEM have demonstrated effective removal efficiencies and the recovery/reuse potential of nutrients under varying temperature conditions (Chang et al., 2018b). It has become a cost-effective alternative to treat point and nonpoint sources of nutrients.

Two types of IFGEM were previously created and analyzed using column studies. IFGEM-1 contained 96.2% fine sand and 3.8% grinded iron filings by volume, while IFGEM-2 contained 80% sand, 10% tire crumb, 5% pure clay, and 5% grinded iron filings by volume (Chang et al., 2018b; Wen et al., 2018). These two types of IFGEM were previously analyzed with respect to reaction kinetics, product microstructure, temperature effects, and species competition in nitrogen and phosphorus adsorption and removal. In these studies, the two green sorption media (IFGEM-1 and -2) have been effective in terms of removal efficiencies and recovery potential of nutrients, although removal efficiencies are not as high as expected (Chang et al., 2018b; Wen et al., 2018). The varying ratios of these components in IFGEM play different roles, but their synergistic effect is critical in nutrient removal and recovery. The tire crumb, sand, and clay are the key factors for tuning the hydraulic conditions for the desired treatment effectiveness. When iron filing is added the surrounding clay attracts nitrate onto the surface of iron, hence more intensive nitrate reduction reaction happens. The products are ammonia and ferrous iron, the former of which can be absorbed by clay and the latter is able to precipitate the phosphorus. Both improve the nutrient recovery potential collectively. However, the composition of the optimal recipe remains unclear.

Parameters such as oxidation reduction potential (ORP) will enhance the understanding of interactions between clay and ground iron filings in nutrient removal caused by the physicochemical properties of the green sorption media. Given the presence of iron filings in our media matrix composition and the existence of phosphorus in the influent, ORP can be a significant parameter to explain phosphorus adsorption by the iron particles due to the high specific surface area (Zhou et al., 2005). ORP may impact, but not completely control, phosphorus adsorption (Zhou et al., 2005). Further, ORP, dissolved oxygen (DO), and pH can be used collectively to indicate the oxidative and biological state of water streams (Ga and Ra, 2009; Hasan et al., 2010), and a similar approach can be implemented for stormwater runoff.

This study aims to determine the optimal recipe of IFGEM and its nutrient recovery potential via a suite of comprehensive column tests, which may be regarded as the second generation of NRR technology for advanced stormwater treatment. It primarily determines the optimum clay content and secondarily the optimum iron filing content by volume in sequence given three tangible nutrient influent concentrations. The proposed Iron Filing-based Green Environmental Media 3 (IFGEM-3 hereafter) is a newly developed media with a refined media recipe whose main constituents are sand, clay, tire crumb, and ground iron filing particles. The percent by volume of clay and ground iron filings in the IFGEM-3 media mix were fine-tuned due to their role in nitrate and phosphorus removal in this study. The results obtained from the experiment may lead to the selection of the unique green sorption medium that best fits the necessary stormwater applications at the field condition.

The determination of the clay and iron filing percent content of IFGEM-3 may aid in real-world applications for stormwater and even wastewater treatment. Thus, this study seeks to answer the following three scientific questions: 1) What is the optimal percentage of clay and iron filings by volume for different stormwater influent conditions? 2) What is the optimal recipe of IFGEM-3 for improving stormwater treatment and nutrient recovery potential with respect to varying influent phosphorus and nitrate concentrations? 3) Is there any leakage of iron ions from the iron filings aggregate of the proposed IFGEM-3 in the effluent? We hypothesize that a substantial increase of clay content may inhibit nitrogen and phosphorus removal by binding them to the iron filings in the media, preventing the chemical process from occurring, and an increase in iron filing content may enhance phosphorus removal until an equilibrium is reached.

Materials and Methods

Figure 18B:
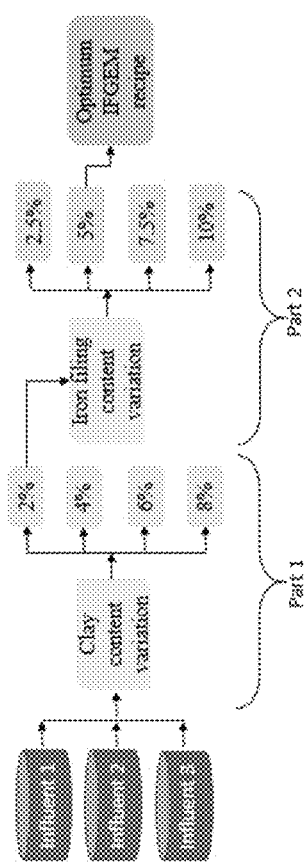
FIG. 18B depicts an experimental process for determining optimal IFGEM recipe. Note: "A" in columns in FIG. 18A represent that the same recipe was used for all sections in each scenario depicted in FIG. 18B.
Figure 18A:
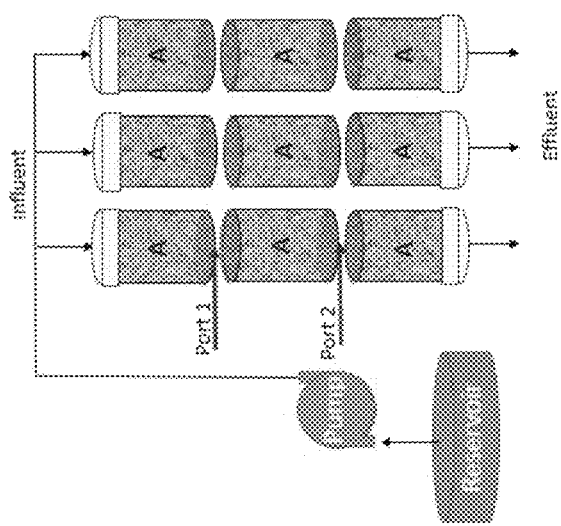
FIG. 18A depicts a triplicate column test setup for determination of optimum clay (Port 1) and iron filing (Port 2) percent contents by volume for influent condition (1) 0.9 mg/L $NO_3^-$, 0.3 mg/L $PO_4^{3-}$ (2) 1.3 mg/L $NO_3^-$, 0.5 mg/L $PO_4^{3-}$ (3) 1.7 mg/L $NO_3^-$, 0.7 mg/L $PO_4^{3-}$ (letter A corresponds to one media recipe).

This study is comprised of a suite of fixed-bed column experiments developed to search for the optimum clay and iron filing contents by volume for three influent conditions. A total of seven distinct media were analyzed by varying the clay and iron filing contents systematically. Previously developed recipes of green sorption media including IFGEM-1, IFGEM-2, and BAM were used for determining the range of clay and iron filings variation. A 2-8% clay and 2.5-10% iron filing contents (by volume) were selected for variation. To understand the effect clay and iron filing contents have on nutrient removal and recovery the experiment was divided into two parts (FIGS. 18A-18B). First, the clay content was varied with constant iron filing content of 5% (Table 12); the iron filing content was then varied with fixed clay content determined from the first part of the experiment (Table 13). The influent conditions for both parts of this column study simulate field stormwater conditions at three phosphate and nitrate concentration levels.

TABLE 12

Composition of the IFGEM-3 recipes with respect to varying clay and sand contents

| IFGEM recipe clay content by volume | % Sand by volume | Tire crumb by volume | Iron-filing by volume |
|---|---|---|---|
| 2% | 83% | 10% | 5% |
| 4% | 81% | 10% | 5% |
| 6% | 79% | 10% | 5% |
| 8% | 77% | 10% | 5% |

TABLE 13

Composition of the IFGEM-3 recipes with respect to iron filings and sand contents

| IFGEM recipe clay content by volume | % Sand by volume | Tire crumb by volume | Iron-filing by volume |
|---|---|---|---|
| 2% | 85.5% | 10% | 2.5% |
| 2% | 83.0% | 10% | 5% |
| 2% | 80.5% | 10% | 7.5% |
| 2% | 78.0% | 10% | 10% |

The movement of water is affected by porous media characteristics. Saturated hydraulic conductivity ($k_s$) describes the movement of a fluid through saturated porous spaces (Al-Kaisi et al., 2017). The saturated hydraulic conductivity enables the determination of the hydraulic residence time (HRT), thus it can impact the nutrient removal efficiencies by affecting the water contact time required for treatment. The hydraulic characteristics of the seven media with clay content variations are described in Table 14.

TABLE 14

Characteristics for IFGEM Recipes for Clay Variation

| Content | Hydraulic conductivity (cm/s) | Porosity (%) |
|---|---|---|
| Clay content variation by volume | | |
| 2% clay, 5% iron, 83% sand | 0.075 | 31.04 |
| 4%, clay, 5% iron, 81% sand | 0.066 | 31.04 |
| 6%, clay, 5% iron, 79% sand | 0.047 | 31.14 |
| 8%, clay, 5% iron, 77% sand | 0.035 | 31.14 |
| Iron filing content variation by volume | | |
| 2% clay, 2.5% iron, 85.5% sand | 0.109 | 30.93 |
| 2% clay, 7.5% iron, 80.5% sand | 0.045 | 30.93 |
| 2% clay, 10% iron, 78% sand | 0.050 | 30.82 |

*Tire crumb is maintained constant at 10% (by volume) for the seven recipes

Three PCV columns of 76.2 cm length and a diameter of 7.62 cm with three equivalent sections were utilized for the analysis of the four clay and iron filing variations by volume under the three distinct influent conditions (FIGS. 18A-18B). The columns were divided into three 25.4 cm sections for sampling purposes. Dry media with varying clay content (Table 13) and iron filing content (Table 14) was packed in each column section. The bottom of each column section was sealed with a perforated cap to enable water to be distributed as it travels to the next column section. The space between each column section was sealed with parafilm to prevent the intrusion of outside sources. A bottom filter with a layer of pebbles was placed to prevent particles from escaping the column sections at each port (Hossain et al., 2010; Nilsson et al., 2013; Jones et al., 2015) while a layer of pebbles was placed at the top of each column section to aid in water distribution. The columns were flushed with tap water for approximately 10 hours to eliminate any substance present in the media prior to the addition of each dosed influent.

The influent consisted of distilled water spiked with nitrate and phosphate ISE (ion selective electrode) standard solutions to produce three influent conditions that simulate stormwater nutrient concentrations. The three influent conditions studied were 0.3 mg/L of phosphate and 0.9 mg/L of nitrate, 0.5 mg/L of phosphate and 1.3 mg/L of nitrate, and 0.7 mg/L of phosphate and 1.7 mg/L of nitrate. The distinct influents were continuously pumped from the reservoir to the inlet in a downward-flow from top of the columns using peristaltic pumps at a flow rate of 8 mL/min during a period of 3-hrs, after which samples were collected at the influent, effluent, port 1, and port 2. This procedure was conducted for both clay and iron filing variations.

Triplicate samples were collected at the influent and at each column section corresponding to port 1, port 2, and the effluent for the three scenarios (i.e., influent conditions). These samples were analyzed for ammonia, total phosphorus (TP), DO, pH and ORP, while total nitrogen, nitrate, nitrite and iron were analyzed for the influent and effluent ports. The analyses were performed in the University of Central Florida laboratory within 24-hrs of collection (Jones et al., 2015; Wen et al., 2018). Further, effluent iron concentrations were analyzed to determine the presence of iron leakage from the iron filing component of IFGEM-3. Table 15 summarizes the parameter and instrumentation used for analysis of the laboratory tests.

TABLE 15

Parameters and Instrument for Column Study

| Parameter | Instrument/Method no. | Detection Range (mg/L) |
| --- | --- | --- |
| Nitrate | HACH DR5000/Method 10206 | 0.2-13.5 |
| Nitrite | HACH DR5000/Method 10207 | 0.015-0.60 |
| Ammonia | HACH DR5000/Method 10205 | 0.015-2.00 |
| Total Phosphorus | HACH DR5000/Method 10209 | 0.15-4.50 |
| Iron | HACH DR5000/Method 10229 | 0.2-6.0 |
| pH | Waterproof Double Junction pHTestr ® 30 | — |
| DO | HACH HQ40D-IntelliCAL | — |
| ORP | HACH HQ40D-MTC101 | — |

The criteria for selecting the optimal recipe with respect to clay content followed by iron filing content (by volume) is presented in continuation. The performance of each media in nutrient removal and recovery was analyzed. A screening process was conducted to determine adequate clay and iron filing contents based on two factors, including: 1) average nutrient removal efficiency and 2) potential nutrient recovery. Although ammonia and phosphorus removal within the distinct depths of the green sorption media is desired, the TN, TP, and ammonia removal in the effluent was utilized as the selection criteria as it best represents the envisioned stormwater treatment by the green sorption media. Further, a high nutrient recovery, mainly ammonia recovery, in the media can indicate a better potential reuse for green sorption media in applications such as fertilizer substitution. Overall, the analyzed parameters described below will aid in determining the optimal clay and iron filing contents. They include: 1) TP percent recovery, 2) TN percent removal, 3) Ammonia percent removal, 3) Phosphate recovery, 4) Ammonia recovery, and 5) Iron leakage in the effluent. Although the highest ammonia, TP, and TN removal for each influent condition may not be consistent with the same media component, the overall nutrient removal for the influent conditions was assessed.

A two-way analysis of variance (ANOVA) was employed to determine if there were any statistical differences between columns for nutrient removals at each influent condition. The clay and iron filing variations for each influent condition were compared to establish whether there were any significant differences in TP, TN and ammonia removals. The variation in the clay and iron filing contents and the influent conditions were the two required independent variables. For this analysis there were three null hypotheses ($H_o$) and three alternative hypotheses ($H_1$). If the p-value is less than $\alpha$ (0.05) the null hypothesis can be rejected (Ananda and Weerahandi, 1997), favoring the alternative hypothesis. The three null hypotheses were: 1) $H_o$: the average nutrient removals for clay/iron filing variations are the same ($H_1$: the average nutrient removals for clay/iron filing variations are different), 2) $H_0$: the average nutrient removals from the varying influent conditions are the same ($H_1$: the average nutrient removals from the influent conditions are different), and 3) $H_0$: there is no interaction between influent conditions and clay/iron filing variations in the columns ($H_1$: there is interaction between influent conditions and clay/iron filing variations in the columns).

Results

Minimal ammonia concentrations were detected at the influent, where the average ammonia concentrations at each port demonstrated an increase in ammonia concentration in port 1 before decreasing from port 2 to the effluent (FIG. 19A-C). Thus, the ammonia concentration in port 1 was used as the initial concentration to determine ammonia removal at the subsequent ports. However, according to the increase in ammonia concentrations at port 1 and port 2, ammonia generation can be presumed. The ammonia concentrations at each port can be related to ammonia adsorption and recovery potential within the section of the column. Sections with higher ammonia removal have greater ammonia adsorption and thus a better potential for ammonia recovery from the media.

The effluent TN, TP, and ammonia removal differences among the recipes with 2, 4, 6, and 8% clay content in each influent condition are presented in Table 16 (and graphically shown in FIG. 20A-C). For the three influent conditions, 2% clay content outperformed the remaining 3 clay contents in ammonia and TN removal. In general, the ammonia percent removal decreased from the 2% to the 8% clay content (Table 16). Furthermore, the highest TP removals for influent concentrations 1, 2, and 3 was achieved by 4, 6, and 2% clay, respectively.

TABLE 16

Summary of effluent nutrient removal for clay variation

| | Influent Concentration 1 | | | Influent Concentration 2 | | | Influent Concentration 3 | | |
|---|---|---|---|---|---|---|---|---|---|
| Clay content | Ammonia removal | TP removal | TN removal | Ammonia removal | TP removal | TN removal | Ammonia removal | TP removal | TN removal |
| 2% | 98.17% | 83.76% | 91.50% | 96.11% | 81.10% | 90.94% | 95.14% | 91.76% | 93.94% |
| 4% | 87.21% | 93.00% | 76.61% | 77.10% | 79.11% | 83.42% | 89.04% | 79.98% | 87.02% |
| 6% | 89.92% | 68.84% | 87.76% | 91.98% | 95.47% | 83.07% | 84.62% | 70.34% | 83.94% |
| 8% | 61.46% | 78.43% | 83.01% | 70.61% | 78.37% | 79.42% | 85.39% | 76.90% | 82.90% |

The last parameter of analysis was the iron ion concentration in the effluent. The minimal amount of iron leakage for the first and third influent conditions was present in the 2% clay content, followed by 4, 6, and 8% clay content (FIG. 21A-C). In the second influent condition the 4% clay content had the largest iron concentration in the effluent, while 2% clay content had the smallest effluent iron concentration. The difference observed in effluent iron concentration from the different clay variations can be attributed to the abundance of iron filing particles in a specific region in the columns, which was translated into the effluent iron concentration measured, as it is expected that the uniformity and homogeneity of the media mix can affect the collected results. In addition, the change in ORP, DO, and pH for each sample port can aid in understanding the reaction potential with respect to nutrient removal (Table 17). As the pH values are all within the range of the neutral condition, DO and ORP measurements vary from 8 mg/L to 11 mg/L and 200 mV to 340 mV, respectively, across different scenarios of varying clay contents. These parameters can be utilized to evaluate water quality. In general, the ORP values in the effluents are much smaller than those in the influents, which indicates the possible achievement of equilibrium in the end of the column.

The impact iron filing content in green sorption media has on ammonia, TN, and TP removal percentage was explored. Overall, ammonia concentration increased greatly in port 1 but decreased from port 2 to the effluent (FIG. 22A-C). However, an exception was noted in the 7.5% iron filing content, where a small increase in ammonia concentration in the effluent was seen for the first influent concentration. Further, an increase in ammonia generation in the effluent port was observed with each increase in iron filing content.

The lowest TP and TN concentrations were obtained for the media with 5% iron filing content for influents 1 and 3, with a slightly higher TP concentration than 7.5% and 10% iron filing content for influent 2 (FIG. 23A-C). The media with the 5% iron filing composition outperform the other media in terms of overall ammonia removal. In all influent conditions the highest effluent ammonia removal was attained by 5% iron filing content, followed by 2.5% iron filing. Similarly, this media had the highest TN removal for most of the influent conditions (Table 18). The effluent ammonia removal determined for influent 2 in iron filing content variations were very similar in range, and the TP removal was within close values for the second and third influent conditions, with the highest visible TP removal observed only in the first influent condition.

TABLE 17

Average measurements for ORP, DO, and pH for clay content variation

| | | 2% Clay | | | 4% Clay | | | 6% Clay | | | 8% Clay | | |
|---|---|---|---|---|---|---|---|---|---|---|---|---|---|
| Influent | Port | ORP (mV) | DO (mg/L) | pH | ORP (mV) | DO (mg/L) | pH | ORP (mV) | DO (mg/L) | pH | ORP (mV) | DO (mg/L) | pH |
| Condition 1 | Influent | 247.73 | 10.26 | 7.70 | 251.93 | 11.07 | 6.89 | 269.70 | 9.97 | 7.83 | 251.93 | 11.07 | 6.89 |
| | Port 1 | 261.92 | 10.61 | 8.51 | 231.30 | 11.76 | 8.05 | 278.06 | 9.51 | 8.13 | 261.49 | 10.61 | 8.17 |
| | Port 2 | 265.34 | 10.33 | 8.47 | 238.12 | 11.17 | 8.24 | 280.02 | 9.66 | 8.14 | 254.28 | 11.06 | 8.23 |
| | Effluent | 263.18 | 10.25 | 8.29 | 255.87 | 10.83 | 8.00 | 287.62 | 9.30 | 8.19 | 241.97 | 10.75 | 8.44 |
| Condition 2 | Influent | 340.73 | 10.80 | 7.19 | 235.30 | 9.80 | 7.64 | 340.73 | 10.80 | 7.19 | 235.20 | 9.80 | 7.64 |
| | Port 1 | 282.12 | 10.51 | 8.14 | 210.48 | 8.50 | 8.58 | 259.26 | 10.57 | 8.18 | 201.77 | 9.12 | 8.30 |
| | Port 2 | 280.71 | 9.77 | 7.89 | 212.47 | 8.14 | 8.43 | 260.61 | 10.51 | 8.20 | 207.14 | 9.17 | 8.39 |
| | Effluent | 283.56 | 10.25 | 8.12 | 209.68 | 9.03 | 8.63 | 255.04 | 10.46 | 8.17 | 210.60 | 9.24 | 8.47 |
| Condition 3 | Influent | 267.57 | 9.80 | 7.64 | 273.93 | 9.80 | 7.64 | 267.57 | 9.80 | 7.64 | 273.93 | 9.80 | 7.64 |
| | Port 1 | 206.86 | 8.50 | 8.58 | 210.48 | 8.50 | 8.58 | 201.77 | 9.12 | 8.30 | 215.74 | 9.12 | 8.30 |
| | Port 2 | 214.18 | 8.11 | 8.43 | 212.08 | 8.14 | 8.43 | 707.14 | 9.17 | 8.39 | 237.82 | 9.17 | 8.39 |
| | Effluent | 224.00 | 9.03 | 8.63 | 209.68 | 9.03 | 8.63 | 210.6 | 9.24 | 8.47 | 236.26 | 9.24 | 8.47 |

TABLE 18

Summary of effluent nutrient removal for iron filing variation

| Iron filing content | Influent Concentration 1 | | | Influent Concentration 2 | | | Influent Concentration 3 | | |
| --- | --- | --- | --- | --- | --- | --- | --- | --- | --- |
| | Ammonia removal | TP removal | TN removal | Ammonia removal | TP removal | TN removal | Ammonia removal | TP removal | TN removal |
| 2.5% | 80.27% | 38.01% | 71.88% | 95.01% | 90.54% | 83.79% | 89.75% | 92.71% | 80.24% |
| 5% | 98.17% | 83.76% | 91.50% | 96.11% | 81.10% | 90.94% | 95.14% | 91.76% | 93.94% |
| 7.5% | 65.01% | 31.22% | 73.40% | 94.02% | 86.32% | 92.08% | 73.23% | 90.53% | 89.11% |
| 10% | 63.94% | 79.26% | 78.36% | 78.95% | 90.07% | 91.89% | 87.94% | 93.35% | 92.92% |

The effluent iron concentration was measured to observe possible iron leakage. In terms of the clay variation media, the iron ion concentrations varied for each influent condition (FIG. 24A-C). Additionally, because of the impact pH, DO, and ORP have on water quality, these parameters were measured (Table 19). The changes in ORP and DO can be related to the iron interaction with TP and ammonia removal. The pH ranged from 7 to 9, with ORP and DO between 150 mV to 348 mV and 7 mg/L to 11 mg/L, respectively. In general, the ORP values in the effluents were much smaller than those in the influents, which indicates the possibility that equilibrium was reached in the end of the column.

TABLE 19

Average measurements for ORP, DO, and pH for iron filing content variation when the clay content was 2% by volume

| | | 2.5% Iron filing | | | 5% Iron filing | | | 7.5% Iron filing | | | 10% Iron filing | | |
| --- | --- | --- | --- | --- | --- | --- | --- | --- | --- | --- | --- | --- | --- |
| Influent | Port | ORP (mV) | DO (mg/L) | pH | ORP (mV) | DO (mg/L) | pH | ORP (mV) | DO (mg/L) | pH | ORP (mV) | DO (mg/L) | pH |
| Condition 1 | Influent | 289.77 | 9.30 | 7.19 | 247.73 | 10.26 | 7.70 | 289.77 | 9.30 | 7.19 | 249.37 | 9.61 | 7.08 |
| | Port 1 | 175.81 | 7.45 | 8.20 | 261.92 | 10.61 | 8.51 | 101.53 | 7.43 | 8.58 | 170.44 | 8.17 | 8.42 |
| | Port 2 | 208.39 | 8.35 | 8.07 | 265.34 | 10.33 | 8.47 | 111.07 | 7.85 | 8.44 | 170.13 | 7.97 | 8.36 |
| | Effluent | 223.56 | 8.6 | 8.09 | 263.18 | 10.25 | 8.29 | 157.93 | 7.93 | 8.61 | 221.24 | 8.96 | 7.68 |
| Condition 2 | Influent | 267.00 | 8.95 | 7.37 | 340.73 | 10.80 | 7.19 | 267.00 | 8.95 | 7.37 | 277.33 | 11.22 | 7.31 |
| | Port 1 | 151.20 | 7.24 | 7.42 | 282.12 | 10.51 | 8.14 | 53.30 | 7.12 | 8.90 | 239.84 | 10.69 | 8.51 |
| | Port 2 | 199.07 | 8.04 | 8.18 | 280.71 | 9.77 | 7.89 | 114.82 | 8.22 | 8.54 | 236.06 | 10.62 | 8.39 |
| | Effluent | 178.50 | 8.58 | 8.31 | 283.56 | 10.25 | 8.12 | 213.40 | 8.70 | 8.31 | 244.34 | 10.71 | 8.11 |
| Condition 3 | Influent | 348.83 | 10.85 | 7.61 | 267.57 | 9.80 | 7.64 | 348.83 | 10.85 | 7.61 | 224.73 | 9.89 | 7.80 |
| | Port 1 | 336.44 | 10.72 | 8.30 | 206.86 | 8.50 | 8.58 | 281.74 | 10.51 | 8.78 | 139.34 | 8.05 | 8.54 |
| | Port 2 | 328.00 | 10.75 | 8.39 | 214.18 | 8.11 | 8.43 | 254.17 | 10.97 | 9.00 | 173.11 | 9.19 | 8.37 |
| | Effluent | 316.86 | 10.42 | 8.59 | 224.00 | 9.03 | 8.63 | 260.21 | 10.44 | 8.48 | 186.89 | 9.64 | 8.20 |

ANOVA was employed to determine if there was any considerable variation in the experimental values obtained from the column study with regards to clay/iron variation, influent conditions and the interactions between the two. The p-values obtained for average TN, TP, and ammonia removal for clay and iron filing content variation are presented in Table 20 and Table 21. Each analysis was considered statistically significant at a confidence interval of 95% ($\alpha=0.05$).

TABLE 20

ANOVA and p-values for clay content variation

| Columns | Interaction | Clay Content Variation | Influent Condition |
| --- | --- | --- | --- |
| TN Removal | | | |
| 2% clay vs. 4% clay | 0.787 | 0.026 | 0.679 |
| 2% clay vs. 6% clay | 0.342 | 0.011 | 0.671 |
| 2% clay vs. 8% clay | 0.447 | $2.07(10)^{-4}$ | 0.762 |
| 4% clay vs. 6% clay | 0.434 | 0.645 | 0.956 |

TABLE 20-continued

ANOVA and p-values for clay content variation

| Columns | Interaction | Clay Content Variation | Influent Condition |
| --- | --- | --- | --- |
| 4% clay vs. 8% clay | 0.530 | 0.836 | 0.958 |
| 6% clay vs. 8% clay | 0.904 | 0.326 | 0.271 |
| TP Removal | | | |
| 2% clay vs. 4% clay | 0.041 | 0.630 | 0.104 |
| 2% clay vs. 6% clay | $9.54(10)^{-4}$ | 0.088 | 0.057 |

TABLE 20-continued

ANOVA and p-values for clay content variation

| Columns | Interaction | Clay Content Variation | Influent Condition |
| --- | --- | --- | --- |
| 2% clay vs. 8% clay | 0.309 | 0.036 | 0.514 |
| 4% clay vs. 6% clay | 0.002 | 0.237 | 0.022 |
| 4% clay vs. 8% clay | 0.253 | 0.100 | 0.188 |
| 6% clay vs. 8% clay | 0.029 | 0.521 | 0.019 |
| Ammonia Removal | | | |
| 2% clay vs. 4% clay | 0.387 | $6.91(10)^{-3}$ | 0.368 |
| 2% clay vs. 6% clay | 0.711 | 0.033 | 0.486 |
| 2% clay vs. 8% clay | 0.209 | $1.78(10)^{-3}$ | 0.356 |
| 4% clay vs. 6% clay | 0.264 | 0.357 | 0.779 |
| 4% clay vs. 8% clay | 0.357 | 0.101 | 0.233 |
| 6% clay vs. 8% clay | 0.199 | 0.028 | 0.491 |

TABLE 21

ANOVA and p-values for iron filing content variation

| Columns | Interaction | Iron Filing Content Variation | Influent Condition |
|---|---|---|---|
| TN Removal | | | |
| 2.5% iron filing vs. 5% iron filing | 0.147 | $1.10(10)^{-4}$ | 0.135 |
| 2.5% iron filing vs. 7.5% iron filing | 0.526 | 0.051 | 0.002 |
| 2.5% iron filing vs. 10% iron filing | 0.531 | $1.78(10)^{-3}$ | 0.001 |
| 5% iron filing vs. 7.5% iron filing | 0.004 | 0.020 | $3.38(10)^{-19}$ |
| 5% iron filing vs. 10% iron filing | $3.71(10)^{-3}$ | 0.020 | $3.39(10)^{-19}$ |
| 7.5% iron filing vs. 10% iron filing | 0.643 | 0.234 | $8.09(10)^{-17}$ |
| TP Removal | | | |
| 2.5% iron filing vs. 5% iron filing | 0.015 | 0.030 | 0.013 |
| 2.5% iron filing vs. 7.5% iron filing | 0.985 | 0.694 | $1.69(10)^{-3}$ |
| 2.5% iron filing vs. 10% iron filing | 0.062 | 0.083 | $3.84(10)^{-3}$ |
| 5% iron filing vs. 7.5% iron filing | 0.032 | 0.027 | 0.028 |
| 5% iron filing vs. 10% iron filing | 0.237 | 0.251 | 0.144 |
| 7.5% iron filing vs. 10% iron filing | 0.098 | 0.063 | 0.100 |
| Ammonia Removal | | | |
| 2.5% iron filing vs. 5% iron filing | 0.026 | $8.58(10)^{-3}$ | $3.94(10)^{-16}$ |
| 2.5% iron filing vs. 7.5% iron filing | 0.556 | 0.139 | $3.47(10)^{-9}$ |
| 2.5% iron filing vs. 10% iron filing | 0.026 | $1.37(10)^{-3}$ | $7.52(10)^{-15}$ |
| 5% iron filing-7.5% iron filing | 0.092 | 0.011 | $9.59(10)^{-10}$ |
| 5% iron filing vs. 10% iron filing | $2.58(10)^{-6}$ | $2.91(10)^{-8}$ | $6.33(10)^{-18}$ |
| 7.5% iron filing vs. 10% iron filing | 0.268 | 0.935 | $5.39(10)^{-9}$ |

The p-value for TN and ammonia removal for the clay and influent interaction and influent condition specify acceptance of the null hypothesis. As a result, the mean TN and ammonia removals for clay variations are not significantly different and demonstrate no interaction between the varying influent conditions and clay contents. However, p-values for clay content variation denote rejection of the null hypothesis for the columns with 2% clay, while the other three columns denote acceptance of the null hypothesis. This implies the average nutrient removals for clay variations are different for columns with 2% clay, whereas the average nutrient removals for clay filing variations are the same for the other three columns. Overall, the p-values for TP removal for the clay content and influent variations specify interaction between influent conditions and clay variations in the columns by rejecting null hypothesis. Moreover, the majority of p-values for the individual clay content variations and the different influent conditions accept the null hypothesis, thus TP removal for clay variations and verifying influent conditions are not significantly different.

In iron filing content variation, most p-values for TN and TP removals for the iron filing variations and different influent conditions specify no interaction and accept the null hypothesis. Overall, the p-values for individual iron filing content variation and influent conditions denote the rejection of null hypothesis, suggesting significant difference in TN removal between these two variables. It is suggested that the average TP removals for iron filing variations are not significantly different. However, the p-values for the different influent conditions suggest TP removals for varying influent conditions are the same. For influent condition variations the null hypothesis is rejected, specifying ammonia removal for different influent conditions are not the same. The p-values for iron filing variation show rejection of the null hypothesis, suggesting a difference in ammonia removals for iron filing variations. Additionally, most of the p-values indicate rejection of the null hypothesis, denoting an interaction between varying iron filing and influent conditions for ammonia removal.

Discussion

The quantity of clay and iron filing particles in media can influence the chemical reactions contributing to nutrient removal. Ammonia concentration can be affected by the quantity of iron filing particles present in the media, as iron can interact with nitrate to produce ammonium. Clay is inexpensive and has a high adsorption capacity (Moharami and Jalali, 2015). However, clay may adhere to the iron filing particles, reducing the available surface area required for TP removal. This implies that a higher clay content media may have a larger negative effect on TP removal. Yet, clay can interact with iron filings to attain TN removal (Chang et al., 2018b). For comparison of nutrient removal efficiency, other green sorption medias with components similar to IFGEM-3 are delineated and compared in Table 22. The TP removal of IFGEM-3 is similar to the Minnesota Filter and iron and aluminum hydroxide coated filter media, while the TN and ammonia removal is higher than BAM media.

TABLE 22

Comparison of nutrient removal performance for green-sorption media

| Sorption Media | Composition | Ammonia Removal | TP Removal | TN Removal | Nitrite Removal | Nitrate Removal | NOx | Reference |
|---|---|---|---|---|---|---|---|---|
| BAM | 85.0% sand (volume) 10.0% tire crumb (volume) 5.0% clay (volume) (Fixed-bed column studies) | (−127)-14% | 60% | 42-51% 52-80% (ground water) 62-70% | — | — | 72% | Hood et at. (2013); Chang et al. (2018a); Wen et al. (2018) |
| | 75.0% expanded clay (volume) 25.0% tire crumb (volume) (Test bed roadside Swale study) | — | 71% | — | — | — | — | Hood et al. (2013) |
| | 59.0% sand (volume) 14.0% tire crumb (volume) | 65.7% | — | 69% | — | 34.6-96.9% | — | O'Reilly et al. (2012b) |

TABLE 22-continued

Comparison of nutrient removal performance for green-sorption media

| Sorption Media | Composition | Ammonia Removal | TP Removal | TN Removal | Nitrite Removal | Nitrate Removal | NOx | Reference |
|---|---|---|---|---|---|---|---|---|
| | 26.0% clay (volume) (Stormwater dry ponds) 10.0% sawdust (volume) 45.0% tire crumb (volume) 45.0% expanded clay (volume) (Stormwater wet ponds) | — | 25-83% | 17-47% | — | — | — | Ryan et al. (2010) |
| | 15.0% sawdust (volume) 15.0% tire crumb (volume) 20.0% limestone (volume) 50.0% sand (volume) (Fixed-bed column study) | 64-100% | >99% | — | — | 65.4-98.72% | — | Hossain et al. (2010) |
| IFGEM-1 | 96.2% sand (volume) 3.8% iron filing(volume) (Fixed-bed column study) | — | 45%-80% | — | — | 85%-90% | — | Chang et al. (2018b) |
| IFGEM-2 | 80.0% sand (volume) 10.0% tire crumb (volume) 5% clay (volume) 5.0% iron Filing (volume) (Fixed-bed column study) | — | 85% | — | — | 61%-92% | — | Chang et al. (2018b) |
| IFGEM-3 | 83.0% sand (volume) 10.0% tire crumb (volume) 2% clay (volume) 5% iron filing (volume) (Fixed-bed column study) | 95%-98% | 84-92% | 91-94% | — | — | — | This study |
| SCL (Sandy Clay Loam) | Sandy clay loam (Fixed-bed column study) | — | — | — | 93%-94% | 64%-90% | — | Güngör and Ünlü (2005) |
| LS (Loamy Sand) | Loamy sand (Fixed-bed column study) | — | — | — | 95% | 93% | — | Güngör and Ünlü (2005) |
| SL (Sandy Loam) | Sandy loam (Fixed-bed column study) | — | — | — | 83%-96% | 45%-73% | — | Güngör and Ünlü (2005) |
| Minnesota Filter | 5.0% iron filings (weight) 95.0% sand (weight) (Fixed-bed column study) | — | 88.5% | — | — | — | — | Erickson et al. (2012) |
| | 10.7% iron filings (weight) 89.3% sand (weight) (Stormwater wet pond) | — | 60-90% | — | — | — | — | Erickson et al. (2012) |

TABLE 22-continued

Comparison of nutrient removal performance for green-sorption media

| Sorption Media | Composition | Ammonia Removal | TP Removal | TN Removal | Nitrite Removal | Nitrate Removal | NOx | Reference |
|---|---|---|---|---|---|---|---|---|
| Iron and Aluminum Hydroxide coated Filter Media | Sand Olivine Aluminum chloride and ferric chloride (Fixed-bed column study) | — | 70%-90% | — | — | — | — | Ayoub et al. (2001) |

The results obtained from the clay content variation (2, 4, 6, and 8% clay content) by volume suggests the 2% clay content media has the highest ammonia removal (98.17%) in the effluent, whereas 8% clay content has the lowest ammonia removal (61.46%) with respect to port 1 (Table 16). The change in ammonia concentration from port 1, port 2, and the effluent port demonstrates a decrease in ammonia concentration from port 1 to the effluent, contributing to ammonia removal and recovery (FIG. 19A-C). The significant decrease in ammonia concentration between sample port 1 and port 2 suggests that the ammonia recovery potential of the media is related to the adsorption characteristics of clay.

Moreover, all the clay contents exhibit adequate TN removal. The 2% clay content media obtained the highest TN removal of 92.34%, whereas the 4% clay content media performed the least efficiently, with a TN removal of 76.49%. On the contrary, the TP removal was not consistent throughout the distinct influent conditions. For the first influent condition the 4% clay content media obtained a TP removal (93.0%) in the effluent followed by 2% clay content (83.76%). In the second influent condition, the 6% clay was followed by 2% content media with a TP removal of 95.47% and 81.10%, respectively. In the third influent condition the 2% clay media had the highest TP removal (91.76%). Further, a comparison of the percent of ammonia and NOx (nitrate-nitrite) concentration to the TN concentration in the effluent ports for the four clay variations suggests that the 4% clay content media has a larger ammonia concentration in the effluent in contrast with the 2%, 6%, and 8% clay contents. More details can be seen in the supplemental data set.

The iron filing content variation results support identifying the optimal iron filing percent content once the clay percent content can be established. From the average port ammonia concentration (FIG. 22A-C), a decreasing pattern was noted for the ammonia concentrations after Port 1. In general, the media with the 5% iron filing percent content obtained the highest ammonia, TP, and TN percent removals (Table 18). This can be attributed to the oxidation of ferric ions by nitrite (Ssrensen, 1982). The TP removal efficiencies for the second and third influent conditions were very similar, with the 5% iron filing content obtaining the highest TP removal for influent 1 and 3. The relation observed between the clay content variation and the TP removal was not consistent for all media. For the first influent the 5% iron filing content obtained the maximum removal (83.76%) followed by 10% iron filing content (79.26%). In the second and third influent conditions the 5% iron filing content did not obtain the highest TP removal. However, the determined TP removals of 81.15% and 91.76% were close in range to the maximum removals obtained by the other media.

The highest ammonia removal was accomplished by the 5% iron filing composition. For some influent conditions the iron concentrations appeared relatively large, although the results were not consistent. Human factors could have impacted the homogeneity of the media mixture, as each media mix was produced by hand. In addition, an iron-filing particle could have been collected with the water sample, producing excess dissolved iron in the sample. Having excess iron filings in the media or iron filing particle(s) in the water sample after collection could have produced the observed high iron ion concentration in the effluent of the media. Thus, the measured iron concentration in the effluent may not be representative of iron leakage caused by iron filings.

Removal of phosphorus can be conducted via physical, chemical, and biological methods (Mateus and Pinho, 2010). Removal of phosphorus can be obtained from the addition of ferrous ion (Fe (II)) or ferric ion (Fe (III)) to produce a precipitate. The iron composition is introduced from the iron filing composition of the IFGEM-3 and even the stormwater characteristics. Phosphate precipitation from ferrous and ferric ions are presented in the chemical reactions (EQ. 10 and 11) (Ghassemi and Recht, 1971; Thistleton et al., 2002).

$$Fe^{2+} + H_2PO_4^- = Fe_3(PO_4)_{2(s)} + H^+ \qquad (10)$$

$$Fe^{+3} + PO_4^{3-} = FePO_{4(s)} \qquad (11)$$

In ammonia removal, clay can serve as a medium for the ammonium ion to be adsorbed as an ion exchange process (Lee et al., 2009). In other words, clay material serves as an ion exchange for ammonium removal due to its high cation-exchange. Clay also serves as a screen that can prevent molecular particles from passing (Eturki et al., 2012). Ammonia in liquids can occur as ammonium and ammonia, depending on the water characteristics, and this chemical reaction is expressed in EQ. 12 (Eturki et al., 2012). Yet the interaction between iron ion and nitrate in a liquid produces ammonia and ferrous ion (EQ. 12). This ferrous ion can further interact with phosphate and aid in phosphorus removal, and the nitrate reduced to ammonium can be recovered in the media (Ruangchainikom et al., 2006). The electron sharing reaction between ammonium ion and ammonia is expressed in EQ. 12. Further, the redox reaction between iron and nitrate, which produces ferrous ion and ammonium ion, is described in EQ. 13.

$$NH_4^+OH^- = NH_3 + H_2O \qquad (12)$$

$$4Fe^0 + NO_3^- + 10H_3O^- \rightarrow 4Fe^{2+} + NH_4^+ + H_2O \qquad (13)$$

As a result, phosphorus removal may be achieved via chemical precipitation through the production of $Fe_3(PO_4)_2$ which can be achieved with the aid of iron filing particles in the media matrix promoting precipitation (FIG. 25). The negatively charged surface of clay particles also effectively recovers phosphates (Moharami and Jalali, 2015). This implies that nitrogen removal in the form of ammonia/ ammonium can be recovered with the aid of clay material through chemical reactions. Moreover, the resultant high ammonia and TP and TN removal efficiencies obtained from the interaction of the IFGEM components indicates a great potential for nutrient recovery. Nitrogen and phosphorus fertilizers can be supplemented or substituted by exhausted green sorption media (Bansiwal et al., 2006; Sibrell et al., 2009). Due to the capacity for ammonia adsorption and phosphorus precipitation the reuse of the green sorption media (IFGEM-3) as soil amendment or fertilizer substitute is sustainable.

The ORP, DO, and pH values obtained from the influent and effluent ports for the clay and iron filing content variations indicates a relationship between each parameter. The decrease in ORP from the influent to the effluent ports in influent conditions 1 and 2 is observed (Table 16) in clay content variation. The cause could be attributed to ammonia oxidation and nitrate reduction due to the chemical interactions. The recipe with 6% clay content has the highest average ORP measurement indicating its higher capacity for oxidizing, whereas the recipe of 8% clay content has the lower average ORP measurement indicating its lower oxidizing capacity, while the 2% clay content media obtains a lower ORP indicating a lower oxidizing capability. The correlation between high ORP and DO values suggests higher oxygen availability and oxidative capability.

Similarly, there is a decrease in ORP between the influent and effluent ports in the iron filing content variation (Table 17). Furthermore, the DO values increase from influent to effluent for both component variations. However, these measured DO values were close in range. Thus, a relation between TP, ammonia, and ORP can be addressed. When ORP variation is minimal and nutrient concentrations are not reduced further, an equilibrium state can be achieved. At this point the chemical reaction has reached equilibrium, preventing further nutrient removal.

Conclusion

The recipe for 2% clay, 83% sand, 10% tire crumb, and 5% iron filing content by volume proved optimal for overall nutrient removal and recovery. When analyzing the ammonia removal and recovery potential at the effluent with respect to port 1, this media had the highest ammonia removal efficiency (95%-98%). The highest TP removal varied among media with respect to each influent condition. Nevertheless, the recipe of 2% clay and 5% iron filing content obtained high TP removals (81%-92%). Alike, the highest TN removal (91%-94%) by IFGEM-3 was consistent for most of the influent conditions. The effluent analysis of iron demonstrated varied results for each media and influent condition analyzed. This suggests that the measured iron in the effluent is dependent on sample collection and may not be representative of iron leakage. It is further concluded that all mixes studied have the potential to recover ammonia and orthophosphate and thus variations in the percentage of iron filings (2.5-10% by volume) in the manufacturing of the media on a large scale would not significantly reduce recovery potential.

As the overall nutrient removals for ammonia, TN, and TP were above 80%, an adequate medium for nutrient abatement is suggested. This high nutrient removal positions IFGEM-3 as an adequate nutrient recovery media for fertilizer or soil amendment implementation. Since nutrient performance in real world applications is unknown, future work would include the utilization of stormwater to determine the nutrient removal and recovery potential for combined stormwater and reclaimed wastewater.

Example of IFGEM-3 Used on Stormwater

Nutrient pollution from nonpoint sources has been an increasing issue in stormwater treatment, with nitrogen and phosphorus being two primary contaminants of concern (Commoner, 1991; Chang et al., 2004; Boserup, 2017). Inorganic nitrogen such as nitrate ($NO_3^-$), nitrite ($NO_2$), and ammonia ($NH_3$)/ammonium ($NH_4^+$) in stormwater runoff can deteriorate the ecosystem structure and function in receiving water bodies. The impact of dissolved organic matters (DOMs), especially dissolved organic nitrogen (DON), has been investigated in drinking water treatment (Herzsprung et al., 2012; Liu et al., 2012) and wastewater treatment (Hu et al., 2018a). However, few studies have been performed in regard to the DON in real world stormwater runoff and the subsequent impact on nutrient removal in soils and filtration media (Chang et al., 2018a; Lusk and Toor, 2016a; Lusk and Toor, 2016b). Deepening the understanding of the linkages between DON species and microbial ecology in soils and filtration media that affect nutrient removal in both the natural system and the built environment is thus deemed essential and critical (Chang et al., 2018a; Lusk and Toor, 2016a). Accordingly, the IFGEM-3 composition described in greater detail above was tested as a filtration media for stormwater.

Natural soil and three green sorption media were selected for this experiment. The natural soil for this study was collected from a basin (known as Basin 9B) located in Silver Springs, close to Silver Springs State Park in Florida. The soil from this basin was utilized as a control (base) in order to compare its nutrient removal with those of the three different green sorption media (filtration media). The percent composition by volume for each green sorption media is detailed in Table 23. The BAM mixes were modified by adding ground iron-filing as a new media component to generate IFGEM-1 and IFGEM-3 as a continuation of previous IFGEM series study based on IFGEM-2 (Chang et al., 2018b). IFGEM-1 and IFGEM-3 were then fully tested in this study to explore their physicochemical and microbiological properties.

TABLE 23

| Composition | BAM | IFGEM-1 | IFGEM-2 | IFGEM-3 |
|---|---|---|---|---|
| a. Media Matrix Composition by Volume | | | | |
| Sand (%) | 85 | 96.2 | 80 | 83 |
| Tire crumb (%) | 10 | — | 10 | 10 |
| Clay (%) | 5 | — | 5 | 2 |
| Iron filing (%) | — | 3.8 | 5 | 5 |
| b. Media Matrix Composition by Weight | | | | |
| Sand (kg/m³) | 1850.0 | 2094.0 | 1741.1 | 1806.0 |
| Tire crumb (kg/m³) | 97.0 | — | 97.0 | 97.0 |
| Clay (kg/m³) | 51.0 | — | 51.0 | 20.0 |
| Iron filing (kg/m³) | — | 259.0 | 340.0 | 340.0 |

To determine the moisture content of media samples, approximately 1 to 1.5 grams of media samples were oven-dried at a temperature of 104° C. for 24 hours. At the end of this time, media samples were measured, and the weight data were placed into Eq. 14 to obtain the moisture content from the different media in percentage.

$$MC = \frac{W - D}{W} * 100 \qquad (14)$$

where W=wet media weight, and D=dry media weight.

A tracer study with rhodamine dye was conducted to determine the hydraulic retention time (HRT) and to understand the hydraulic patterns of the natural soil, BAM, IFGEM-1, and IFGEM-3. After adding approximately 1 to 2 ml of diluted dye to the top of each column, water samples were collected for the effluent of each column in 10-15 min time intervals. Collected water samples were analyzed immediately after collection using the AquaFluor™ fluorometer (model: 8000-010). The measured concentration (ppb) vs. time (min) collected were plotted to observe the hydraulic pattern of the dye in each column.

Four identical columns were constructed, each consisting of a PVC pipe with a diameter of 10 cm (4 in) divided into 3 sections of 30 cm (12 in) for media sampling purposes. A filter with a layer of pebbles was placed at the bottom of each column section to prevent clogging, and the column sections were sealed to prevent outside interference. Columns identified with the letters A, B, C, and D were filled with natural soil, BAM, IFGEM-1, and IFGEM-3, respectively. FIG. 26 illustrates the setup of the fixed-bed column study, including the location of media sample ports 1 and 2. The column study procedure began with an incubation period of 4 weeks, during which stormwater from a stormwater wet detention pond beside the student union of the University of Central Florida was collected and utilized to constantly feed each column. At the culmination of the incubation period, stormwater spiked with nitrate (1000 mg/L standard solution) and phosphate (50 mg/L standard solution) at a concentration of 0.9 mg/L $NO_3^-$ and 0.3 mg/L $PO_4^{3-}$ for condition 1 (denoted as I1 hereafter) was utilized to feed each column for 3 hours. Subsequently, water samples were collected from the influent and effluent ports of each column. Following, the columns were flushed with stormwater alone for more than 24 hours to counteract any possible media changes due to the influent condition. The same process (after incubation) was repeated for two more time-varying influent conditions of 1.3 mg/L $NO_3^-$, 0.5 mg/L $PO_4^{3-}$ for condition 2 (denoted as I2 hereafter), and 1.7 mg/L $NO_3^-$, 0.7 mg/L $PO_4^{3-}$ for condition 3 (denoted as I3 hereafter). The downward influent flow rate of 8 ml/min (2.33 in/hr) was maintained constantly with peristaltic pumps.

During the biofilm incubation process, water samples from the stormwater collection pond were collected on three occasions to obtain background information/composition of the stormwater. The time interval in between collection events was approximately 10 days. Additionally, water samples from the influent and effluent ports of each column were collected at the culmination of the 3-hour feeding time for conditions 1, 2, and 3. Collected samples were analyzed in-house for pH, oxidation-reduction potential (ORP), and dissolved oxygen (DO) immediately after collection. The Waterproof Double Junction pH Testr® 30 was used to measure pH, while DO and ORP were measured using the HACH HQ40D IntelliCAL/MTC101.

Water samples collected in triplicates were delivered to ERD laboratories (Environmental Research and Design, Inc) for measurement of TN, NOx, ammonia. TP, alkalinity, iron, and aluminum within 24 hours of collection. DON was calculated as the difference between TN, NOx, and ammonia. The methods utilized for the parameter analysis follow the "Standard Methods for the Examination of Water and Wastewater, 22$^{nd}$ edition" (Carranzo, 2012), and the methods' identification numbers and names can be found in Table 4.

TABLE 24

Water parameter analysis methods

| Parameter | Method |
|---|---|
| TN | SM-21, Sec 4500 NC |
| NOx | SM-21, Sec 4500-NO3, F |
| Ammonia | SM-21, Sec 4500-NH3, G |
| TP | SM-22, Sec 4500 P F |
| Alkalinity | SM-21 Sec. 2320 B |
| Iron (dissolved) | SM-22 Sec. 3111 B |
| Aluminum (dissolved) | SM-22 Sec. 3111 D |

The physiochemical interactions, driven primarily by clay and iron, can reduce nitrate, adsorb ammonia, and precipitate and adsorb phosphate collectively. The interactions of iron and nitrate in water can reduce nitrate, producing ferrous ion and ammonium (Eq. 15), which can be adsorbed by clay. The negative charges of clay particles enable the adsorption of cation such as ammonium and potassium to balance the charge (Nieder et al., 2011). Further, a series of precipitations of phosphate from interactions among ferrous or ferric ions and hydroxide from hydrolysis of water are expressed by Eqs. 16, 17, and 18. Aluminum, which is a heavy metal oftentimes present in stormwater, can form a low soluble solid in the presence of phosphate (Eq. 19).

$$4Fe^0 + NO_3^- + 10H_3O^- \rightarrow 4Fe^{2+} + NH_4^+ 13H_2O \quad (15)$$

$$Fe^{2+} + H_2PO_4^- = Fe_3(PO_4)_{2(s)} + H^+ \quad (16)$$

$$Fe^{+3} + PO_4^{3-} = FePO_{4(s)} \quad (17)$$

$$Fe^{+2} + 2OH^- = Fe(OH)_{2(s)} \quad (18)$$

$$Al^{+3} + PO_4^{3-} = AlPO_{4(S)} \quad (19)$$

The interactions of cation species in stormwater, including calcium, magnesium, potassium, and ammonium, can also aid in nitrate and phosphate adsorption and precipitation. Phosphate in the form of orthophosphates can be precipitated by binding with calcium, forming calcium phosphate salts such as dicalcium phosphate (Eq. 20) and tricalcium phosphate (ATP) (Eq. 21). Calcium nitrate salts can be produced via three chemical reactions involving calcium in stormwater, which can be represented in alkalinity. Calcium carbonate and/or calcium phosphate can react with nitric acid (Eqs. 22 and 23), and calcium hydroxide and ammonium nitrate can also interact (Eq. 24). At high temperatures, calcium nitrate can be decomposed to release nitrite ions (Eq. 25).

$$Ca^{+2} + PO_4^{3-} + H^+ = CaHPO_4 \quad (20)$$

$$3Ca(OH)_2 + 2H_3PO_4 \rightarrow Ca_3(PO_4)_{2(s)} + H_2O \quad (21)$$

$$CaCO_3 + 2HNO_3 \rightarrow Ca(NO_3)_{2(s)} + CO_2 + H_2O \quad (22)$$

$$Ca_3(PO_4)_{2(s)} + 6HNO_3 + 12H_2O \rightarrow 2H_3PO_4 + Ca(NO_3)_{2(s)} + 12H_2O \quad (23)$$

$$Ca(OH)_2 + 2NH_4NO_3 \rightarrow Ca(NO_3)_{2(s)} + 2NH_4OH \quad (24)$$

$$2Ca(NO_3)_{2(s)} \rightarrow 2CaO + 4NO_2^- + O_2 \quad (25)$$

In the presence of magnesium, magnesium nitrate is formed from the reaction of nitric acid. Magnesium phosphates such as $Mg_3(PO_4)_2 \cdot 8H_2O$ (bobbierite), $MgHPO_4 \cdot 3H_2O$ (newberyite), $Mg_3(NH_4)_2H_4(PO_4)_4 \cdot 8H_2O$ (hannayite), $Mg(NH_4)_2H_4(PO_4)_2 \cdot 4H_2O$ (shertelite), and $MgNH_4PO_4 \cdot 6H_2O$ (struvite) are products of the reaction of magnesium and phosphate in aqueous solutions (Golubev et al., 2001). These salts can form from magnesium ions or magnesium measured in alkalinity.

In the nitrogen cycle, nitrogen in the form of $NH_4^+$ is converted to $NO_3^-$ through nitrification; subsequently $NO_3^-$ is converted to $N_2$ by the denitrification process, thus leaving the system. AOB and NOB form the first nitrification pathway, complemented by denitrifying bacteria (denitrifiers) in one of the two nitrate reducing pathways of dissimilatory nitrite reduction to nitrogen gas (Tugtas and Pavlostathis, 2007). However, the recent discovery of complete ammonia oxidizer (commamox), which oxidizes $NH_4^+$ and reduces $NO_2^-$ to $NO_3^-$ through a single microorganism, provides a more holistic understanding of the nitrogen cycle, as this was originally believed to be a two-part process driven by AOB and NOB (Daims et al., 2015; Van Kessel et al., 2015).

In the second nitrate reduction pathway, $NO_3^-$ can also be converted to $NH_4^+$ through the DNRA process, and this analysis is important since it prompts an increase of ammonia while conserving N in the system (Giblin et al., 2013). The biological activity of DNRA bacteria in the presence of nitrate and organic carbon as an electron donor can generate ammonia (Tugtas and Pavlostathis, 2007). Furthermore, anaerobic denitrification in anoxic conditions performed by annamox bacteria can convert $NH_4^+$ with $NO_2^-$ as electron acceptor to produce $N_2$ (Oshiki et al., 2016: Sonthiphand et al., 2014). qPCR was used to quantify these microbial species in both the natural soil and the green sorption media (Chang et al., 2018a).

Media and soil samples were collected from the locations at the top (location 1), port 1 (location 2), and port 2 (location 3) of each column two and four weeks after the beginning of the experiment (before the addition of spiked stormwater) to assess biofilm growth. All media samples were stored at −80° C. after collection until conducting qPCR (quantitative polymerase chain reaction) analysis. qPCR analyses were thus employed to help realize the microbial population dynamics and even microbial ecology. DNA extraction was performed via the DNeasy PowerSoil Kit (Qiagen) by following the steps recommended by the qPCR vendor. The primer and standards utilized were acquired from ThermoFisher Scientific and GenScript. A 48 well plate was used to process the samples via the StepOne-Plus qPCR instrument. Each well was composed of 10 µL of SybrGreen, 1.6 µL of primer (0.8 µL forward and 0.8 µL reverse), 5 µL of sample, and 3.4 µL of qPCR water. Table 25 provides a summary of the primer and oligonucleotide sequence, the qPCR running method, and the relevant reaction. The amoA genes were investigated for AOB and comammox (Dionisi et al., 2002; Xia et al., 2018), whereas nxrAB (Daims et al., 2015), nirS (Azziz et al., 2017), nrfA (Yin et al., 2017), and 16S rRNA (Orschler et al., 2019) genes were explored to target NOB, denitrifiers, DNRA, and anammox, respectively.

Individual water samples collected at the culmination of each of the three inlet condition runs were stored for further DON analyses. Impurities were reduced by preparing samples via solid phase extraction by passing the samples through a filtration process utilizing methanol to elude the sorbed bed, following specifications by Lanza and Sellergren (2001), and preserved at −20° C. These samples were delivered to the National High Magnetic Field Laboratory at Florida State University for molecular-level characterization of the dissolved organic compounds by Fourier transform ion cyclotron resonance mass spectrometry (FT-ICR-MS) at 9.4 tesla (Kaiser et al., 2011). The heteroatom class relative abundance, average number of C, average double bond equivalents, and average H/C for acidic compounds detected by FT-ICR MS were assigned elemental compositions with PetroOrg® software for comparison of the molecular composition of the influents and effluents (Corilo, 2014).

TABLE 25

Summary of target bacteria primer, running method, and reaction

| Bacteria (target gene) | Prime Name | Oligonucleotide Sequence | Running Method | Reaction | Reference |
|---|---|---|---|---|---|
| Ammonia Oxidizing Bacteria (amoA) | amoA1F amoA2R | GGGGTTTCTACTGGTGGT CCCCTKGSAAAGCCTTCTTC | 2 min 50° C. and 2 min 95° C.; 45 cycles [15 s at 95° C. and 1 min at 62° C.] | $NH_3 + O_2 \rightarrow$ $NO_2^- + 3H^+ +$ $2e^-$ | Rotthauwe et al. (1997) |
| Nitrite Oxidizing Bacteria (nxrAB) | NSR113F NSR1264R | CCTGCTTTCAGTTGCTACCG GTTTGCAGCGCTTTGTACCG | 2 min 50° C. and 2 min 95° C.; 45 cycles [15 s at 95° C. and 1 min at 62° C.] | $NO_2^- + H_2O \rightarrow$ $NO_3^- + 2H^+ + 2e^-$ | Dionisi et al. (2002) |
| Anaerobic ammonium oxidation (amx) | amx809-F amx1066-R | GCCGTAAACGATGGGCACT AACGTCTCACGACACGAGCTG | 2 min 50° C. and 2 min 95° C.; 45 cycles | $NH_4^+ + NO_2^- \rightarrow$ $N_2 + 2H_2O$ $*NO_2^- + Fe^{2+} + 2H^+ \rightarrow$ $Fe^{3+} + NO + H_2O$ **Organic matter + $Fe^{3+} \rightarrow CO_2 + Fe^{2+}$ | Snoeyenbos-West et al. (2000); Tsushima et al. (2007) |

TABLE 25-continued

Summary of target bacteria primer, running method, and reaction

| Bacteria (target gene) | Prime Name | Oligonucleotide Sequence | Running Method | Reaction | Reference |
|---|---|---|---|---|---|
| Denitrifying bacteria (nirS) | Cd3AF R3Cd | GTSAACGTSAAGGARACSGG GASTTCGGRTGSGTCTTGA | [15 s at 95° C. and 1 min at 62° C.] 2 min 50° C. and 10 min for 95° C.; 40 cycles [60 s at 95° C.; 60 s at 51° C.; and 60 s at 60° C.] | $NO_3^- + 2H^+ + 2e^- \rightarrow NO_2^- + H_2O$ ***$NO_2^- + 2H^+ + e^- \rightarrow NO + H_2O$ $2NO + 2H^+ + 2e^- \rightarrow N_2O + H_2O$ $N_2O + 2H^+ + 2e^- \rightarrow N_2 + H_2O$ | Azziz et al. (2017) |
| Dissimilatory nitrate reducing bacteria (nrfA) | nrfA2F nrfA2R | CACGACAGCAAGACTGCCG CCGGCACTTTCGAGCCC | 2 min 50° C. and 10 min for 95° C.; 40 cycles [30 s at 95° C.; 60 s at 60° C.; 60 s at 72° C.] | $2\,CH_2O + NO_3^- + H_2O \rightarrow NH_4^+ + SO_4^{-2}$ | Yin et al. (2017) |
| Complete Ammonia Oxidation (amoA) | A378f C616r | TGGTGGTGGTGGTCNAAYTAT ATCATCCGRATGTACTCHGG | 2 min 50° C. and 10 min for 95° C.; 40 cycles [30 s at 95° C.; 30 s at 52° C.; 30 s at 72° C.] | $NH_4^+ + 2O_2 \rightarrow NO_3^- + H_2O + H^+$ | Xia et al. (2018) |
| Iron-reducing bacteria (Gmet0909) | 0909QF 0909QR | ATTGCAACGACTGTCACGAT GGGATTATCCATTGCCTTGA | 2 min 50° C. and 2 min 95° C.; 45 cycles [15 s at 95° C.; 60 s at 60.5° C.] | Organic matter + $Fe^{3+} \rightarrow CO_2 + Fe^{2+}$ | Stults et al. (2001) |

*chemical iron oxidation of Fe (II) and $NO_2^-$
**Iron reduction by iron reducing bacteria
***step in denitrification performed with the aid of enzyme nirS Results The result of the hydraulic pattern for each column is presented in FIG. 28. An extensive HRT of 726 min (12.1 hrs.) was observed in natural soil, while IFGEM-1 and IFGEM-3 experienced similar HRTs of 137 min (2.28 hrs.) and 124 min (2.25 hrs.), respectively. The shortest HRT was observed in BAM at 73 min (1.22 hrs.).

The comparative results of the moisture content for each column section are further delineated in FIG. 29. For natural soil and BAM, the moisture contents at each location remained comparable between week 2 and week 4. From week 2 to week 4 the moisture content decreased at the top of IFGEM-1 but increased for the other locations. Similarly, the moisture content for IFGEM-3 decreased at the top layer from week 2 to week 4, but an increase in moisture content was observed for the middle and bottom locations during the same period. The low moisture contents at week 4 at the top location of IFGEM-1 and IFGEM-3 could be attributed to conduits formed in the top section that caused a faster infiltration, thus retaining less water moisture in these locations. The moisture contents are indicative of the moist environment of the media during biofilm cultivation and the effect of infiltration.

The removal efficiencies of natural soil, BAM, IFGEM-1, and IFGEM-3 for TN, TP, and ammonia were determined from the mean effluent concentrations. TN removal was comparable for columns C (IFGEM-1) and D (IFGEM-3), which achieved the highest TN removals (Table 26). The highest TN removal of IFGEM-1, 85.39%, was attained under condition I1 (0.9 mg/L nitrate, 0.5 mg/L phosphate), and the highest TN removal of IFGEM-3, 96.86%, was obtained under condition I2 (1.3 mg/L nitrate, 0.5 mg/L phosphate). The second highest TN removal of IFGEM-1, 93.94%, was obtained under condition I3 (1.7 mg/L nitrate, 0.7 mg/L phosphate), followed by IFGEM-3, with a TN removal of 94.35%, under the same condition (Table 26). Natural soil and BAM achieved lower TN removal in the range of 46-73% for natural soil and 48-70% for BAM at all three conditions.

concentrations were observed in IFGEM-1 and IFGEM-3. The ammonia concentration of the total TN also mirrored ammonia removal. The large quantity of ammonia correlates with ammonia generation by IFGEM-1 in I1 and natural soil in I2. Similarly, large NOx concentrations, which result in lower TN removal, were present in the natural soil and BAM columns at all conditions, and the IFGEM-1 column at I2. Lastly, the investigation of dissolved iron and aluminum present at the influent and effluents confirmed high dissolved aluminum in the effluent of BAM and slightly lower concentrations in natural soil, IFGEM-1, and IFGEM-3 (FIG. 31). The dissolved iron concentration fluctuated for each column at every condition, with a noticeable decrease in IFGEM-1 at all conditions, as well as natural soil, BAM, and IFGEM-1 at I3.

TABLE 26

Summary of mean removal efficiencies (%) for measured parameters

| Column | Port | Total Nitrogen (%) | Total Phosphorus (%) | NOx (%) | Ammonia (%) | Dissolved Iron (%) | Dissolved Aluminum (%) | Alkalinity (%) |
|---|---|---|---|---|---|---|---|---|
| Influent = 0.9 mg/L Nitrate, 0.3 mg/L Phosphate (I1) | | | | | | | | |
| A | Effluent | 73.14 | 10.11 | 75.94 | 35.64 | −5.01 | −40.10 | −166.04 |
| B | Effluent | 55.10 | 28.84 | 60.13 | 22.93 | −144.88 | −5075.25 | −14.40 |
| C | Effluent | 85.39 | 81.65 | 98.76 | −61.95 | 89.98 | 43.07 | 26.79 |
| D | Effluent | 80.83 | 50.19 | 98.85 | 29.56 | −38.78 | −63.37 | 4.91 |
| Influent = 1.3 mg/L Nitrate, 0.5 mg/L Phosphate (I2) | | | | | | | | |
| A | Effluent | 46.09 | −176.82 | 72.49 | −191.86 | −118.42 | 7.60 | −162.05 |
| B | Effluent | 48.28 | 4.19 | 49.89 | 61.63 | −95.61 | −171.93 | −13.66 |
| C | Effluent | 90.46 | 60.26 | 98.56 | −22.09 | 46.49 | 43.27 | 15.27 |
| D | Effluent | 96.86 | 76.38 | 99.81 | 82.56 | −89.47 | 45.03 | 211.69 |
| Influent = 1.7 mg/L Nitrate, 0.7 mg/L Phosphate (I3) | | | | | | | | |
| A | Effluent | 66.62 | 63.85 | 71.76 | 56.94 | 41.22 | 63.11 | −121.23 |
| B | Effluent | 70.70 | 92.81 | 69.85 | 29.77 | 62.60 | −47.95 | 25.03 |
| C | Effluent | 93.94 | 91.64 | 99.23 | 63.01 | 62.60 | 95.08 | 34.86 |
| D | Effluent | 94.35 | 92.43 | 99.87 | 91.34 | 76.34 | 50.00 | 31.68 |

Note:
Minus signs in this table show release rather than removal.

A trend for TP removal was not as apparent throughout the different influent conditions. The highest TP removals were achieved by IFGEM-1 with a TP removal of 81.65% for I1, IFGEM-3 with TP removal of 76.38% in I2, and BAM with 92.81% in I3, followed by IFGEM-1. However, IFGEM-1 had a 91.64% TP removal in I3. Overall, TP removal increased from natural soil to BAM, IFGEM-1, and IFGEM-3, with natural soil having limited TP removal. Furthermore, ammonia removal was observed for the majority of the columns, with ammonia generation occurring for IFGEM-1 in I1, and natural soil and IFGEM-1 in I2. Ammonia removal was minimal at I1, with natural soil and IFGEM-3 achieving ammonia removals of 35.64%, and 29.56%, respectively. Higher ammonia removals of 82.56% and 91.34% for IFGEM-3 in I2 and I3, followed by BAM with 61.63% in I2, and IFGEM-1 with 63.01% in I3, were displayed.

The concentrations of the NOx, ammonia, and DON components of TN obtained from the difference between the measured TN, $NH_3$, and NOx for each column are delineated in FIG. 30. Natural soil and BAM presented the highest effluent TN concentrations, wherein the primary components were NOx, followed by ammonia. Lower effluent TN Changes in pH, ORP, DO, and alkalinity are critical indicators of variations in water quality characteristics. The measurements of pH, ORP, and DO for the fresh stormwater nutrient spiked influent and corresponding effluent are shown in Table 27. Overall, the pH in the effluent increased for every column, with the highest pH achieved by natural soil. However, there was not a consistent trend evident in relation to effluent ORP measurements. In general, the ORP in the effluent declined for natural soil, IFGEM-1, and IFGEM-3, with the effluent ORP for BAM being the highest, and even surpassing the influent for most conditions. Similarly, BAM had the highest effluent DO, followed by natural soil. However, IFGEM-1 and IFGEM-3 exhibited the lowest DO, with column D having the smallest DO measurement for I1 and I2. The alkalinity increased between the influent and effluent of the natural soil; however, values similar to or lower than the influent were observed for BAM, IFGEM-1, and IFGEM-3 at all conditions (FIG. 32). In general, the DO concentration was high for high alkalinity concentrations, with a decreasing trend from natural soil to IFGEM-3.

TABLE 27

Average pH, ORP and DO measurements of column study

| Column | Port | Influent = 0.9 mg/L Nitrate, 0.3 mg/L Phosphate (I1) | | | Influent = 1.3 g/L Nitrate, 0.5 mg/L Phosphate (I2) | | | Influent = 1.7 mg/L Nitrate, 0.7 mg/L Phosphate (I3) | | |
|---|---|---|---|---|---|---|---|---|---|---|
| | | pH | ORP | DO | pH | ORP | DO | pH | ORP | DO |
| | Influent | 8.13 | 319.47 | 8.33 | 7.80 | 256.05 | 8.05 | 7.48 | 192.63 | 7.76 |
| A | Effluent | 8.56 | 294.87 | 8.63 | 7.94 | 115.57 | 9.04 | 8.26 | 156.57 | 8.85 |
| B | Effluent | 8.31 | 340.80 | 8.91 | 7.58 | 125.50 | 9.07 | 8.09 | 232.63 | 9.10 |
| C | Effluent | 8.00 | 110.87 | 7.32 | 7.83 | 48.90 | 5.40 | 8.23 | 53.77 | 6.05 |
| D | Effluent | 8.34 | 95.50 | 4.37 | 7.87 | 62.30 | 4.19 | 7.96 | 174.93 | 6.54 |

The population density of the microbial ecology in charge of the nitrogen cycle was evaluated via qPCR for the natural soil and the three green sorption media at the second and fourth week of biofilm cultivation. The primary participants, based on their population densities, were Nitrite-Oxidizing Bacteria (NOB), comammox, denitrifiers, and Dissimilatory Nitrate Reducing bacteria (DNRA), as the population of anammox was determined to be under detection limits in all columns. Furthermore, the population quantity of AOB was significantly lower in week 2 and increased in week 4. This phenomenon was discovered and quantified by qPCR at the top (location 1) of all of the media, and port 2 (location 3) of the natural soil (FIG. 33). The low quantity of AOB could be a response to the presence of comammox, as the comammox population was notably higher and of a quantity similar to that of NOB. Comammox was concentrated at the top port for the three-sorption media, and all ports for natural soil. Overall, the density of comammox increased from week 2 to week 4, with the exception of IFGEM-1, which experienced a decrease.

In general, the density of NOB in natural soil decreased from week 2 to week 4, with the highest quantities at the top (location 1) and port 3 (location 3). NOB population increased from week 2 to week 4 for BAM, IFGEM-1, and IFGEM-3, with significant quantities at the top (location 1). The denitrifier population increased from week 2 to week 4 at all media locations except for location 1 (top) in natural soil, and location 2 (port 2) in BAM. A decrease in DNRA density between week 2 and week 4 was observed at locations 1 and 2 in natural soil, while an increase in DNRA population was found in BAM, IFGEM-1, and IFGEM-3. Lastly, the IRB microbial population was primarily detected at the top section (location 1) in week 2, with a decrease in population density starting from week 2, with the exclusion of location 2 in natural soil and location 1 in IFGEM-1.

Information specific to the ratios of the number of hydrogen, carbon, and oxygen atoms, such as O/C and H/C, and molecular formulas of N compounds in the presence of C, H, O, and N elements can be observed in van Krevelen diagrams and used for the classification of DON molecules. The difference between the DON composition distribution of O/C and H/C ratios and the relative abundance of DON heteroatom classes (nitrogen and oxygen atoms) between the influent and effluent are depicted in FIG. 34, FIG. 35, and FIG. 36 for I1, I2, and I3, respectively. The type of molecules corresponding to specific O/C and H/C ratios included in the van Krevelen diagram are lipids, proteins/amino sugars, lignins, carbohydrates, tannins, condensed aromatics, and unsaturated hydrocarbons (Antony et al., 2014). Proteins, amino sugars, and lipids are products of microbial metabolisms (Wu et al., 2018). Thus, lipids can signify cell growth and energy storage from DON utilization, as well as quantitative information about microbial communities (Zhang et al., 2003).

The abundance of lignins, unsaturated hydrocarbons, condensed aromatics, lipids, proteins, amino sugars, carbohydrates, and tannins increased in I1 for the effluent of natural soil and IFGEM-3 in comparison to the influent (FIGS. 34 (a),(d)). The relative abundance of the N1O and N2O heteroatom classes increased in the effluent. However, the composition varied slightly for BAM and IFGEM-1, with the production of condensed aromatics in BAM and carbohydrates, tannins, proteins, and amino sugars in IFGEM-1 (FIGS. 34 (b),(c)). The classes remained unchanged for BAM, and the relative abundance decreased in the effluent of IFGEM-1, which had fewer DON classes.

In I2 there was no substantial change in DON composition for natural soil and BAM, apart from the small production of condensed aromatics, proteins, amino sugars, and more tannins and lignins (FIGS. 35 (a), (b)). This is corroborated by the consistency of classes from the relative abundance between the influent and effluent. Condensed aromatics were transformed into proteins, amino sugars, tannins, and carbohydrates by IFGEM-1 (FIG. 35 (c)), whereas carbohydrates, tannins, proteins, amino sugars, unsaturated hydrocarbons, condensed aromatics and lipids were produced in IFGEM-3 (FIG. 35 (d)). The IFGEM-3 effluent DON was transformed to lipids, proteins, amino sugars, carbohydrates, tannins, condensed aromatics, and unsaturated hydrocarbons. Less change in DON compositions and relative abundance classes was observed in I3. The influent and effluent compositions of natural soil and BAM were slightly changed with regard to lignins, condensed aromatics, carbohydrates, and tannins, as they were the primary compounds, although it was observed that more condensed aromatic compounds were present in the effluent (FIGS. 36 (a), (b)). The condensed aromatic, tannins, and lignins in the influents were transformed to proteins, amino sugars, lignins, tannins, and carbohydrates in the effluent of IFGEM-1 and IFGEM-3 (FIGS. 36 (c), (d)).

Discussion

Hydraulic characteristics can reflect the impact of biological activity on media components and biofilm growth. Conversely, excessive biofilm growth can decrease infiltration, thus reducing HRT. Furthermore, the longer HRT of the natural soil in this study can be linked to high clay content, which significantly decreased water infiltration, providing an opportunity for the influent to pond at the top section and increase moisture. The difference between the HRT of BAM, IFGEM-1, and IFGEM-3 can be attributed to clay content, with BAM having a higher clay content compared to the absence of clay in IFGEM-1. However, the similarity in the HRT of IFGEM-3 and IFGEM-1 can be connected to the presence of iron filing particles and its possible effect on surface area and biofilm growth, which enhances the attachment of particles onto the media. The infiltration rates may have become comparable due to the constant iron oxidation forming an oxidized layer at the top of the IFGEM, producing a decrease in infiltration. This promoted sections of anaerobic conditions at the top and port 1, and aerobic conditions at port 2.

The variations of pH, ORP, DO, and alkalinity in each effluent provide insight about the stormwater characteristics. ORP can be used as a monitoring parameter to justify the treatment process stability (Zhang et al., 2018) as a more consistent process control parameter than pH and DO because of its higher signal range (Lackner and Horn, 2012). Nitrate reduction from iron ions can be affected by pH; pH less than 5 is preferred, as nitrate reduction rates decrease with increasing pH (Bao et al., 2017). However, a pH range between 7-8 was observed. As denitrification can be affected by low pH, maintaining a reasonable pH to accommodate both processes is ideal. The quantity of DO can inhibit or promote the growth of certain microbes based on the available oxygen in the biofilm.

Further, alkalinity concentrations can act as an indicator of microbial growth from the relation between consumption and biological activity (Bagchi et al., 2010). The change of alkalinity concentration encompassing hydrocarbon can provide insight as to the calcium available in stormwater, as calcium carbonate can form and possibly react with phosphate and nitrate. The presence of dissolved calcium in stormwater can be attributed to the weathering of rocks, as it has been found that aquifers can contain 30-100 mg/L of calcium (Sasidharan et al., 2017). The presence of calcium in stormwater can be assumed; thus, these reactions could have further contributed to the greater nutrient removal of IFGEM-1 and IFGEM-3 by forming calcium salts. Lastly, the lower effluent alkalinity concentrations suggest alkalinity consumption from denitrification and calcium salt formation; however, individual calcium ions could have also participated in the chemical reactions.

The TP removals observed for BAM, IFGEM-1, and IFGEM-3 indicate chemical removal via phosphorus precipitation and adsorption. The primary form of TP removal from IFGEM-1 and IFGEM-3 supports the contribution of iron ions to precipitate formation. The production of ammonia in I2 and the low TP removals may also suggest leaching from the nutrient saturated soil. The presence of heavy metals such as zinc, chromium, cobalt, and aluminum is common in natural environments (Choksi and Joshi, 2007), and such metals can be dispersed to waterbodies through stormwater runoff.

Its high concentration of dissolved aluminum suggests BAM was more likely to release or not retain dissolved aluminum in comparison to the other media. Less dissolved aluminum in the effluent of IFGEM-1 and IFGEM-3 was observed as a possible interaction between aluminum and phosphate precipitation (FIG. 31). It is possible that the interaction of aluminum and phosphate ions had stronger precipitate formation than iron for phosphorus removal (Atkári et al., 1996), as aluminum has stronger bonds that are difficult to displace from its reactiveness (Tassist et al., 2010). Overall, total phosphorus removal was greater in columns with IFGEM-1 and IFGEM-3. Bioadsorption (Tassist et al., 2010) and the adsorption of aluminum into clay (Choksi and Joshi, 2007) could have also contributed to the dissolved aluminum removal in the columns. According to Choksi and Joshi (2007), the removal of aluminum (III) ions by clay, starch, and charcoal (activated wood) was determined to be adequate. A further cause for differences in aluminum concentrations between the media could be the interaction between iron and aluminum ions. Since BAM achieved a high aluminum concentration in the effluent but this aluminum was not utilized for phosphate removal, it can be presumed that it lacked the interaction of iron and aluminum necessary to remove dissolved aluminum. The reaction between iron (III) oxide and aluminum can produce aluminum oxide solids, therefore possibly contributing to a decrease in dissolved aluminum in IFGEM-1 and IFGEM-3 effluents.

The high TN removal efficiencies of IFGEM-1 and IFGEM-3 demonstrate their removal effects and the interaction between iron and clay in nitrate reduction from adsorption at the surface of the particles (Zhang et al., 2011). Further, the small quantities of NOx and ammonia components in TN composition (FIG. 30) confirm the TN and ammonia removals of IFGEM-1 and IFGEM-3 media. The presence of iron, which attaches to clay particles, promoted ammonia removal for IFGEM-3. A higher ammonia removal was observed for higher influent concentration, as an increase in adsorption rate was caused by adsorption sites becoming increasingly surrounded by ammonium when the initial concentration increased (Jing et al., 2017). In addition, ammonium fixation has been found to be affected by soil moisture (Nieder et al., 2011). According to Allison et al. (1953) and Gouveia and Eudoxie (2007), soil moisture can lower $NH_4^-$ fixation in wet environments. However, increased fixation under wet environments has also been observed (Chen et al., 1987; Nieder et al., 2011).

Investigating microbial communities and DON consumption is of importance, as the nitrogen cycle can also proceed via biological reactions and interactions (FIG. 27). A comparison between the change in the microbial community in the biofilm during the second and fourth week of cultivation revealed denitrifiers to be the most prominent and dominant microbial specie, followed by DNRA, comammox, and NOB, suggesting that the aerobic nitrification pathway was the leading pathway for nitrate oxidation. Moreover, the quantification of comammox was higher in comparison to AOB, implying that the ammonia oxidation taking part in the first step of nitrification was primarily completed by comammox. As the population densities of comammox and NOB at each sampling location were comparative, some possible complementary interactions in the second step of the nitrification pathway could associate both NOB and comammox. Hence comammox was the principal converter of ammonia to nitrite, while both comammox and NOB participated in nitrite reduction.

The large DNRA population density at week 4 of the biofilm cultivation in the natural soil, BAM, IFGEM-1, and IFGEM-3 indicates an increase in ammonia production with nitrate consumption. However, efficient ammonia removal was achieved by IFGEM-1 and IFGEM-3 from complementary interactions between physicochemical characteristics corresponding to clay composition in each media and biological uptake from AOB and comammox. Moreover, the depletion of DO availability and alkalinity from BAM, IFGEM-1, and IFGEM-3 suggests the depression of nitrification (Bagchi et al., 2010). This corresponds with the larger NOB population densities observed in natural soil in comparison to BAM, IFGEM-1, and IFGEM-3. However, alkalinity consumption and changes in alkalinity are related to nitrification (Sepehri and Sarrafzadeh, 2018) and possible phosphate and nitrate removal via precipitate formation from $Ca(OH)_2$ reactions.

Moreover, anammox population densities were under the detection limit, signifying that anaerobic ammonium oxidation was not favored in the biofilm and, in turn, nitrate reduction was achieved by denitrifying bacteria. Contrary to the hypothesis, the presence of iron did not enhance the anammox population. The small quantification and the decrease in population density of IRB from week 2 to week 4 implies that ferrous ion utilization in the chemical and physical reactions impacted IRB growth. Ferrous ion was oxidized when in contact with air to possibly form $Fe_3O_2$, and was consumed much more rapidly over time by the physicochemical reactions than by bacteria. These chemical interactions contributed to phosphate removal and nitrate reduction while decreasing the availability of ferrous iron necessary for microbial uptake and growth.

The microorganisms AOB, NOB, comammox, denitrifiers, DNRA and IRB in soil microbial communities participate in a cycle of development, growth, and mortality. The interactions between each microbial specie, and its products from biological reactions and the environment, affect sustained growth and population. Hence, microbial communities affect DON composition via its transformation and utilization within this cycle. The significant quantification of denitrifiers can be attributed to the utilization of DON to obtain their carbon source (electron donor) in the denitrification process. However, denitrification can also proceed in the presence of organic compounds like methanol and acidic acid (Eqs. 26, 27), which are used as electron donors when there is limited degradable organic matter (Gavazza et al., 2004). Microbial assimilation of DON by the IRB in natural soil could have provided more nitrogen compounds to the microorganisms in the community by transforming aromatic hydrocarbons in the iron reducing process, although a small population density was quantified. Other microorganisms that do not necessarily participate in the N-cycle can also utilize DON as a carbon source. In addition, microbial growth and metabolism can be related to the consumption of DON, such as condensed aromatics, lignins, and tannins, and their consequent transformation into proteins, amino sugars, and carbohydrates, which represent the byproducts and microbial waste remaining after performing DON assimilation in the cell, specifically by denitrifiers and DNRA. Organic compounds such as glycerophosphine, a type of glycerophospholipids associated with bacteria cell membrane (López-Lara and Geiger, 2017), and glycoproteins discovered in living organisms (Shylaja and Seshadri, 1989) can be products of microbial metabolism and DON consumption (Eqs. 28, 29). This is possible, as the majority of denitrifying bacteria uptake and degrade organic matter to obtain carbon for microbial growth, releasing dissolved inorganic nitrogen (DIN) (Ward, 2013).

$$NO_3^- + CH_3OH \rightarrow N_2 + CO_2 + H_2O + OH^- \qquad (26)$$

$$NO_3^- + CH_3COOH \rightarrow N_2 + CO_2 + H_2O + OH^- \qquad (27)$$

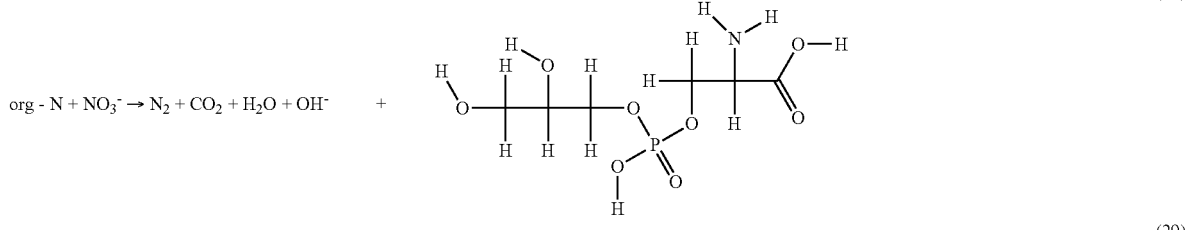

(28)

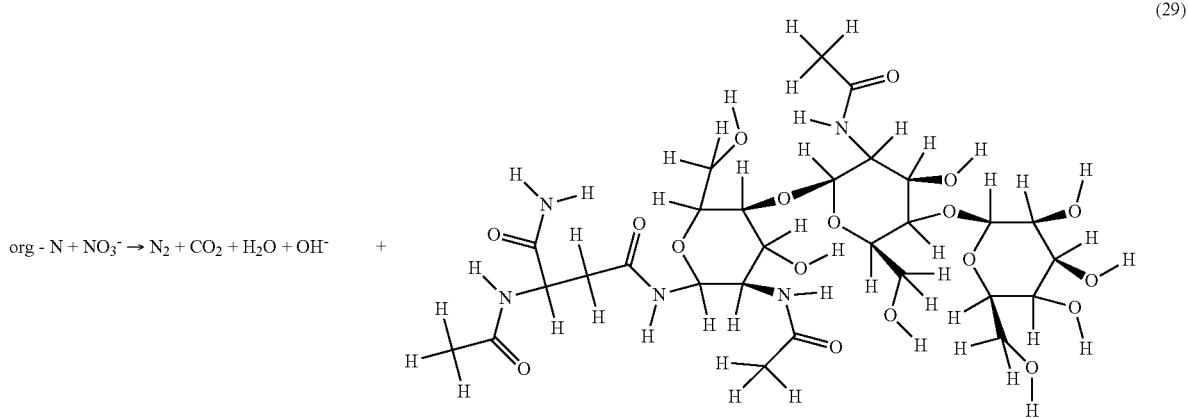

(29)

The formation of proteins, amino sugars and carbohydrates by natural soil and IFGEM-3 in I1 indicates more intensive microbial interactions, resultant of large microbial populations that consumed DON compounds, producing the latter during their development. Further, the relative abundance classes exhibited less intersection between the influent and effluent, suggesting the occurrence of more biological reactions. This can be correlated to the large autotrophic densities of nitrifying bacteria contained in natural soil and IFGEM-3, which can produce carbohydrates and proteins in the biofilm (Liang et al., 2010; Lin et al., 2018). Although changes in DON composition were noted for the natural soil and the three media in I2 and I3, the overlap in the influent and effluent relative abundance suggests that the bacteria have not completely adapted to the higher nutrient conditions, which can be correlated to the DON concentrations. The effects of biofilm accommodation to changes in influent conditions (carbon/no-carbon) was demonstrated by Wen et al. (2020), in whose study a sufficient cultivation period was allotted for microbial community in a biofilm to grow under carbon impact, providing enhanced nitrogen removal.

The change between the quantity of DON concentration for each influent and effluent presented in FIG. 30 can be related to the DON composition and transformation in the van Krevelen diagrams. The small DON concentrations achieved by IFGEM-1 and IFGEM-3 in comparison to BAM and natural soil in I1, I2 and I3 imply adequate effluent TN removal in both media. However, DON is the primary effluent constituent, signifying the availability of organic nitrogen as the indicator of promoted biological reactions. In I1, BAM obtained the smallest reduction in DON concentration, correlating with the minor transformation between influent and effluent DON (FIG. 34). In I2 and I3 alike, natural soil achieved the least effluent DON reduction, contributing to minimal change in DON composition (FIGS. 35-36). In contrast, lower effluent DON concentrations can be connected to a more significant transformation of DON compounds, as observed for IFGEM-1 and IFGEM-3. Thus, the decrease in the effluent change of the heteroatom classes from 11 to 13 for natural soil and IFGEM-3 suggests that a lower nutrient condition is more appropriate for DON transformation, whereas an increase in nutrient concentration improved DON transformation in BAM and IFGEM-1.

When observing the total microbial population at week 4 and the DON transformation in the van Krevelen Diagram with the relative abundance classes, natural soil and IFGEM-3 achieve a visible transformation of DON at I1. IFGEM-3 has a higher total microbial population than natural soil; however, natural soil has larger comammox, NOB, and DNRA populations, implying that these three are the primary contributors to DON consumption. Further, the benefit between the microbial species can be analyzed to address their contribution to DON assimilation, and consequently organic and inorganic nitrogen removal. In this microbial community there is a beneficial relationship between 1) NOB and anammox benefiting from AOB and comammox, 2) denitrifiers and DNRA benefiting NOB, 3) AOB, comammox, and anammox benefiting DNRA, and 4) NOB benefiting from comammox. This fosters possible competition for resources pairwise between NOB and anammox, denitrifiers and DNRA, as well as AOB, comammox, and anammox. Both NOB and anammox require nitrite, which can be acquired from the AOB or the first reaction of comammox in the nitrification. However, anammox growth proceeds at a slower rate, as there are chemolithotrophs. In denitrification and DNRA pathways nitrate serves as a reactant, thus fostering both competition and inhibition environments. The production of ammonia by DNRA supports AOB, comammox, and anammox pathways while encouraging competition between the three.

Conclusion

In this study, the ammonia, total phosphorus and total nitrogen removals obtained for natural soil, BAM, IFGEM-1, and IFGEM-3 at three different spiked stormwater conditions confirmed IFGEM-3 sorption media as the most appropriate for nutrient removal. Providing appropriate biological and chemical reactions enhanced nutrient removal through interactions that precipitated and assimilated phosphorus and nitrogen where achieved. DON in stormwater can be utilized, benefiting microbial communities that decompose and transform DON. Natural soil and IFGEM-3 were found to promote better DON transformation in condition 1 (I1). In condition 2 (I2) IFGEM-1 and IFGEM-3 achieved the least effluent DON concentrations, while in condition 3 (I3) BAM, IFGEM-1, and IFGEM-3 achieved a significant reduction in DON concentrations. As a result, IFGEM-1 and IFGEM-3 provided greater DON decomposition after treating the stormwater. Moreover, a holistic understanding of the microbial interactions that participate in the nitrogen cycle was achieved from the analysis of AOB, NOB, anammox, comammox, denitrifiers, and DNRA, which deepened the understanding of how microbial ecology works for DON decomposition and removal collectively.

REFERENCES

Al-Kaisi, M. M., Lal, R., Olson, K. R, Lowery, B., 2017. Chapter 1—Fundamentals and Functions of Soil Environment. Soil Health and Intensification of Agroecosystems, Elsevier Inc, pp. 1-23.

Allison F, Doetsch J H, Roller E. Availability of fixed ammonium in soils containing different clay minerals. Soil Science 1953; 75: 361-382.

Amon R M, Fitznar H-P, Benner R. Linkages among the bioreactivity, chemical composition, and diagenetic state of marine dissolved organic matter. Limnology and Oceanography 2001; 46: 287-297.

Ananda, M. M. A., Weerahandi, S., 1997. Two-way ANOVA with unequal cell frequencies and unequal variances. Statistica Sinica 7, 631-646.

Annavajhala M K, Kapoor V, Santo-Domingo J, Chandran K. Comammox Functionality Identified in Diverse Engineered Biological Wastewater Treatment Systems. Environmental Science & Technology Letters 2018; 5: 110-116.

Antony R, Grannas A M, Willoughby A S, Sleighter R L, Thamban M, Hatcher P G. Origin and Sources of Dissolved Organic Matter in Snow on the East Antarctic Ice Sheet. Environmental science & technology 2014; 48: 6151-6159.

Atkári K, Kiss T. Bertani R. Martin R B. Interactions of aluminum (III) with phosphates. Inorganic chemistry 1996; 35: 7089-7094.

Ayoub, G. M., Koopman, B., Pandya, N., 2001. Iron and aluminum hydroxy (oxide) coated filter media for low-concentration phosphorus removal. Water Environment Research 73, 478.

Azziz G, Monza J, Etchebehere C, Irisarri PJEjosb. nirS- and nirK-type denitrifier communities are differentially affected by soil type, rice cultivar and water management. 2017; 78: 20-28.

Baby J, Raj J S, Biby E T, Sankarganesh P, Jeevitha M, Ajisha S, et al. Toxic effect of heavy metals on aquatic environment. International Journal of Biological and Chemical Sciences 2010; 4.

Bagchi S, Biswas R, Nandy T. Alkalinity and dissolved oxygen as controlling parameters for ammonia removal through partial nitration and ANAMMOX in a single-stage bioreactor. Journal of Industrial Microbiology & Biotechnology 2010; 37: 871-876.

Bansiwal, A. K., Rayalu, S. S., Labhasetwar, N. K., Juwarkar, A. A., Devotta, S., 2006. Surfactant-modified zeolite as a slow release fertilizer for phosphorus. Journal of Agricultural and Food Chemistry 54, 4773-4779.

Bao Z, Hu Q, Qi W, Tang Y, Wang W, Wan P, et al. Nitrate reduction in water by aluminum alloys particles. Journal of Environmental Management 2017; 196: 666-673.

Beecham S, Pezzanit D, Kandasamy J. Stormwater treatment using permeable pavements. Proceedings of the Institution of Civil Engineers—Water Management 2012; 165: 161.

Berman T, Bronk D A. Dissolved organic nitrogen: a dynamic participant in aquatic ecosystems. Aquatic microbial ecology 2003; 31: 279-305.

Boserup E. The conditions of agricultural growth: The economics of agrarian change under population pressure: Routledge, 2017.

Bucheli, T. D., Müller, S. R., Heberle, S., Schwarzenbach, R. P., 1998. Occurrence and behavior of pesticides in rainwater, roof runoff, and artificial stormwater infiltration. Environmental Science Technology 32, 3457-3464.

Burgin A J, Yang W H, Hamilton S K, Silver W L. Beyond carbon and nitrogen: how the microbial energy economy couples elemental cycles in diverse ecosystems. Frontiers in Ecology and the Environment 2011; 9: 44-52.

Carranzo I V. Standard Methods for examination of water and wastewater. Anales Dc Hidrologia Médica. 5. Universidad Complutense de Madrid, 2012, pp. 185.

Chang M, McBroom M W, Beasley RSJJoem. Roofing as a source of nonpoint water pollution. 2004; 73: 307-315.

Chang, N.-B., 2011. Making a Progress to Speed up the Nitrification and Denitrification Processes in Novel Biosorption Activated Media: Can Archaea be in Concert with Anammox? Journal of Bioprocessinf & Biotechniques 1, 1-5.

Chang, N.-B., Hossain, F., Wanielista, M., 2010. Filter Media for nutrient removal in natural systems and built environments: I-previous trends and perspectives. Environmental Engineering Science 27.

Chang, N.-B., Lin, K. S., Wanielista, M. P., Crawford, A. J., Hartshorn, N., Clouet, B., 2016. An innovative solar energy-powered floating media bed reactor for nutrient removal (I): reactor design. Journal of Cleaner Production 133, 495-503.

Chang, N.-B., Wen, D., McKenna, A. M., Wanielista, M. P., 2018a. The Impact of Carbon Source as Electron Donor on Composition and Concentration of Dissolved Organic Nitrogen in Biosorption-Activated Media for Stormwater and Groundwater Co-Treatment. Environmental science & technology 52, 9380-9390.

Chang, N. B., Wen, D., Wanielista, M. P., 2018b. Impact of changing environmental factors and species competition on iron filings-based green environmental media for nutrient removal in stormwater treatment. Environmental Progress & Sustainable Energy, 1-14.

Chang N-B, Wen D. Enhanced resilience and resistance assessment with virtual ecoexergy for a subtropical lake ecosystem under the intermittent impact of hurricanes and droughts. Ecological Informatics 2017; 39: 68-83.

Chen R, Zhang J, Guo W, Chen W. N fertilizer (urea) top dressed on unsaturated soil and deep-placed using reflooding water. International Rice Research Newsletter 1987; 12; 35-36.

Cho, K. W., Song, K. G., Cho, J. W., Kim, T. G., Ahn, K. H., 2009. Removal of nitrogen by a layered soil infiltration system during intermittent storm events. Chemosphere 76, 690-696.

Choksi P M, Joshi V Y. Adsorption kinetic study for the removal of nickel (II) and aluminum (III) from an aqueous solution by natural adsorbents. Desalination 2007; 208: 216-231.

Clark, S. E., Pitt, R., 2007. Influencing factors and a proposed evaluation methodology for predicting groundwater contamination potential from stormwater infiltration activities. Water Environment Research 79, 29-36.

Collins K A, Lawrence T J, Stander E K, Jontos R J, Kaushal S S, Newcomer T A, et al. Opportunities and challenges for managing nitrogen in urban stormwater: A review and synthesis. Ecological Engineering 2010; 36: 1507-1519.

Commoner BJIJoHS. Rapid population growth and environmental stress. 1991; 21: 199-227.

Cooper R E, Goff J L, Reed B C, Sekar R, DiChristina T J. Breathing iron: molecular mechanism of microbial iron reduction by *Shewanella oneidensis*. Manual of Environmental Microbiology, Fourth Edition. American Society of Microbiology, 2016, pp. 5.2. 1-1-5.2. 1-13.

Corilo, Y. E., Copyright 2014 Florida State University.

Costa E, Perez J, Kreft J-U. Why is metabolic labour divided in nitrification? Trends in microbiology 2006; 14: 213-219.

Daims H, Lebedeva E V, Pjevac P, Han P, Herbold C, Albertsen M, et al. Complete nitrification by Nitrospira bacteria. Nature 2015; 528: 504-509.

Dang H, Chen C-T A. Ecological energetic perspectives on responses of nitrogen-transforming chemolithoautotrophic microbiota to changes in the marine environment. Frontiers in microbiology 2017; 8: 1246.

Dionisi H M, Layton A C, Harms G, Gregory E R, Robinson K G, Sayler G S J A, et al. Quantification of *Nitrosomonas oligotropha*-like ammonia-oxidizing bacteria and *Nitrospira* spp. from full-scale wastewater treatment plants by competitive PCR. 2002; 68: 245-253.

Dodd Jr C K, Barichivich W J, Johnson S A, Aresco M G, Staiger J S. Establishing a baseline: the amphibians of Lower Suwannee National Wildlife Refuge, Dixie and Levy counties, Florida. Florida Scientist 2017; 80: 133-144.

Eppley R W, Peterson B J J N. Particulate organic matter flux and planktonic new production in the deep ocean. 1979; 282: 677.

Erickson, A. J., Gulliver, J. S., Weiss, P. T., 2012. Capturing phosphates with iron enhanced sand filtration. Water Research 46, 3032-3042.

Eturki, S., Ayari, F., Jedidi, N., Dhia, H. B., 2012. Use of clay mineral to reduce ammonium from wastewater. Effect of various parameters. Surface Engineering and Applied Electrochemistry 48, 276-283.

Ga, C. H., Ra, C. S., 2009. Real-time control oxic phase using pH (mV)-time profile in swine wastewater treatment. Journal of Hazardous Materials 172, 61-67.

Ghassemi, M., Recht, H. L., 1971. Phosphate Precipitation With Ferrous Iron. Water Pollution Control Research, U. S. E. P. A.

Giblin A E, Tobias C R, Song B, Weston N, Banta G T, Rivera-Monroy V H. The Importance of Dissimilatory Nitrate Reduction to Ammonium (DNRA) in the Nitrogen Cycle of Coastal Ecosystems. Oceanography 2013; 26: 124-131.

Golubev S, Pokrovsky O, Savenko V. Homogeneous precipitation of magnesium phosphates from seawater solutions. Journal of Crystal Growth 2001; 223: 550-556.

Gouveia G A, Eudoxie G D. Distribution of fertiliser N among fixed ammonium fractions as affected by moisture and fertiliser source and rate. Biology and fertility of soils 2007; 44: 9-18.

Güngör, K., Ünlü, K. J. T. J. o. E., 2005. Nitrite and nitrate removal efficiencies of soil aquifer treatment columns. Turkish Journal of Engineering Environmental Sciences 29, 159-170.

Hasan, H. A., Abdullah, S. R. S., Kamarudin, S. K., Kofli, N. T., 2010. Recognition of relevant ORP, pH, and D O bending points in ammonia removal from drinking water through online BAF system. International Journal of Chemical Engineering 2012, 1-7.

Herzsprung P, von Tumpling W, Hertkorn N, Harir M, Büttner O, Bravidor J. et al. Variations of DOM quality in inflows of a drinking water reservoir: linking of van Krevelen diagrams with EEMF spectra by rank correlation. Environmental science & technology 2012; 46: 5511-5518.

Hood, A., Chopra, M., Wanielista, M., 2013. Assessment of Biosorption Activated Media Under Roadside Swales for the Removal of Phosphorus from Stormwater. Water 5, 53-66.

Hossain, F., Chang, N.-B., Wanielista, M., 2010. Modeling kinetics and isotherms of functionalized filter media for nutrient removal from stormwaterd dry ponds. Environmental Progress & Sustainable Energy 29, 319-333.

Hu H, Liao K, Geng J, Xu K, Huang H, Wang J, et al. Removal Characteristics of Dissolved Organic Nitrogen and Its Bioavailable Portion in a Postdenitrifying Biofilter: Effect of the C/N Ratio. Environmental Science & Technology 2018a; 52: 757-764.

Hu H, Liao K, Geng J, Xu K, Huang H, Wang J, et al. Removal characteristics of dissolved organic nitrogen and its bioavailable portion in a postdenitrifying biofilter: effect of the C/N ratio. Environmental science & technology 2018b; 52: 757-764.

Jing Q-X, Chai L-Y, Huang X-D, Tang C-J, Huan G., Wei W. Behavior of ammonium adsorption by clay mineral halloysite. Transactions of Nonferrous Metals Society of China 2017; 27: 1627-1635.

Jones J Chemophysical characteristics and application of biosorption activated media (BAM) for copper and nutrient removal in stormwater management. University of Central Florida, 2013.

Jones, J., Chang, N.-B., Wanielista, M. P., 2015. Reliability analysis of nutrient removal from stormwater runoff with green sorption media under varying influent conditions. Science of the Total Environment 502, 434-447.

Jørgensen N O. Organic nitrogen. Encyclopedia of inland waters. Elsevier, 2009, pp. 832-851.

Jørgensen S E. Eco-exergy as sustainability. Vol 16. Southampton, Boston: WIT Press, 2006.

Judd K E, Crump B C, Kling G W. Variation in dissolved organic matter controls bacterial production and community composition. Ecology 2006; 87: 2068-2079.

Kaiser, N K, Quinn J P, Blakney G T, Hendrickson C L, Marchall A G. A Novel 9.4 Tesla FTICR Mass Spectrometer with Improved Sensitivity, Mass Resolution, and Mass Range. J. Am. Soc. Mass Spectrom 2011; 22:1343-1351.

Kandeler F, Kampichler C, Horak O J B, Influence of heavy metals on the functional diversity of soil microbial communities. Biology and Fertility of Soil 1996; 23: 299-306.

Kanso S, Greene A C, Patel B K C. *Bacillus subterraneus* sp. nov., an iron- and manganese-reducing bacterium from a deep subsurface Australian thermal aquifer. International Journal of Systematic and Evolutionary Microbiology 2002; 52: 869-874.

Khiadani M, Zarrabi M, Foroughi M. Urban runoff treatment using nano-sized iron oxide coated sand with and without magnetic field applying. Journal of Environmental Health Science and Engineering 2013; 11: 43.

Koch H, van Kessel M A H J, Lücker S. Complete nitrification: insights into the ecophysiology of comammox *Nitrospira*. Applied microbiology and biotechnology 2019, 103: 177-189.

Lackner S, Horn H. Evaluating operation strategies and process stability of a single stage nitration-anammox SBR by use of the oxidation-reduction potential (ORP). Bioresource technology 2012; 107: 70-77.

Lanza F, Sellergren B. The application of molecular imprinting technology to solid phase extraction. Chromatographia 2001; 53: 599-611.

Lee, C. g., Fletcher, T. D., Sun, G., 2009. Nitrogen removal in constructed wetland systems. Engineering in Life Sciences 9, 11-22.

Lee E Y, Cho K-S, Ryu H W. Microbial refinement of kaolin by iron-reducing bacteria. Applied Clay Science 2002; 22: 47-53.

Liang Z, Li W, Yang S, Du P. Extraction and structural characteristics of extracellular polymeric substances (EPS), pellets in autotrophic nitrifying biofilm and activated sludge. Chemosphere 2010; 81: 626-632.

Lin Y, Reino C, Carrera J, Perez J, van Loosdrecht M C M. Glycosylated amyloid-like proteins in the structural extracellular polymers of aerobic granular sludge enriched with ammonium-oxidizing bacteria. MicrobiologyOpen 2018; 7: 1-13.

Liu B, Gu L, Yu X, Yu G, Zhang H, Xu J. Dissolved organic nitrogen (DON) profile during backwashing cycle of drinking water biofiltration. Science of the Total Environment 2012; 414: 508-514.

Logue J B, Stedmon C A, Kellerman A M, Nielsen N J, Andersson A F, Laudon H, et al. Experimental insights into the importance of aquatic bacterial community composition to the degradation of dissolved organic matter. International Society for Microbial Ecology 2016; 10: 533-545.

López-Lara I M, Geiger O. Bacterial lipid diversity. Biochimica et Biophysica Acta (BBA)—Molecular and Cell Biology of Lipids 2017; 1862: 1287-1299.

Lovley D R. Dissimilatory Metal Reduction. Annual Review of Microbiology 1993; 47: 263-290.

Lovley D R, Giovannoni S J, White D C, Champine J E, Phillips E J P, Gorby Y A, et al. Geobacter metallireducens gen. nov. sp. nov., a microorganism capable of coupling the complete oxidation of organic compounds to the reduction of iron and other metals Archives of Microbiology 1993; 159: 336-344.

Lovley D R, Holmes D E, Nevin K P. Dissimilatory Fe(III) and Mn(IV) Reduction. Advances in Microbial Physiology 2004; 49: 219-286.

Lu H, Fu F, Li H, Campbell D E, Ren H. Eco-exergy and energy based self-organization of three forest plantations in lower subtropical China. Scientific Reports 2015; 5: 1-13.

Lusk M G, Toor G S. Biodegradability and Molecular Composition of Dissolved Organic Nitrogen in Urban Stormwater Runoff and Outflow Water from a Stormwater Retention Pond. Environmental Science & Technology 2016a; 50: 3391-3398.

Lusk M G, Toor G S. Dissolved organic nitrogen in urban streams: biodegradability and molecular composition studies. Water research 2016b; 96: 225-235.

Molozzi J, Salas F, Callisto M, Marques J C. Thermodynamic oriented ecological indicators: Application of Eco-Exergy and Specific Eco-Exergy in capturing environmental changes between disturbed and non-disturbed tropical reservoirs. Ecological Indicators 2013; 24: 543-551.

Mandal S, Ray S, Roy S, Mandal S. The concept of exergy and its extension to ecological system. In: Pélissier G, Calvet A, editors. Handbook of Exergy, Hydrogen Energy and Hydropower Research. Nova Science Publishers, Inc, New York, N.Y., 2009, pp. 1-14.

Mason Y, Ammann A A, Ulrich A, Sigg L. Behavior of Heavy Metals, Nutrients, and Major Components during Roof Runoff Infiltration. Environmental science & technology 1999; 33: 1588-1597.

Mateus, D. M. R., Pinho, H. J. O., 2010. Phosphorus Removal by Expanded Clay—Six Years of Pilot-Scale Constructed Wetlands Experience. Water Environment Research 82, 128-137.

Moharami, S., Jalali, M., 2015. Use of modified clays for removal of phosphorus from aqueous solutions. Environmental monitoring and assessment 187, 639.

Nieder R, Benbi D K, Scherer H W. Fixation and defixation of ammonium in soils: a review. Biology and Fertility of Soils 2011; 47: 1-14.

Nilsson, C., Lakshmanan, R., Renman, G., Rajarao, G. K., 2013. Efficacy of reactive mineral-based sorbents for phosphate, bacteria, nitrogen and TOC removal column experiment in recirculation batch mode. Water Research.

O'Reilly, A. M., Chang, N.-B., Wanielista, M. P., 2012a. Cyclic biogeochemical processes and nitrogen fate beneath a subtropical stormwater infiltration basin. Journal of Contaminant Hydrology, 53-75.

O'Reilly, A. M., Wanielista, M. P., Chang, N.-B., Xuan, Z., Harris, W. G., 2012b. Nutrient removal using biosorption activated media: Preliminary biogeochemical assessment of an innovative stormwater infiltration basin. Science of the Total Environment 432, 227-242.

Orschler L, Agrawal S, Lackner S. On resolving ambiguities in microbial community analysis of partial nitration anammox reactors. Scientific Reports 2019; 9.

Oshiki M, Satoh H, Okabe S. Ecology and physiology of anaerobic ammonium oxidizing bacteria. Environmental microbiology 2016; 18: 2784-2796.

Pellerin B A, Kaushal S S, McDowell W H. Does anthropogenic nitrogen enrichment increase organic nitrogen concentrations in runoff from forested and human-dominated watersheds? Ecosystems 2006; 9: 852-864.

Roesner, L. A., Bledsoe, B. P., Brashear, R. W. J. J. o. W. R. P., Management, 2001. Are best-management-practice criteria really environmentally friendly? Journal of Water Resources Planning and Management 127, 150-154.

Roncal-Herrero T, Rodriguez-Blanco J D, Benning L G, Oelkers E H. Precipitation of iron and aluminum phosphates directly from aqueous solution as a function of temperature from 50 to 200 C. Crystal Growth & Design 2009; 9: 5197-5205.

Rotthauwe J-H, Witzel K-P, Liesack W J A, microbiology e. The ammonia monooxygenase structural gene amoA as a functional marker: molecular fine-scale analysis of natural ammonia-oxidizing populations. 1997; 63: 4704-4712.

Ruangchainikom, C., Liao, C.-H., Anotai, J., Lee, M.-T., 2006. Effects of water characteristics on nitrate reduction by the FeO/CO2 process. Chemosphere 63, 335-343.

Ryan, P., Wanielista, M., Chang, N.-B., 2010. Nutrient reduction in stormwater pond discharge using a chamber upflow filter and skimmer (CUFS). Water, air, and soil pollution 208, 385-399.

Salas F, Marcos C, Perez-Ruzafa A, Marques J C. Application of the exergy index as ecological indicator of organically enrichment areas in the Mar Menor lagoon (southeastern Spain). Energy 2005; 30: 2505-2522.

Sasidharan S, Bradford S A, Šimůnek J, Torkzaban S, Vanderzalm J. Transport and fate of viruses in sediment and stormwater from a Managed Aquifer Recharge site. Journal of Hydrology 2017; 555: 724-735.

Sepehri A, Sarrafzadeh M-H. Effect of nitrifiers community on fouling mitigation and nitrification efficiency in a membrane bioreactor. Chemical Engineering and Processing-Process Intensification 2018; 128: 10-18.

Shammaa, Y., Zhu, D., Gyürék, L., Labatiuk, C., 2002. Effectiveness of dry ponds for stormwater total suspended solids removal. Canadian Journal of Civil Engineering 29, 316-324.

Shannon C E. A mathematical theory of communication. Bell system technical journal 1948; 27: 379-423.

Shylaja M, Seshadri H. Glycoproteins: an overview. Biochemical Education 1989; 17: 170-178.

Sibrell. P. L., Montgomery, G. A., Ritenour, K. L., Tucker, T. W., 2009. Removal of phosphorus from agricultural wastewaters using adsorption media prepared from acid mine drainage sludge. Water research 43, 2240-2250.

Simsek H, Kasi M, Ohm J-B, Murthy S, Khan E. Impact of solids retention time on dissolved organic nitrogen and its biodegradability in treated wastewater. Water research 2016; 92: 44-51.

Smith J A, Lovley D R, Tremblay P-L. Outer cell surface components essential for Fe (III) oxide reduction by Geobacter metallireducens. Appl. Environ. Microbiol. 2013; 79: 901-907.

Snoeyenbos-West O, Nevin K, Anderson R, Lovley D J M E. Enrichment of Geobacter species in response to stimulation of Fe (III) reduction in sandy aquifer sediments. 2000; 39: 153-167.

Sonthiphand P, Hall M W, Neufeld J D. Biogeography of anaerobic ammonia-oxidizing (anammox) bacteria. Frontiers in microbiology 2014; 5: 399.

Sorensen, J., 1982. Reduction of ferric iron in anaerobic, marine sediment and interaction with reduction of nitrate and sulfate. Applied and Environmental Microbiology 43, 319-324.

Straub K L, Benz M, Schink B, Widdel F J A E M. Anaerobic, nitrate-dependent microbial oxidation of ferrous iron. 1996; 62: 1458-1460.

Strous M, Pelletier E, Mangenot S, Rattei T, Lehner A, Taylor M W, et al. Deciphering the evolution and metabolism of an anammox bacterium from a community genome. 2006; 440; 790.

Stults J R, Snoeyenbos-West O, Methe B, Lovley D R, Chandler D P J A E M. Application of the 5' fluorogenic exonuclease assay (TaqMan) for quantitative ribosomal DNA and rRNA analysis in sediments. 2001; 67: 2781-2789.

Surbeck, C. Q., Jiang, S. C., Ahn, J. H., Grant, S. B., 2006. Flow fingerprinting fecal pollution and suspended solids in stormwater runoff from an urban coastal watershed. Environmental science & technology 40, 4435-4441.

Tassist A, Lounici H, Abdi N, Mameri N. Equilibrium, kinetic and thermodynamic studies on aluminum biosorption by a mycelial biomass (*Streptomyces rimosus*). Journal of Hazardous Materials 2010; 183: 35-43.

Thistleton, J., Berry, T.-A., Pearce, P., Parsons, S. J. P. S., Protection, E., 2002. Mechanisms of chemical phosphorus removal II: iron (III) salts. 80, 265-269.

Todorova S G, Costello A M. Design of *Shewanella*-specific 16S rRNA primers and application to analysis of *Shewanella* in a minerotrophic wetland. Environmental Microbiology 2006; 8: 426-432.

Tsushima I, Kindaichi T, Okabe S J W R. Quantification of anaerobic ammonium-oxidizing bacteria in enrichment cultures by real-time PCR. 2007; 41: 785-794.

Tugtas A E, Pavlostathis S G. Electron donor effect on nitrate reduction pathway and kinetics in a mixed methanogenic culture. Biotechnology and bioengineering 2007; 98: 756-763.

Valencia A, Chang N-B, Wen D, Ordonez D, Wanielista M P. Optimal Recipe Assessment of Iron Filing-Based Green Environmental Media for Improving Nutrient Removal in Stormwater Runoff Environmental Engineering Science 2019; 36: 1323-1336.

van Breemen N. Natural organic tendency. Nature 2002; 415: 381-382.

Van De Vossenberg J, Rattray J E. Geerts W, Kartal B. Van Niftrik L, Van Donselaar E G, et al. Enrichment and characterization of marine anammox bacteria associated with global nitrogen gas production. 2008; 10: 3120-3129.

Van Kessel M A H J, Speth D R, Albertsen M, Nielsen P H, Op Den Camp H J M, Kartal B, et al. Complete nitrification by a single microorganism. Nature 2015; 528: 555-559.

Ward B B. How nitrogen is lost? Science 2013; 341: 352-353.

Weiss, P. T., LeFevre, G., Gulliver, J. S., 2008. Contamination of soil and groundwater due to stormwater infiltration practices, a literature review. University of Minnesota, St. Anthony Falls Laboratory, Minnesota Pollution Control Agency pp. 1-38.

Wen, D., Chang, N.-B., Wanielista, M. P., 2018. Comparative copper toxicity impact and enzymatic cascade effect on Biosorption Activated Media and woodchips for nutrient removal in stormwater treatment. Chemosphere 213, 403-413.

Wildung R E, Li S, Murray C J, Krupka K M, Xie Y, Hess N J, et al. Technetium reduction in sediments of a shallow aquifer exhibiting dissimilatory iron reduction potential. Microbiology Ecology 2004; 49: 151-162.

Wischgoll S, Heintz D, Peter F, Erxleben A, Sarnighausen E, Reski R, et al. Gene clusters involved in anaerobic benzoate degradation of Geobacter metallireducens. Molecular Microbiology 2005; 58: 1238-1252.

Wu X, Wu L, Liu Y, Zhang P, Li Q, Zhou J, et al. Microbial interactions with dissolved organic matter drive carbon dynamics and community succession'. Frontiers in microbiology 2018; 9: 1234.

Xia F, Wang J-G, Zhu T, Zou B, Rhee S-K, Quan Z-X. Ubiquity and Diversity of Complete Ammonia Oxidizers (Comammox). Applied and Environmental Microbiology 2018; 84.

Xuan, Z., Chang, N.-B., Wanielista, M., Hossain, F., 2010. Laboratory-scale characterization of a green sorption medium for on-site sewage treatment and disposal to improve nutrient removal. Environmental Engineering Science 27, 301-312.

Yin G, Hou L, Liu M, Li X, Zheng Y, Gao J, et al. DNRA in intertidal sediments of the Yangtze Estuary. 2017; 122: 1988-1998.

Zeng J, Liu X, Song L, Lin X, Zhang H, Shen C, et al. Nitrogen fertilization directly affects soil bacterial diversity and indirectly affects bacterial community composition. Soil Biology and Biochemistry 2016; 92: 41-49.

Zhang C, Guo J, Lian J, Song Y, Lu C, Li H. Biomixotrophic perchlorate reduction to control sulfate production in a step-feed sulfur-based reactor: A study of kinetics, ORP and bacterial community structure. Biosource Technology 2018; 269: 40-49.

Zhang C L, Li Y, Ye Q, Fong J, Peacock A D, Blunt E, et al. Carbon isotope signatures of fatty acids in Geobacter metallireducens and *Shewanella algae*. Chemical Geology 2003; 195: 17-28.

Zhang L, Seagren E A, Davis A P, Karns J S. The capture and destruction of *Escherichia coli* from simulated urban runoff using conventional bioretention media and iron oxide-coated sand. Water Environment Research 2010; 82: 701-714.

Zhang Y, Li Y, Li J, Hu L, Zheng X. Enhanced removal of nitrate by a novel composite: nanoscale zero valent iron supported on pillared clay. Chemical Engineering Journal 2011; 171: 526-531.

Zhou, A., Tang, H., Wang, D., 2005. Phosphorus adsorption on natural sediments: Modeling and effects of pH and sediment composition. Water Research 39, 1245-1254.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of water treatment, comprising the steps of:
    mixing together a synergistic composition including iron filings of at most 5 volume (vol) % of the synergistic composition, sand particles of at least 80 vol % of the synergistic composition, and clay particles of at most 5 vol % of the synergistic composition;
    flowing water that contains nitrogen compounds and phosphorus compounds through the synergistic composition;
    attracting, via the clay particles, the nitrogen compounds and the phosphorus compounds;
    absorbing the nitrogen compounds and the phosphorus compounds onto a surface of the iron filings and the clay particles; and
    removing at least a portion of the nitrogen compounds and the phosphorus compounds from the water, thereby generating reaction products,
    wherein the iron filings and the clay particles act synergistically to remove the at least the portion of the nitrogen compounds and the phosphorus compounds from the water.

2. The method of claim 1, wherein the clay particles are aluminum-based clay particles.

3. The method of claim 1, wherein the synergistic composition further comprises at least one recycled material selected from the group consisting of tire crumb and paper.

4. The method of claim 1, wherein the generated reaction products include compositions selected from the group consisting of ammonia and ferrous iron.

5. The method of claim 1, wherein the water is selected from the group consisting of stormwater runoff, wastewater effluent, agricultural discharge, and combinations thereof.

6. The method of claim 1, wherein an average size of the clay particles is less than an average size of the iron filings and an average size of the sand particles.

7. The method of claim 6, wherein the average size of the clay particles is between 0.2 µm and 5 µm.

8. The method of claim 1, wherein the synergistic composition includes at least 83 vol % sand particles.

9. A synergistic composition for treating water containing nitrogen compounds and phosphorus compounds, the synergistic composition comprising:
a mixture of iron filings of at most 5 vol %, sand particles of at least 80 vol %, and clay A particles of at most 5 vol %,
wherein the clay particles are configured to attract the nitrogen compounds and the phosphorus compounds to be absorbed onto a surface of the iron filings and the clay particles, thereby synergistically removing the nitrogen compounds and the phosphorus compounds from the water.

10. The synergistic composition of claim 9, wherein the clay particles are aluminum-based clay particles.

11. The synergistic composition of claim 9, wherein the clay particles in the composition is 2 vol %.

12. The synergistic composition of claim 9, further comprising at least one recycled material selected from the group consisting of tire crumb and paper.

13. The synergistic composition of claim 12, wherein the at least one recycled material in the composition is at most 10 vol %.

14. The synergistic composition of claim 9, wherein an average size of the clay particles is less than an average size of the iron filings and an average size of the sand particles.

15. The synergistic composition of claim 14, wherein the average size of the clay particles is between 0.2 µm and 5 µm.

16. The synergistic composition of claim 9, wherein the synergistic composition includes approximately 5 vol % iron filings, 2 vol % clay particles, and 83 vol % sand particles.

* * * * *

UNITED STATES PATENT AND TRADEMARK OFFICE
CERTIFICATE OF CORRECTION

PATENT NO. : 10,787,373 B2  
APPLICATION NO. : 16/829889  
DATED : September 29, 2020  
INVENTOR(S) : Ni-Bin Chang and Martin P. Wanielista Page 1 of 1

It is certified that error appears in the above-identified patent and that said Letters Patent is hereby corrected as shown below:

In the Claims

Column 65, Claim 9, Line 7 should read:
of at least 80 vol % and clay particles of at most 5

Signed and Sealed this  
Fifteenth Day of December, 2020

Andrei Iancu  
*Director of the United States Patent and Trademark Office*